(12) United States Patent
Fu et al.

(10) Patent No.: US 11,611,959 B2
(45) Date of Patent: *Mar. 21, 2023

(54) METHOD AND APPARATUS OF RECEIVING DOWNLINK CHANNEL AND/OR DOWNLINK REFERENCE SIGNAL

(71) Applicant: Samsung Electronics Co., Ltd., Suwon-si (KR)

(72) Inventors: Jingxing Fu, Beijing (CN); Yingyang Li, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/671,762

(22) Filed: Nov. 1, 2019

(65) Prior Publication Data

US 2020/0068569 A1   Feb. 27, 2020

Related U.S. Application Data

(63) Continuation of application No. 15/540,826, filed as application No. PCT/KR2015/014411 on Dec. 29, 2015, now Pat. No. 10,477,541.

(30) Foreign Application Priority Data

Dec. 30, 2014   (CN) .......................... 201410841641.X
Mar. 6, 2015    (CN) .......................... 201510101185.X
(Continued)

(51) Int. Cl.
*H04W 72/04*      (2009.01)
*H04W 72/0446*    (2023.01)
(Continued)

(52) U.S. Cl.
CPC ....... *H04W 72/0446* (2013.01); *H04L 5/0048* (2013.01); *H04L 5/0053* (2013.01);
(Continued)

(58) Field of Classification Search
CPC ......... H04W 72/0446; H04W 72/0406; H04W 72/14; H04L 5/0048; H04L 5/0053;
(Continued)

(56) References Cited

U.S. PATENT DOCUMENTS

2013/0039233 A1   2/2013   Dai et al.
2013/0163543 A1   6/2013   Freda et al.
(Continued)

FOREIGN PATENT DOCUMENTS

EP            3163967 A1   5/2017

OTHER PUBLICATIONS

Catt, "Data and Control Signaling Transmissions for LAA," 3GPP TSG RAN WG1 Meeting #79, R1-144627, Nov. 8, 2014, pp. 1-5, San Francisco, USA.
(Continued)

*Primary Examiner* — Samina F Choudhry
(74) *Attorney, Agent, or Firm* — Jefferson IP Law, LLP

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). The present disclosure provides a method of receiving downlink channel and/or downlink reference signal on an unlicensed band. An LTE user equipment (UE) receives control information of a cell operating on an unlicensed band, and receives downlink channel and/or downlink reference signal transmitted in the cell according to the control information. According to the present disclosure, data can be properly received on an unlicensed band.

20 Claims, 29 Drawing Sheets

(30) Foreign Application Priority Data

| Mar. 27, 2015 | (CN) | .......................... | 201510142839.3 |
| Apr. 28, 2015 | (CN) | .......................... | 201510207990.0 |
| May 28, 2015 | (CN) | .......................... | 201510284633.4 |

(51) Int. Cl.

| H04L 5/00 | (2006.01) |
|---|---|
| H04L 5/14 | (2006.01) |
| H04L 27/26 | (2006.01) |
| H04W 72/14 | (2009.01) |
| H04L 27/00 | (2006.01) |

(52) U.S. Cl.
CPC ............ *H04L 5/14* (2013.01); *H04L 27/2605* (2013.01); *H04W 72/0406* (2013.01); *H04W 72/14* (2013.01); *H04L 5/001* (2013.01); *H04L 5/1469* (2013.01); *H04L 27/0006* (2013.01)

(58) Field of Classification Search
CPC ....... H04L 5/14; H04L 27/2605; H04L 5/001; H04L 5/1569; H04L 27/0006
See application file for complete search history.

(56) References Cited

U.S. PATENT DOCUMENTS

| 2014/0036853 A1 | 2/2014 | Kim et al. | |
| 2014/0050206 A1* | 2/2014 | Seo | ...................... H04J 11/0083 370/336 |
| 2014/0112289 A1* | 4/2014 | Kim | ...................... H04L 5/0078 370/329 |
| 2014/0133371 A1* | 5/2014 | Park | ...................... H04L 5/0053 370/280 |
| 2015/0049741 A1* | 2/2015 | Chen | ...................... H04W 16/14 370/336 |
| 2015/0341921 A1 | 11/2015 | Chen et al. | |

OTHER PUBLICATIONS

Fujitsu, "DL Data and CRS Transmission for LAA," 3GPP TSG RAN WG1 Meeting #79, R1-144785, Nov. 8, 2014, pp. 1-9, San Francisco, USA.

CMCC, "Discussion on Possible Solutions for LAA," 3GPP TSG RAN WG1 Meeting #79, R1-144940, Nov. 8, 2014, pp. 1-7, San Francisco, USA.

"Discussion on Channel Access Mechanism based on LBT for LAA", 3PP TSG RAN WG1 Meeting #79, RI-145109, San Francisco, USA, Nov. 17-21, 2014.

"Partial subframe for LAA", 3GPP TSG RAN WG1 #82, RI-154150, Beijing, China, Aug. 24-28, 2015.

"Partial subframe for LAA", 3GPP TSG RAN WG1 #82bis, RI-155474, Malmo, Sweden, Oct. 5-9, 2015.

Alcatel-Lucent Shanghai Bell, et al., "LBT Enhancements for Licensed-Assisted Access", 3GPP TSG RAN WG1 Meeting #79, San Francisco, USA, Nov. 17-21, 2014, Nov. 8, 2014, R1-144701.

Nokia Networks, et al., "On Listen Before Talk and Channel Access", 3GPP TSG RAN WG1 Meeting #79, San Francisco, USA, Nov. 17-21, 2014, Nov. 8, 2014, R1-145003.

ZTE, "Frame structure design for LAA considering LBT", 3GPP TSG RAN WG1 Meeting #79, San Francisco, USA, Nov. 17-21, 2014, Nov. 8, 2014, R1-144828.

Korean Examination report dated Jan. 30, 2023, issued in Korean Application No. 10-2017-7021409.

* cited by examiner

FIG. 6

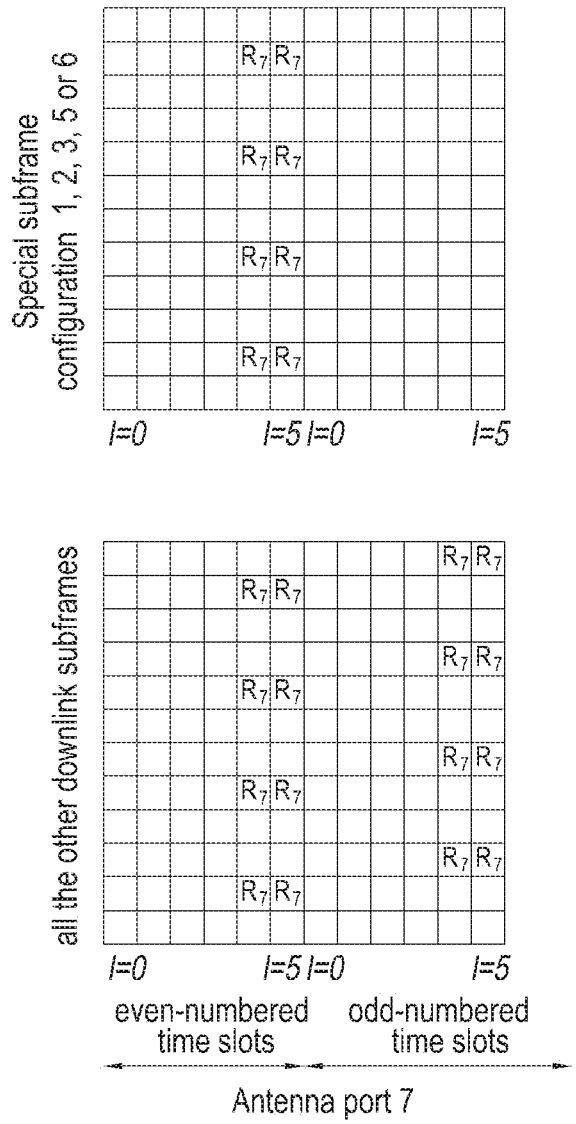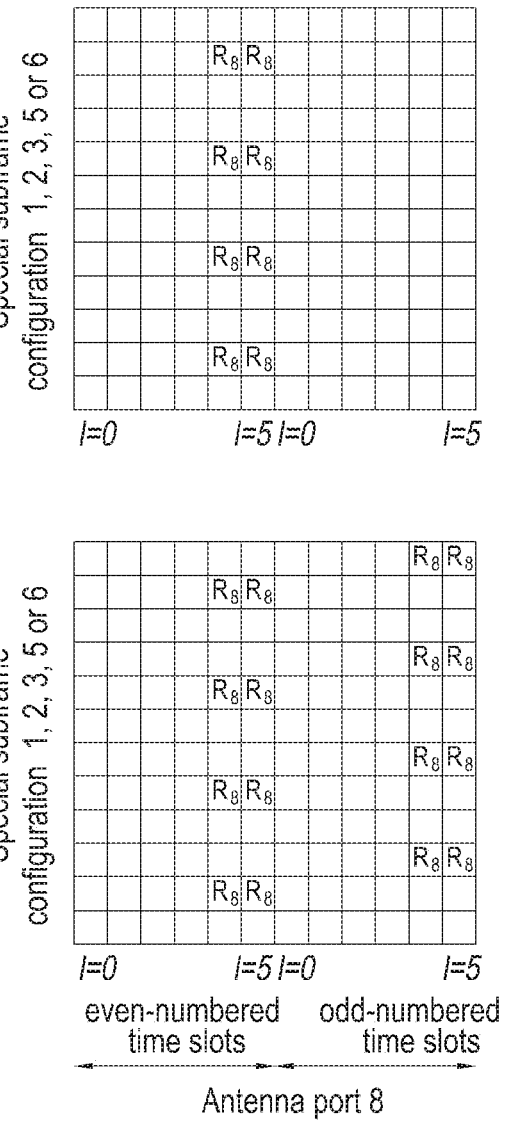
FIG.7

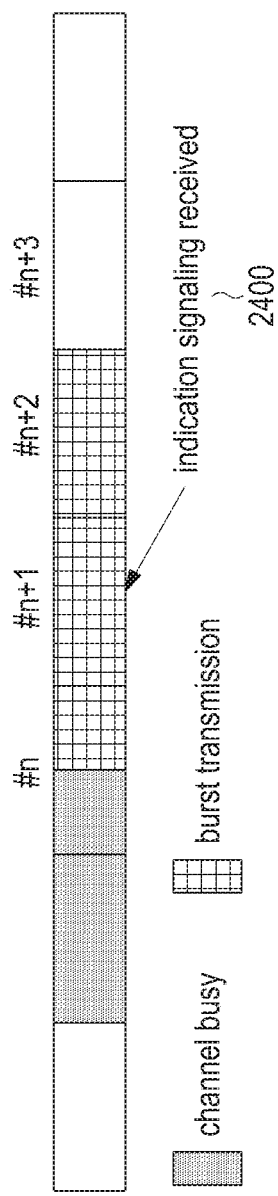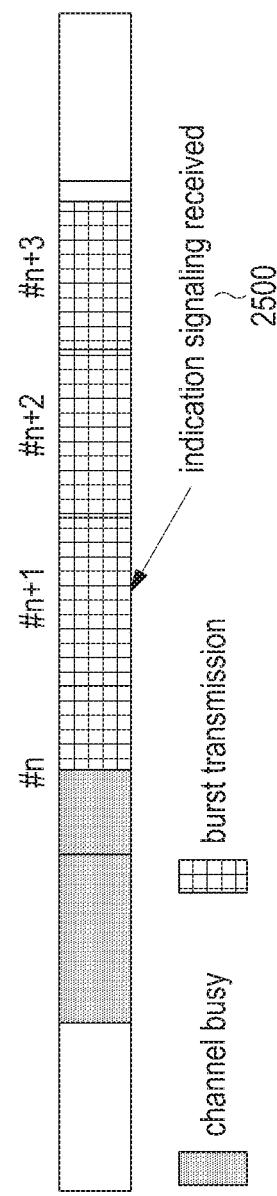

METHOD AND APPARATUS OF RECEIVING DOWNLINK CHANNEL AND/OR DOWNLINK REFERENCE SIGNAL

CROSS-REFERENCE TO RELATED APPLICATION(S)

This application is a continuation application of prior application Ser. No. 15/540,826, filed on Jun. 29, 2017, which is a U.S. National Stage application under 35 U.S.C. § 371 of an International application number PCT/KR2015/014411, filed on Dec. 29, 2015, which is based on and claimed priority of Chinese patent application numbers 201410841641.X filed on Dec. 30, 2014, 201510101185.X filed on Mar. 6, 2015, 201510142839.3 filed on Mar. 27, 2015, 201510207990.0 filed on Apr. 28, 2015, and 201510284633.4 filed on May 28, 2015, in the Chinese Intellectual Property Office, the disclosure of each of which is incorporated by reference herein in its entirety.

TECHNICAL FIELD

The present disclosure relates to wireless communication systems, and particularly to a method and an apparatus of receiving downlink channel and/or downlink reference signal in LTE data transmission on an unlicensed band.

BACKGROUND ART

To meet the demand for wireless data traffic having increased since deployment of 4G (4$^{th}$-Generation) communication systems, efforts have been made to develop an improved 5G (5$^{th}$-Generation) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In long-Term Evolution (LTE) systems, downlink traffic can be scheduled in unit of subframe in the time domain. In a frequency division duplexing (FDD) cell or a time division duplexing (TDD) cell, a downlink subframe having a regular cyclic prefix (CP) includes 14 orthogonal frequency division multiplexing (OFDM) symbols, and a downlink subframe having an extended CP includes 12 OFDM symbols. The first n OFDM symbols in each downlink sub frame can be used for transmitting downlink control information, n is 0, 1, 2, 3 or 4. Downlink control information includes Physical Downlink Control Channel (PDCCH) and other control information. The other OFDM symbols may be used for transmitting Physical Downlink Shared Channel (PDSCH) or enhanced PDCCH (EPDCCH). A special subframe of a TDD cell includes 3 parts, i.e., a downlink pilot time slot (DwPTS), a guard period (GP) and an uplink pilot time slot (UpPTS). Special subframes with different configurations may have different lengths of DwPTS/GP/UpPTS. Configurations may be as shown in Table 1.

In an LTE system, PDCCH and EPDCCH respectively include DCI for allocating uplink channel resources (referred to as UL Grant) and DCI for allocating downlink channel resources (referred to as DL Grant). A UE may receive DL Grant and UL Grant in public search space and UE-specific search space. DL Grant and UL Grant in the public search space can be successfully received by all of UEs, but those in the UE-specific search space can only be successfully received by respective UEs. The downlink channel may include signals in downlink physical channels, such as PDSCH, PDCCH, EPDCCH, or the like. Downlink reference signals may include downlink reference symbols for channel state measurement and downlink reference symbols for demodulation. Downlink reference symbols for channel state measurement may include Cell-specific Reference Signal (CRS), Channel State Information Reference Signal (CSI RS), or the like. Downlink reference symbols for demodulation may include CRS, Demodulation Reference Signal (DM RS) or the like.

Table 1 shows Configurations of TDD special subframe (length of DwPTS/UpPTS/GP).

TABLE 1

| Configurations of special subframe | Downlink is normal CP | | | Downlink is extended CP | | |
|---|---|---|---|---|---|---|
| | | UpPTS | | | UpPTS | |
| | DwPTS | Uplink is normal CP | Uplink is normal CP | DwPTS | Uplink is normal CP | Uplink is normal CP |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In an LTE-advanced (LTE-A) system, multiple component carriers (CC, also referred to as a cell) are aggregated to obtain larger working bandwidth, i.e., carrier aggregation (CA). The aggregated carriers constitute downlink and uplink links in the communication system, therefore larger transmission rates can be obtained. Aggregated CCs may adopt the same duplexing manner, i.e., all of the aggregated CCs may be FDD cells or be TDD cells. Alternatively, the aggregated CCs may adopt different duplexing manners, i.e., the aggregated CCs may include both FDD cells and TDD cells. A base station may configure a UE to work in multiple Cells which include a Primary Cell (Pcell) and multiple Secondary Cells (Scell).

LTE systems need more spectrum resources to meet the requirement of increasing mobile communications services. A possible solution is to deploy LTE systems on unlicensed bands. Unlicensed bands generally have already been allocated for other usages. In order to avoid interference from other LTE devices or devices of other wireless systems in an unlicensed band, an LTE base station may check the channel state before transmitting a signal. If the channel is idle, the LTE base station may start transmitting downlink channel and/or downlink reference signal. In order to enable devices of other wireless systems to have the opportunity to occupy the channel, the LTE base station may check the channel state after transmitting downlink channel and/or downlink reference signal for a period of time, and decide whether to transmit downlink channel and/or downlink reference signal according to the obtained channel state. The maximum length of time that the base station is allowed to continuously transmit downlink channel and/or downlink reference signal and signal sequence for occupying the channel is referred to as a limited maximum transmission duration 101, and the period between transmission start time 105 and transmission end time 110 is referred to as channel occupancy duration, as shown in FIG. 1. FIG. 1 is a schematic diagram illustrating an LTE FDD frame.

If the channel is not idle, the LTE base station may not start transmitting downlink channel and/or downlink reference signal.

DISCLOSURE

Technical Problem

Various examples provide a method and an apparatus of receiving downlink channel and/or downlink reference signal on an unlicensed band, to receive data properly on an unlicensed band.

Technical Solution

A method of receiving downlink channel and/or downlink reference signal on an unlicensed band may include:

receiving, by a long term evolution (LTE) user equipment (UE), control information of a cell operating on an unlicensed band; and receiving downlink channel and/or downlink reference signal transmitted in the cell according to the control information.

In an example, receiving the downlink channel and/or downlink reference signal may include:

determining, by the UE, a duration in which the channel is occupied by the cell according to the control information, receiving the downlink channel and/or downlink reference signal on a portion or all of OFDM symbols that are within a limited maximum transmission duration in the last downlink subframe when the limited maximum transmission duration is up and the end of the last downlink subframe in the channel occupancy does not arrive, and stop receiving the downlink channel and/or downlink reference signal from remaining of the last downlink subframe after the limited maximum transmission duration.

In an example, receiving the downlink channel and/or downlink reference signal may include:

determining, by the UE, a duration in which the channel is occupied by the cell according to the control information; when the limited maximum transmission duration is up and the end of the last downlink subframe in the channel occupancy does not arrive, if a remaining portion of the last downlink subframe that exceeds the limited maximum transmission duration is shorter than or equal to a pre-determined t, receiving the downlink channel and/or downlink reference signal on a remaining portion of the last downlink subframe after the limited maximum transmission duration is up until the end of the last downlink subframe;

if the remaining portion of the last downlink subframe that exceeds the limited maximum transmission duration is longer than t, stopping, by the UE, reception of the downlink channel and/or downlink reference signal in the last downlink subframe; or, receiving, by the UE, the downlink channel and/or downlink reference signal on a portion or all of OFDM symbols that are within the limited maximum transmission duration in the last downlink subframe, and stop receiving the downlink channel and/or downlink reference signal from remaining of the last downlink subframe after the limited maximum transmission duration is up.

In an example, receiving the downlink channel and/or downlink reference signal from a portion or all of OFDM symbols in the last downlink subframe may include:

receiving the downlink channel and/or downlink reference signal from the first n OFDM symbols in the last downlink subframe;

wherein, M is the maximum number of OFDM symbols in the last downlink subframe before the limited maximum transmission duration, the n is a number selected from plural candidate numbers of OFDM symbols in DwPTS of TDD special subframes, and the selected number if smaller than or equal to M and is closest to M among the plural candidate numbers, M is larger than N which is a pre-determined natural number; when M is smaller than or equal to N, n is 0.

In an example, the control information includes a start time when the UE starts receiving the downlink channel and/or downlink reference signal; the start time is determined by the UE using start time indication information transmitted in the cell.

In an example, the start time indication information is transmitted at a fixed position of a downlink subframe within which the start time falls.

In an example, the start time indication information includes an OFDM symbol within which the start time falls; the UE determines a subframe which includes the start time indication information to be the subframe within which the start time falls.

In an example, a downlink subframe and an OFDM symbol within which the start time falls are determined according to the start time indication information;

the downlink subframe within which the start time falls is a downlink subframe in which the start time indication information is transmitted or a previous subframe of the downlink subframe in which the start time indication information is transmitted.

In an example, the start time indication information is specified by DCI information in a downlink subframe in which the start time falls or by DCI information in the next downlink subframe of the downlink subframe in which the start time falls.

In an example, the DCI information is transmitted in a PDCCH; the PDCCH is a PDCCH in a public search space, or the PDCCH is a PDCCH at a pre-determined fixed position, or the PDCCH is a PDCCH configured by higher layer signaling; or the DCI information is transmitted in an EPDCCH; the EPDCCH is an EPDCCH at a pre-determined fixed position, or the EPDCCH is an EPDCCH configured by higher layer signaling.

In an example, the start time indication information is transmitted in a downlink subframe in which the start time falls or in the next downlink subframe of the downlink subframe in which the start time falls.

In an example, the start time indication information includes subframe indication information specifying the downlink subframe in which the start time falls and OFDM symbol indication information specifying the OFDM symbol in which the start time falls; or the start time indication information includes OFDM symbol indication information specifying the downlink subframe and the OFDM symbol in which the start time falls.

In an example, the OFDM symbol indication information specifies the downlink subframe and the OFDM symbol in which the start time falls in the manner of:

if the symbol specified by the OFDM symbol indication information is transmitted later than a start OFDM symbol of PDCCH/EPDCCH or fixed resources which includes the start time indication information, the downlink subframe in which the start time falls is the previous downlink subframe of the downlink subframe which includes the start time indication information; otherwise, the downlink subframe in which the start time falls is the downlink subframe which includes the start time indication information; or if the symbol specified by the OFDM symbol indication information is the first OFDM symbol, the downlink subframe in which the start time falls is the downlink subframe which includes the start time indication information; if the symbol specified by the OFDM symbol indication information is one of the second to fourteenth OFDM symbols, the downlink subframe in which the start time falls is the previous downlink subframe of the downlink subframe which includes the start time indication information; or if the symbol specified by the OFDM symbol indication information is one of the first to fourteenth OFDM symbols, the downlink subframe in which the start time falls is the previous downlink subframe of the downlink subframe which includes the start time indication information; if the symbol specified by the OFDM symbol indication information is the fifteenth OFDM symbol, the downlink subframe in which the start time falls is the downlink subframe which includes the start time indication information, and the OFDM symbol in which the start time falls is the first OFDM symbol.

In an example, the method may also include: if the number of OFDM symbols allowed to be used for receiving PDSCH in a downlink subframe is larger than or equal to N which is pre-determined or configured by higher layer, scheduling the PDSCH in the downlink subframe individually; if the number of OFDM symbols allowed to be used for receiving PDSCH in a downlink subframe is smaller than N, scheduling the PDSCH in the downlink subframe together with PDSCH in another downlink subframe using a PDCCH/EPDCCH.

In an example, receiving the downlink channel and/or downlink reference signal may include:

determining a start time and an end time of receiving the downlink channel and/or downlink reference signal according to the control information, wherein the start time and the end time are both at a boundary of an OFDM symbol.

In an example, the UE may determine the end time is an end boundary of the last OFDM symbol in the last downlink subframe of the channel occupied by the base station on the unlicensed band.

In an example, the UE determines a first OFDM symbol whose start boundary is the start time in the subframe including the start time, and determines a second OFDM symbol whose end boundary is the end time in the subframe including the end time.

In an example, the UE determines the first OFDM symbol and the second OFDM symbol using a cell-specific reference signal or indication information of the cell.

In an example, the UE may determine the end time using the start time.

In an example, determining the start time of receiving the downlink channel and/or downlink reference signal according to the control information may include: receiving, by the UE, DCI information, and determining the start time according to the DCI information;

wherein the DCI information comprises the length or start position of complete OFDM symbols from which the UE receives the downlink channel in the first downlink subframe within the signal transmission duration on the unlicensed band; wherein the complete OFDM symbols from which the UE receives the downlink channel are complete OFDM symbols occupied by all of signals in the first downlink subframe, or are complete OFDM symbols occupied by a specific downlink channel in the first downlink subframe.

In an example, when the signal transmission duration of the base station on the unlicensed band is an integral multiple of a subframe, the UE may determine the end time using the start time by:

if the UE determines the start time is not a boundary of an OFDM symbol by detecting a signal transmitted prior to the first complete OFDM symbol in the first downlink subframe within the signal transmission duration, determining that $M'=14-N'-(n'-1)-1$; if the UE determines the start time is a boundary of an OFDM symbol by detecting a signal transmitted prior to the first complete OFDM symbol in the first downlink subframe within the signal transmission duration, determining that $M'=14-N'-(n'-1)$; or the value of M' specified by signaling is $14-N'-(n'-1)-1$ or $14-N'-(n'-1)$; or $M'=14-N'-(n'-1)-1$; or $M'=14-N'-(n'-1)$;

wherein M' is the number of OFDM symbols from which the downlink channel and/or downlink reference signal is received in the last downlink subframe within the signal transmission duration, N' is the number of OFDM symbols from which the downlink channel and/or downlink reference signal is received in the first downlink subframe within the signal transmission duration, the start boundary of the (n')'th complete OFDM symbol in the first downlink subframe in the signal transmission duration is the start time of the UE receiving the downlink channel and/or downlink reference signal.

In an example, when the signal transmission duration t of the base station on the unlicensed band is or is not an integral multiple of a subframe, the UE may determine the end time using the start time by:

determining a time length/that can be used for signal transmission in the last subframe within the signal transmission duration using the start time, and determining the number M' of OFDM symbols from which the downlink channel and/or downlink reference signal is received in the last downlink subframe within the signal transmission duration using the time length l.

In an example, calculating the l using the start time may include: l=(t−the duration of complete OFDM symbols in the first downlink subframe)mod 1, or l=(t−(the duration of complete OFDM symbols for data transmission in the first downlink subframe+t'))mod 1;

wherein the (the duration of complete OFDM symbols for data transmission in the first downlink subframe+t') is the maximum time occupied by complete OFDM symbols occupied by actually transmitted signal in the first downlink subframe, the t' is configured by higher layer signaling or pre-determined or determined using the number of complete OFDM symbols for downlink data transmission in the first downlink subframe.

In an example, when l=(t−the duration of complete OFDM symbols for data transmission in the first downlink subframe+t') mod 1, the determining t' according to the number of complete OFDM symbols for transmitting downlink data in the first downlink subframe comprises: when $I_1-I_2>=0$, t_sym'=$I_1-I_2$; when $I_1-I_2<0$, t_sym'=Nsym+($I_1-I_2$); calculating t' according to t_sym';

wherein, $I_1$ is the earliest start position of transmission of data channel and/or control channel in the first downlink subframe detected by the UE, $I_2$ is the possible earliest start position where the base station starts signal transmission in the first downlink subframe corresponding to $I_1$, $I_1$ is an element of a start position set $\Psi$ pre-determined or configured by higher layer, Nsym is the number of OFDM symbols in a subframe, and t_sym' is the number of OFDM symbols corresponding to.

In an example, $I_2$ may be determined by:

when a pilot reference signal having more than 0 OFDM symbols is not necessary to be transmitted before transmission of the data channel and/or control channel in the first downlink subframe, the $I_2$ is an element adjacent to and prior to the $I_1$ in the set $\Psi$;

when a pilot reference signal having more than or equal to Lp OFDM symbols is necessary to be transmitted before transmission of the data channel and/or control channel in the first downlink subframe, determining $I_1'$ to be an element adjacent to $I_1$ and prior to $I_1$ in the set $\Psi$; when $I_1'-Lp>=0$, determining that $I_2=(I_1'-Lp)$; when $I_1'-Lp<0$, determining the $I_2$=Nsym+($I_1'-Lp$).

In an example, determining the duration of complete OFDM symbols for data transmission in the first downlink subframe may include:

determining, by the UE, the earliest start position of transmission of data channel and/or control channel in the first downlink subframe through blind detection or by receiving explicit signaling, determining the number of complete OFDM symbols from the start position to the end of the first downlink subframe, and determining the duration of complete OFDM symbols for data transmission data in the first downlink subframe according to the number of OFDM symbols.

In an example, determining by the UE the earliest start position through blind detection may include: determining the earliest start position by detecting the control channel.

In an example, if the number of possible start positions of the PDCCH/EPDCCH in the first downlink subframe is different from the number of possible start positions of PDSCH in the first downlink subframe, or when the possible start positions of the PDCCH/EPDCCH in the first downlink subframe are not in a one-to-one relation with the possible start positions of PDSCH in the first downlink subframe, the UE may detect the start position of PDCCH/EPDCCH, and determine the start position of PDSCH according to an explicit indication in the PDCCH/EPDCCH;

if the number of possible start positions of the PDCCH/EPDCCH in the first downlink subframe equals the number of possible start positions of PDSCH in the first downlink subframe, or when the possible start positions of the PDCCH/EPDCCH in the first downlink subframe are in a one-to-one relation with the possible start positions of PDSCH in the first downlink subframe, the UE may detect the start position of PDCCH/EPDCCH, and determine the start position of PDSCH according to the one-to-one relation.

In an example, when l=(t−(the duration of complete OFDM symbols for data transmission in the first downlink subframe+t')) mod 1, the determining t' according to the number of complete OFDM symbols for transmitting downlink data in the first downlink subframe may include: determining that t_sym'=$I_3-I_2'$; calculating t' according to t_sym';

wherein $I_3$ is a start position of a pre-determined reference signal detected by the UE in the first downlink subframe, $I_2'$ is an element in a start position set pre-determined or configured by higher layer, and $I_2'$ is an element that is closest to $I_3$ and prior to $I_3$ in the set $\Psi$, and t_sym' is the number of OFDM symbols corresponding to t'.

In an example, determining the duration of complete OFDM symbols for data transmission in the first downlink subframe may include:

determining, by the UE, the start position of a UE-identifiable pilot reference signal in the first downlink subframe through blind detection or by receiving explicit signaling, determining the number of complete OFDM symbols from the start position to the end of the first downlink subframe, and determining the duration of complete OFDM symbols for data transmission data in the first downlink subframe according to the number of OFDM symbols.

In an example, calculating M' according to the time length l may include:

if the sum of a duration of an incomplete OFDM symbol at the head of the first downlink subframe in the signal transmission duration and the duration of an incomplete OFDM symbol at the end of the first downlink subframe does not exceed the duration of an OFDM symbol, determining, by the UE, the value of M' according to a pre-determined first relation which associates l with M'; or, when l is shorter than the sum of the duration of half a subframe and the duration of the first OFDM symbol of each time slot, determining that M'=$\lfloor (l-p)/L \rfloor$; when l is longer than or equal to the sum of the duration of half a subframe and the duration of the first OFDM symbol of each time slot, determining that M'=$\lfloor (l-2*p)/L \rfloor$; or, calculating M'=$\lfloor (l-2*p)/L \rfloor$;

if the sum of a duration of an incomplete OFDM symbol at the head of the first downlink subframe in the signal transmission duration and the duration of an incomplete OFDM symbol at the end of the first downlink subframe exceeds the duration of an OFDM symbol, determining, by the UE, the value of M' according to a pre-determined second relation which associates l with M'; or, when l is shorter than the sum of the duration of half a subframe and the duration of the first OFDM symbol of each time slot, determining that M'=($\lfloor$(l−p)/L$\rfloor$; when l is longer than or equal to the sum of the duration of half a subframe and the duration of the first OFDM symbol of each time slot, determining that M'=($\lfloor$l−2*p)/L$\rfloor$; or, calculating M'=($\lfloor$l−2*p)/L$\rfloor$;

wherein, p is the difference between the CP length of the first OFDM symbol in each subframe and the CP length of other OFDM symbols, L is the duration of an OFDM symbol including a CP other than the first OFDM symbol in each subframe.

In an example, calculating M' according to the time length l may include:

determining the value of M' according to the pre-determined second relation which associates l with M'; or when l is shorter than the sum of the duration of half a subframe and the duration of the first OFDM symbol of each time slot, determining that M'=($\lfloor$(l−p)/L$\rfloor$; when l is longer than or equal to the sum of the duration of half a subframe and the duration of the first OFDM symbol of each time slot, determining that M'=($\lfloor$l−2*p)/L$\rfloor$; or calculating M'=($\lfloor$l−2*p)/L$\rfloor$;

wherein, p is the difference between the CP length of the first OFDM symbol in each subframe and the CP length of other OFDM symbols, L is the duration of an OFDM symbol including a CP other than the first OFDM symbol in each subframe.

In an example, calculating M' according to the time length l may include:

determining the value of M' according to the pre-determined first relation which associates l with M'; or when l is shorter than the sum of the duration of half a subframe and the duration of the first OFDM symbol of each time slot, determining that M'=($\lfloor$(l−p)/L$\rfloor$; when l is longer than or equal to the sum of the duration of half a subframe and the duration of the first OFDM symbol of each time slot, determining that M'=($\lfloor$l−2*p)/L$\rfloor$; or calculating M'=($\lfloor$l−2*p)/L$\rfloor$;

wherein, p is the difference between the CP length of the first OFDM symbol in each subframe and the CP length of other OFDM symbols, L is the duration of an OFDM symbol including a CP other than the first OFDM symbol in each subframe.

In an example, if M' is not one of values of the number of OFDM symbols in DwPTS according to TDD special subframe configurations, the method may also include: selecting a value which is the largest one among those smaller than M' from the values of the number of OFDM symbols in DwPTS according to TDD special subframe configurations to be modified M'.

In an example, if a system only allows the number of OFDM symbols transmitted in the last incomplete subframe within the signal transmission duration to be within 1~Nsym, comparing the M' obtained and each element in a set of selectable values of the number of OFDM symbols transmitted in the last incomplete subframe, determining no signal is transmitted in the last subframe if the minimum value of elements in the set $\Omega$ is larger than M', and selecting an element which is the closest to M' and smaller than or equal to M' as the position of the end time.

An apparatus of receiving downlink channel and/or downlink reference signal on an unlicensed band may include: a control information receiving unit and a data and reference signal receiving unit; wherein the control information receiving unit is to receive control information of a cell operating on the unlicensed band; and the data and reference signal receiving unit is to receive downlink channel and/or downlink reference signal transmitted in the cell according to the control information.

It can be seen that, according to various examples, an LTE UE receives control information of a cell operating on an unlicensed band, and receives downlink channel and/or downlink reference signal transmitted in the cell according to the control information.

DESCRIPTION OF DRAWINGS

The above and other aspects, features, and advantages of the present disclosure will be more apparent from the following detailed description when taken in conjunction with the accompanying drawings, in which:

FIG. 6 is a schematic diagram illustrating positions of DM RSs with regular CP corresponding to different TDD special subframe configurations;

FIG. 7 is a schematic diagram illustrating positions of DM RSs with extended CP corresponding to different TDD special subframe configurations;

FIG. 24 is a schematic diagram illustrating duration time in accordance with example five of the present disclosure;

FIG. 25 is a schematic diagram illustrating duration time in accordance with example five of the present disclosure;

MODE FOR INVENTION

Figure 1:
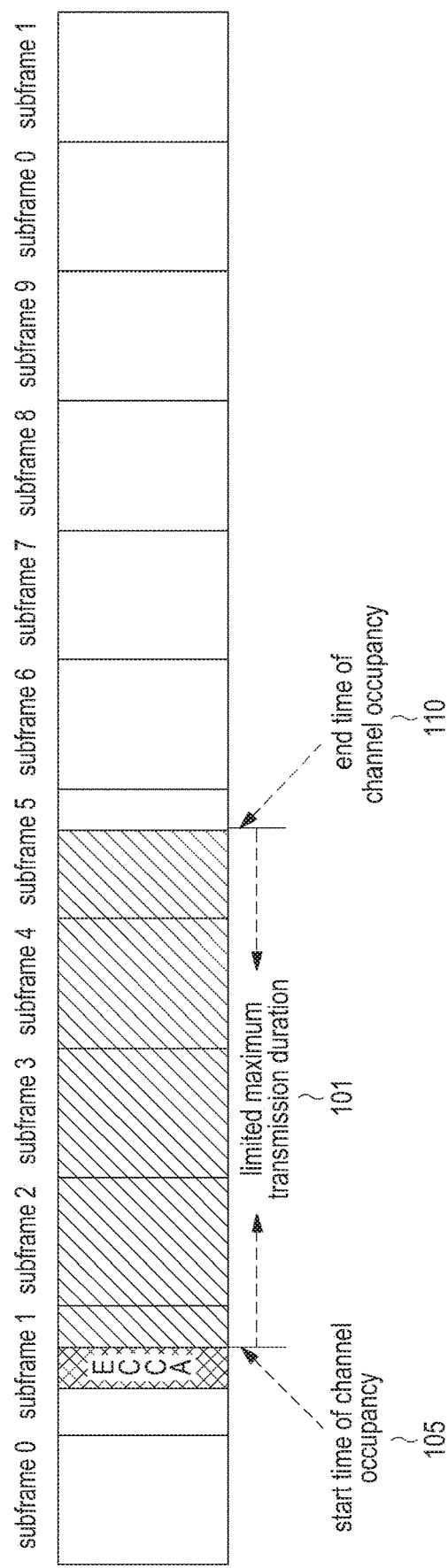
FIG. 1 is a schematic diagram illustrating an LTE FDD frame.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

It is to be noted that some components shown in the drawings are exaggerated, omitted, or schematically illustrated, and the drawn size of each component does not exactly reflect its real size.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a non-transitory computer-readable memory that can direct a computer or other programmable data processing apparatus to function in a particular manner, such that the instructions stored in the non-transitory computer-readable memory produce an article of manufacture including instruction means which implement the function/act specified in the flowchart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide operations for implementing the functions/acts specified in the flowchart and/or block diagram block or blocks.

Furthermore, the respective block diagrams may illustrate parts of modules, segments, or codes including one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

The term "unit", as used herein, means, but is not limited to, a software or hardware component, such as a Field Programmable Gate Array (FPGA) or Application Specific Integrated Circuit (ASIC), which performs certain tasks. A unit may advantageously be configured to reside on a non-transitory addressable storage medium and configured to be executed on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided in the components and units may be combined into fewer components and units or further separated into additional components and units. In addition, the components and units may be implemented such that they execute one or more Central Processing Units (CPUs) in a device or a secure multimedia card.

Embodiments of the present disclosure focus on wireless communication systems based on Orthogonal Frequency Division Multiplexing (OFDM), however, the subject matter of the present disclosure may also be applied to other communication systems and services having similar technical backgrounds and channel forms without largely departing from the scope of the present disclosure according to a determination of those of ordinary skill in the art.

In order to make the objectives, technical schemes and merits of the present invention clearer, a detailed description of the present invention is hereinafter given with reference to specific embodiments.

Figure 3:
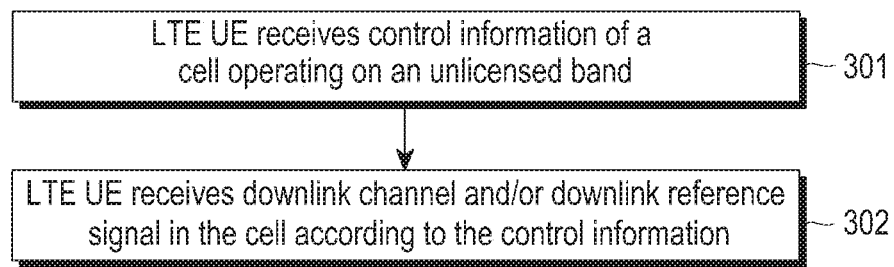
FIG. 3 is a flowchart illustrating a method of receiving downlink channel and/or downlink reference signal in accordance with an example of the present disclosure.

FIG. 3 is a flowchart illustrating a method of an LTE user equipment (UE) receiving downlink channel and/or downlink reference signal in accordance with an example of the present disclosure. The method may include the following procedures.

At block 301, an LTE UE may receive control information of a cell operating on an unlicensed band.

At block 302, the LTE UE may receive downlink channel and/or downlink reference signal of the cell on the unlicensed band according to the received control information of the cell.

Figure 2:
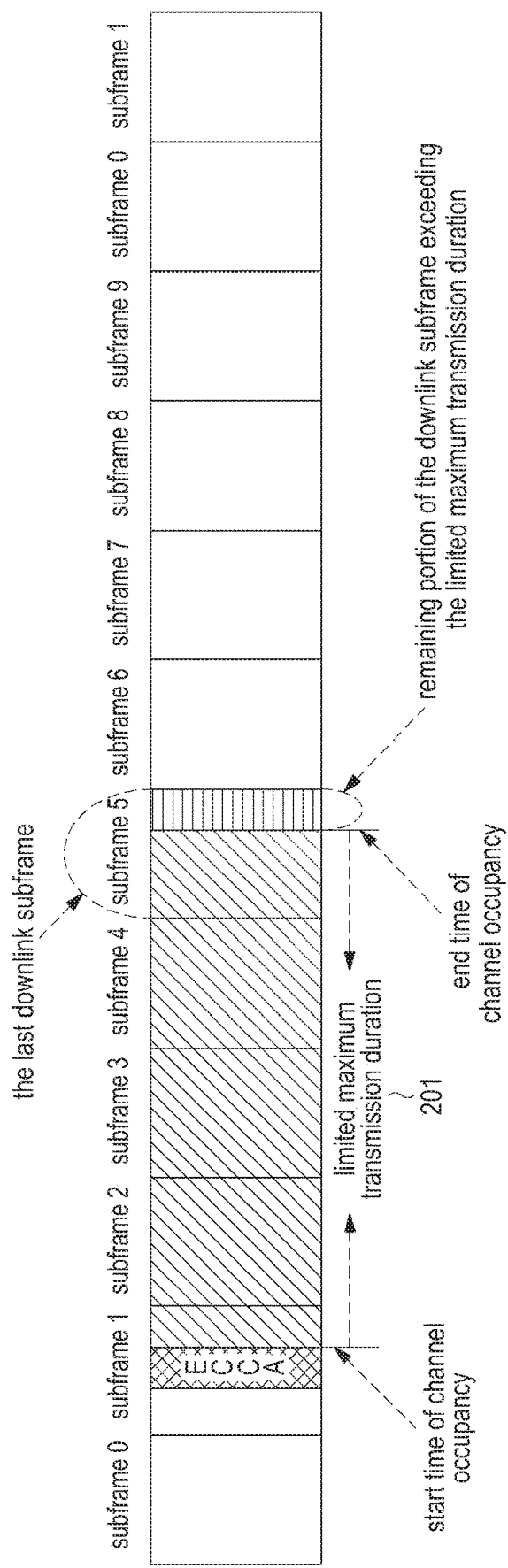
FIG. 2 is a schematic diagram illustrating an LTE TDD frame.

The UE may decide a manner of receiving downlink channel and/or downlink reference signal according to the received control information. An LTE system may adopt a fixed subframe structure, i.e., each subframe lasts 1 ms and has fixed start timing and end timing. Since an LTE base station may determine a channel to be available at any time point and the channel occupancy duration of the LTE system is limited so as to enable other devices to have the opportunity of occupying the channel, there may be the situation where LTE transmission is not completed in the last downlink subframe while the limited maximum transmission duration 201 is up, as shown in FIG. 2. FIG. 2 is a schematic diagram illustrating an LTE TDD frame.

A solution is needed to solve the problem of receiving downlink channel and/or downlink reference signal.

The mechanism of the present disclosure is hereinafter described in detail with reference to the several examples.

Example One

Within each channel occupancy duration, if transmission of the last downlink subframe is not completed when transmission time reaches the limited maximum transmission duration, the method of receiving downlink channel and/or downlink reference signal may be as follows. In this example, it is assumed that a UE has already known the end time of the channel occupancy duration before receiving the last downlink subframe, i.e., the UE knows the number of complete OFDM symbols included in the last downlink subframe before the end time of the channel occupancy duration. For example, the UE may obtain the number of OFDM symbols in the last downlink subframe from public physical layer signaling of a Pcell.

Method One

Figure 4:
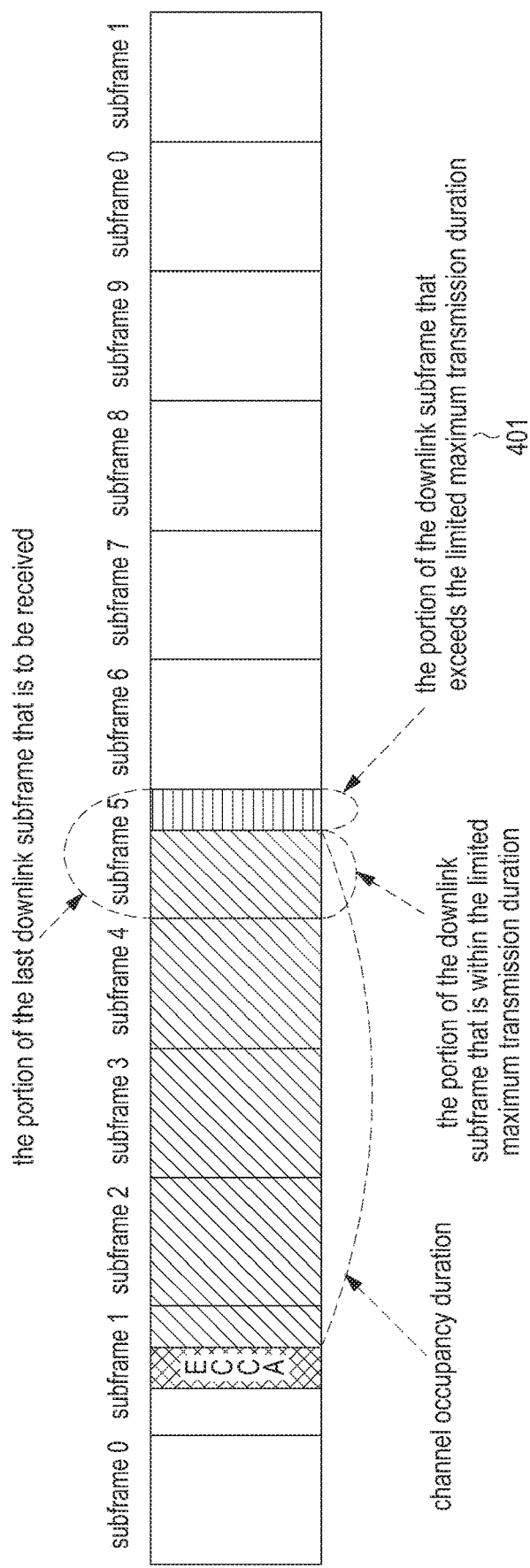
FIG. 4 is a schematic diagram illustrating reception of downlink channel and/or downlink reference signal of method one in accordance with example one of the present disclosure.

The UE may continue to receive downlink channel and/or downlink reference signal from the remaining portion 401 of the downlink subframe that exceeds the limited maximum transmission duration after reception duration of downlink channel and/or downlink reference signal in the last downlink subframe reaches the limited maximum transmission duration until the end of the last downlink subframe, as shown in FIG. 4. FIG. 4 is a schematic diagram illustrating reception of downlink channel and/or downlink reference signal of method one in accordance with example one of the present disclosure. That is, the last downlink subframe is always a complete subframe. This method is easy to implement, and makes less modifications to standards. The method, however, may violate the rule of using unlicensed bands since the base station may continue transmission after the limited maximum transmission duration ends.

Method Two

In this example, a UE may not receive downlink channel and/or downlink reference signal in the incomplete last subframe. This method is easy to implement and does not violate the rule of using unlicensed bands. But an LTE device needs to check the channel state, and can only use an unlicensed band when the channel is detected to be idle. Since the time when the channel is detected to be idle may be any time point within a downlink subframe, it is highly possible the last downlink subframe is incomplete. In addition, since the maximum channel occupancy duration of a UE may be several or a dozen milliseconds, it is very probable that the last downlink subframe is incomplete. Thus, if the UE does not receive any downlink channel and/or downlink reference signal in the incomplete last downlink subframe, some resources may be wasted.

Method Three

Figure 5:
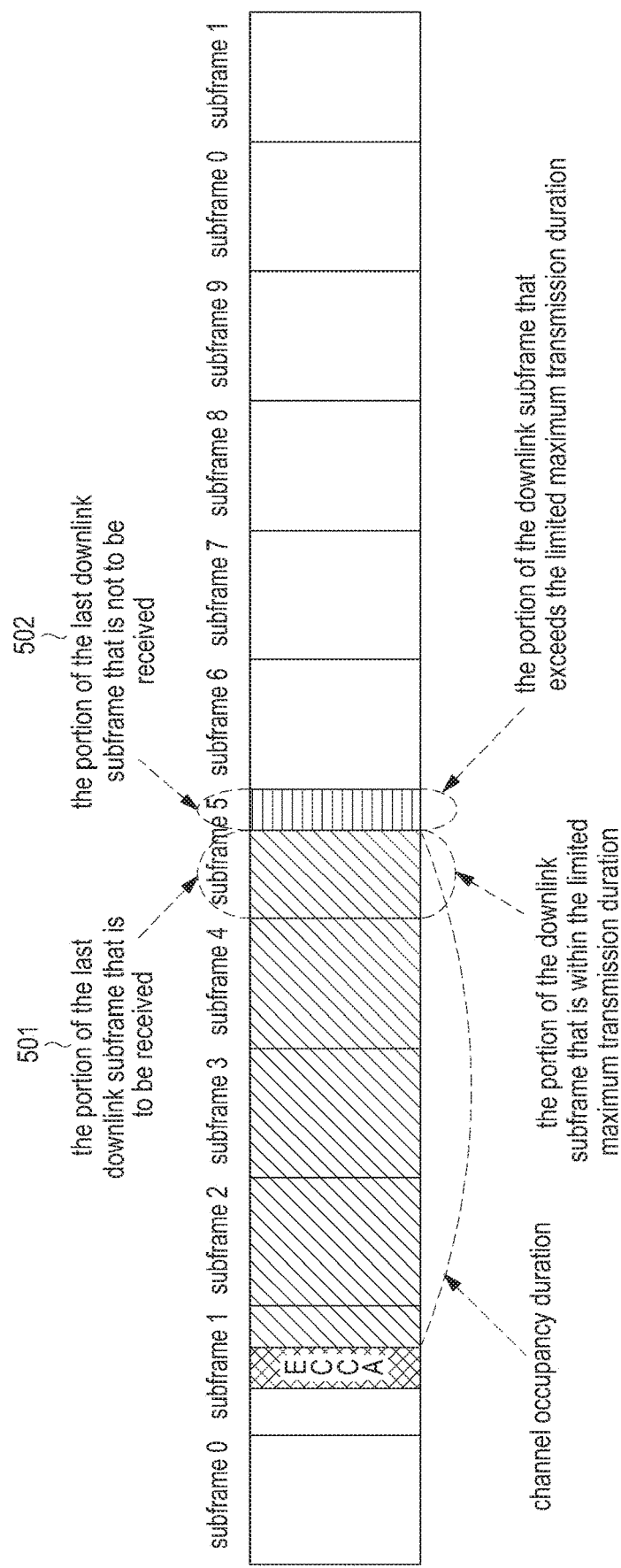
FIG. 5 is a schematic diagram illustrating reception of downlink channel and/or downlink reference signal of method three in accordance with example one of the present disclosure.

A UE may receive downlink channel and/or downlink reference signal from some or all of OFDM symbols 501 in the last downlink subframe before the limited maximum transmission duration ends, and stop receiving downlink channel and/or downlink reference signal from the remaining 502 of the downlink subframe after the limited maximum transmission duration ends, i.e., the UE may perform reception within a portion of a subframe and not perform reception within another portion of the subframe, as shown in FIG. 5. FIG. 5 is a schematic diagram illustrating reception of downlink channel and/or downlink reference signal of method three in accordance with example one of the present disclosure.

Figure 6:
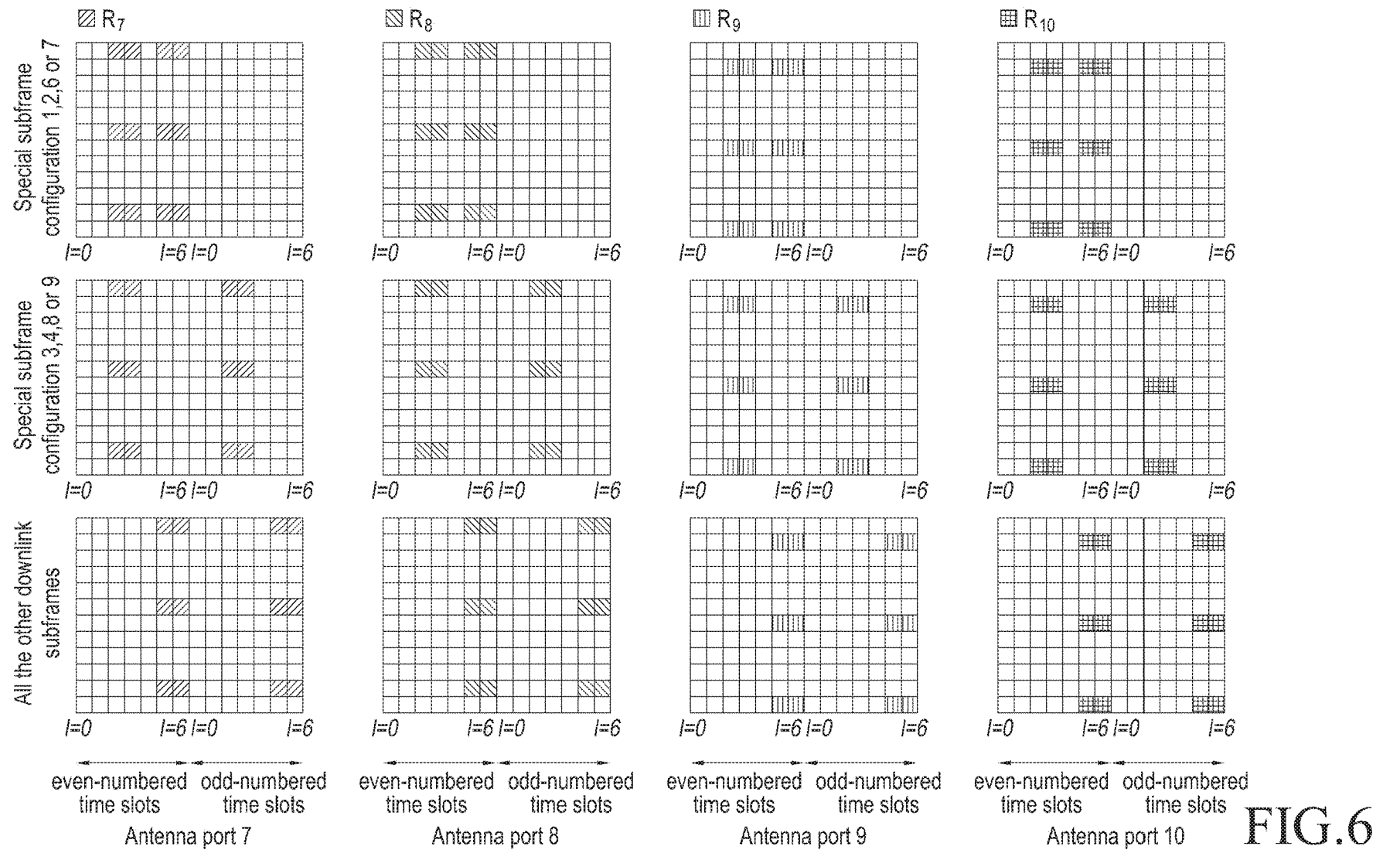

The number of downlink OFDM symbols in a TDD special subframe is a portion of the number of OFDM symbols in a downlink subframe. The subframe structure of a TDD special subframe may be reused for an incomplete downlink subframe on an unlicensed band. The position of DM RS in a TDD special subframe is variable according to the number of available OFDM symbols in the downlink subframe. In a subframe configured with a regular prefix, DM RS positions defined in different TDD special subframe configurations may be as shown in FIG. 6. FIG. 6 is a schematic diagram illustrating positions of DM RSs with regular CP corresponding to different TDD special subframe configurations.

In a subframe configured with an extended prefix, DM RS positions defined in different TDD special subframe configurations may be as shown in FIG. 7. FIG. 7 is a schematic diagram illustrating positions of DM RSs with extended CP corresponding to different TDD special subframe configurations. The position of CRS does not change with the number of available OFDM symbols in a downlink subframe. The following are examples of a method of processing an incomplete downlink subframe in a cell operating on an unlicensed band when a demodulation reference signal is DM RS and CRS respectively.

a: When the demodulation reference signal is DM RS, if transmission of the last downlink subframe stops after the limited maximum transmission duration ends and remaining of the downlink subframe that are not transmitted within the limited maximum transmission duration is not transmitted, i.e., reception of downlink channel and/or downlink reference signal in the subframe is performed on OFDM symbols in the transmitted portion of the downlink subframe. It may be assumed that reception is performed on the first n OFDM symbols of the last downlink subframe. The number n of the OFDM symbols on which downlink channel and/or downlink reference signal is received may be set to be the number of OFDM symbols in DwPTS defined in one of conventional TDD special subframes (i.e., one of the lengths of DwPTS in Table 1) and the number of OFDM symbols in a regular downlink subframe. In an example, the number of OFDM symbols in DwPTS in a TDD special subframe that is smaller or equal to the number M of OFDM symbols in the transmitted portion of the downlink subframe before the transmission ends and that is the closest to M may be selected as the number n of OFDM symbols in downlink channel and/or downlink reference signal to be received. This method makes little modifications to standards, does not need to introduce a new downlink subframe, but may cause certain waste of resources. In another example, the number of OFDM symbols in downlink channel and/or downlink reference signal to be received may be an arbitrary integer smaller or equal to 14, i.e., the number M of OFDM symbols in the downlink subframe before the transmission ends may be determined to be the number n of OFDM symbols in downlink channel and/or downlink reference signal to be received. This method requires modifications to the structure of the conventional TDD special subframe, but can make full use of resources and reduce waste of resources.

In an example, a method of receiving downlink channel and/or downlink reference signal may be as follows.

If the length of the portion of the last downlink subframe that is transmitted before the limited maximum transmission duration ends is larger than or equal to N OFDM symbols, i.e., the number of available OFDM symbols is not less than N, the UE may receive PDSCH, EPDCCH and a reference signal in the downlink subframe. For example, N=6, the TDD special subframe that has the least OFDM symbols has 6 OFDM symbols, or N=4. When N<4, DM RS cannot be obtained unless the position of DM RS is changed.

If the number of available OFDM symbols is the number of OFDM symbols in DwPTS in one of conventional TDD special subframes, data reception may be performed according to the structure of the DM RS of DwPTS in the conventional TDD special subframe. When a UE-specific reference symbol (DMRS) is transmitted, if the number n of transmitted OFDM symbols is 6 (e.g., conventional TDD special subframe configuration 9), or 11 (e.g., conventional TDD special subframe configurations 3 and 8), or 12 (e.g., conventional TDD special subframe configuration 4), and the DM RS adopts the DM RS format of conventional TDD special subframe configurations 3, 4, 8, or 9, the UE may receive downlink channel and/or downlink reference signal according to information that the number of OFDM symbols is 6, or 11, or 12; if the number n of transmitted OFDM symbols is 9 (e.g., conventional TDD special subframe configurations 1 and 6), or 10 (e.g., conventional TDD special subframe configurations 2 and 7), and the DM RS adopts the DM RS format of conventional TDD special subframe configurations 1, 2, 6, 7, the UE may receive downlink channel and/or downlink reference signal according to information that the number of OFDM symbols is 9 or 10.

Conventional TDD special subframe structures do not include downlink subframe structures in which the number of OFDM symbols is 4, 5, 6, 8, 13. When the number M of OFDM symbols in the transmitted portion of the downlink subframe is 4, 5, 6, 8, or 13, conventional subframe structures may be reused, i.e., by reducing the number of used OFDM symbols until the number of OFDM symbols is identical to the number of downlink OFDM symbols of a conventional TDD special subframe configuration, and data reception is performed according to the DM RS structure of DwPTS in the conventional TDD special subframe configuration. If the transmitted portion of the downlink subframe includes 4 or 5 OFDM symbols, i.e., M is 4 or 5, since there is no conventional TDD special subframe structure in which the number of downlink OFDM symbols is less than 6, the UE may not receive downlink channel and/or downlink reference signal, i.e., n=0. If the transmitted portion of the downlink subframe includes 7 or 8 OFDM symbols, i.e., M is 7 or 8, the conventional TDD special subframe structure that has the most approximate number of OFDM symbols to 7 or 8 is the TDD special subframe structure that includes 6 downlink OFDM symbols, i.e., TDD special subframe configuration 9, the UE may adopt the DM RS structure in TDD special subframe configuration 9 for data reception. If the portion of the downlink subframe before transmission ends include 13 OFDM symbols, i.e., M is 13, the TDD special subframe structure that has the most approximate number of OFDM symbols to 13 is the TDD special subframe structure that includes 12 downlink OFDM symbols, i.e., TDD special subframe configuration 4, the UE may adopt the DM RS structure in TDD special subframe configuration 4 for data reception.

In an example, a newly defined subframe structure may be adopted to use all of available OFDM symbols if the number M of OFDM symbols in the transmitted portion of the downlink subframe is 4, 5, 7, 8, or 13. If the number M of OFDM symbols is 4 or 5, a newly defined subframe structure that includes 4 or 5 OFDM symbols and uses the DM RS format of TDD special subframe configuration 3, 4, 8, 9, or 1, 2, 6, 7 may be used. The number of available OFDM symbols may be sent to the UE via signaling so that the UE may receive downlink channel and/or downlink reference signal according to the information that the number of OFDM symbols is 4 or 5. If the number M of OFDM symbols is 7 or 8, a newly defined subframe structure that includes 7 or 8 OFDM symbols and uses the DM RS format of TDD special subframe configuration 1, 2, 6, 7 may be used. The number of available OFDM symbols may be sent to the UE via signaling so that the UE may receive downlink channel and/or downlink reference signal according to the information that the number of OFDM symbols is 7 or 8. If the number M of OFDM symbols is 13, a newly defined subframe structure that includes 13 OFDM symbols and uses the DM RS format of TDD special subframe configuration 3, 4, 8, 9 may be used. The number of available OFDM symbols may be sent to the UE via signaling so that the UE may receive downlink channel and/or downlink reference signal according to the information that the number of OFDM symbols is 13.

In another example, if the number M of OFDM symbols in the transmitted portion of the downlink subframe is 4, 5, 7, 8, or 13, some of the situations may re-use a conventional subframe structure, i.e., reducing the number of OFDM symbols used until the number of OFDM symbols is identical to the number of OFDM symbols in a conventional TDD special subframe configuration; the other situations may use a newly defined subframe structure to use all of available OFDM symbols. When re-using a conventional subframe structure may not remarkable waste resources, the conventional subframe structure may be re-used. When re-using a conventional subframe structure may remarkable waste resources, a newly defined subframe structure may be used. In an example, the total number of newly defined subframe structures and conventional TDD special subframe structures and normal downlink subframe structures may be smaller than or equal to N (e.g., N=8) which may require less bits for indicating the structure used. For example, if the number M of OFDM symbols in the transmitted portion of the last downlink subframe is 4 or 5 or 8, the number of OFDM symbols that may be wasted is 4 or 5 or 2 if no newly defined subframe structure is adopted. In this case, a newly defined subframe structure may be introduced to make use of all available OFDM symbols, so that no resource is wasted. If the number M of OFDM symbols in the transmitted portion of the last downlink subframe is 7 or 13, a conventional subframe structure may be re-used, and only 1 OFDM symbol is wasted. As such, less resources may be wasted. The following is several examples.

When the number M of OFDM symbols is 4 or 5, if no newly defined subframe structure is used, a base station may not transmit downlink data in an example. In another example, a newly defined subframe structure in which the number of available OFDM symbols is 4 or 5 may be used, and the DM RS format of TDD special subframe configuration 3, 4, 8, 9, or 1, 2, 6, 7 may be used. The number of available OFDM symbols may be sent to a UE via signaling, and the UE may receive downlink channel and/or downlink reference signal according to the received information that the number of OFDM symbols is 4 or 5.

When the number M of OFDM symbols is 7 or 8, the base station may use the structure of TDD special subframe configuration 9, and inform the UE of the TDD special subframe configuration 9. The UE may receive the PDSCH, EPDCCH and reference signal according to TDD special subframe configuration 9, i.e., regarding the subframe includes 6 available OFDM symbols. In another example, the base station may use a newly defined subframe structure in which the number of OFDM symbols is 7 or 8, adopt the DM RS format of TDD special subframe configuration 1, 2, 6, 7, and inform the UE of the number of available OFDM symbols via signaling. The UE may receive downlink channel and/or downlink reference signal according to the received information that the number of OFDM symbols is 7 or 8.

When the number M of OFDM symbols is 13, the base station may use the structure of TDD special subframe configuration 4, and inform the UE of the TDD special subframe configuration 4. The UE may receive downlink channel and/or downlink reference signal according to TDD special subframe configuration 4, i.e., regarding the subframe includes 12 available OFDM symbols. In another example, the base station may use a newly defined subframe structure in which the number of OFDM symbols is 13, adopt the DM RS format of TDD special subframe configuration 3, 4, 8, 9, and inform the UE of the number of available OFDM symbols via signaling. The UE may receive downlink channel and/or downlink reference signal according to the received information that the number of OFDM symbols is 13.

If a conventional TDD special subframe structure is adopted in situations where the number of OFDM symbols is 4, 5, 7, 8, 13, processing at the UE is less complex and rate matching may be implemented using a conventional format. In addition, it may save signaling bits for informing the UE of the number of OFDM symbols in the subframe via signaling but may waste resources. For example, if only 6 OFDM symbols are used when there are 8 OFDM symbols, 2 OFDM symbols are wasted. If a newly defined subframe structure is adopted in situations where the number of OFDM symbols is 4, 5, 7, 8, 13, available resources can be fully used and the DM RS structure may re-use the structures defined in one of conventional TDD special subframe configurations, and complexity of the processing at UE is not significantly increased. If a conventional TDD special subframe structure is adopted in some of the situations where the number of OFDM symbols is 4, 5, 7, 8, or 13 and newly defined subframe structures are adopted in the other of the situations where the number of OFDM symbols is 4, 5, 7, 8, or 13, signaling bits can be saved, and waste of resources can be greatly reduced. In an example, the total number of newly defined subframe structures and conventional TDD special subframe structures and normal downlink subframe structures may be smaller than or equal to N' (e.g., N'=8) to reduce the number of bits for indicating the subframe structure adopted.

b: When the demodulation reference signal is CRS, if transmission of the last downlink subframe stops after the limited maximum transmission duration ends and the remaining of the downlink subframe that is not transmitted within the limited maximum transmission duration is not transmitted, reception of downlink channel and/or downlink reference signal in the subframe is performed on some of OFDM symbols in the downlink subframe. It may be assumed that reception is performed on the first n OFDM symbols of the last downlink subframe. The number n of the OFDM symbols on which downlink channel and/or downlink reference signal is received may be the number of OFDM symbols in DwPTS of one of conventional TDD special subframes (i.e., DwPTS lengths in Table 1) and the number of OFDM symbols in a normal downlink subframe, or n may be any integer smaller than or equal to 14. In an example, a method of receiving downlink channel and/or downlink reference signal may be as follows.

If the length of the portion of the last downlink subframe before the limited maximum transmission duration is up is larger than or equal to N OFDM symbols, the UE may receive downlink channel and/or downlink reference signal in the last downlink subframe. For example, N=6, the conventional TDD special subframe that has the least OFDM symbols has 6 OFDM symbols.

Conventional TDD special subframe configurations include 6, 9, 10, 11, or 12 OFDM symbols, i.e., the number of OFDM symbols is 6 (conventional TDD special subframe configuration 9), 11 (conventional TDD special subframe configurations 3 and 8), 12 (conventional TDD special subframe configuration 4), 9 (conventional TDD special subframe configurations 1 and 6), 10 (conventional TDD special subframe configurations 2 and 7). A UE may receive the downlink channel and/or downlink reference signal according to CRS which indicates the number of OFDM symbols is 6, 9, 10, 11 or 12.

Conventional TDD special subframe structures do not include structures that have 4, 5, 7, 8, or 13 OFDM symbols. Thus, if the number M of OFDM symbols is 4, 5, 7, 8, or 13, a conventional subframe structure may be re-used and the number of used OFDM symbols is reduced to the number of OFDM symbols of DwPTS in the conventional TDD special subframe configuration. For example, when the number of available OFDM symbols is 7 or 8, the number of actually used OFDM symbols is 6 which is the number of OFDM symbols of DwPTS in TDD special subframe configuration 9. In another example, a newly defined subframe structure may be introduced to use all of available OFDM symbols. In another example, some of the situations where the number M of OFDM symbols is 4, 5, 7, 8, or 13 may re-use the structure of DwPTS in conventional TDD special subframe configurations, i.e., to reduce the number of used OFDM symbols to the number of OFDM symbols in DwPTD of the conventional TDD special subframe configurations, while the other of the situations may use newly defined subframe structures to use all of the available OFDM symbols. When re-using a conventional subframe structure may not remarkable waste resources, the conventional subframe structure may be re-used. When re-using a conventional subframe structure may remarkable waste resources, a newly defined subframe structure may be used. In an example, the total number of newly defined subframe structures and conventional TDD special subframe structures and normal downlink subframe structures may be smaller than or equal to N' (e.g., N'=8). For example, in situations where the number M of OFDM symbols is 4 or 5 or 8, a newly defined subframe structure may be introduced to use all of available OFDM symbols, while in situations where the M is 7 or 13, one of conventional subframe structures may be re-used, i.e., the number of used OFDM symbols is reduced to the number of OFDM symbols in DwPTS of one of conventional TDD special subframe configurations. The following is several examples.

When M is 4 or 5, if no newly defined subframe structure is used, a base station may not transmit downlink data in an example. In another example, a newly defined subframe structure in which the number of available OFDM symbols is 4 or 5 may be used, and the number of OFDM symbols may be sent to a UE via signaling. The UE may receive downlink channel and/or downlink reference signal according to the received information that the number of OFDM symbols is 4 or 5.

When M is 7 or 8, the base station may use the structure of TDD special subframe configuration 9, and inform the UE of the TDD special subframe configuration 9. The UE may receive downlink channel and/or downlink reference signal according to TDD special subframe configuration 9, i.e., regarding the subframe includes 6 available OFDM symbols. In another example, the base station may use a newly defined subframe structure in which the number of OFDM symbols is 7 or 8, and inform the UE of the number of available OFDM symbols via signaling. The UE may receive downlink channel and/or downlink reference signal according to the received information that the number of OFDM symbols is 7 or 8.

When M is 13, the base station may use the structure of TDD special subframe configuration 4, and inform the UE of the TDD special subframe configuration 4. The UE may receive downlink channel and/or downlink reference signal according to TDD special subframe configuration 4, i.e., regarding the subframe includes 12 available OFDM symbols. In another example, the base station may use a newly defined subframe structure in which the number of OFDM symbols is 13, and inform the UE of the number of available OFDM symbols via signaling. The UE may receive downlink channel and/or downlink reference signal according to the received information that the number of OFDM symbols is 13.

If a conventional TDD special subframe structure is used in situations where the number of OFDM symbols is 4, 5, 7, 8, 13, processing at the UE is less complex and rate matching may be implemented using a conventional format. In addition, it may save signaling bits for informing the UE of the number of OFDM symbols in the subframe via signaling but may waste resources. For example, if only 6 OFDM symbols are used when there are 8 OFDM symbols, 2 OFDM symbols are wasted. If a newly defined subframe structure is used in situations where the number of OFDM symbols is 4, 5, 7, 8, 13, available resources can be fully used and the DM RS structure may re-use the structures defined in one of conventional TDD special subframe configurations, and complexity of the processing at UE is not significantly increased. If a conventional TDD special subframe structure is adopted in some of the situations where M is 4, 5, 7, 8, or 13 and a newly defined subframe structure is adopted in the other of the situations where the number of OFDM symbols is 4, 5, 7, 8, or 13, signaling bits can be saved, and waste of resources can be greatly reduced.

Method 4

If the remaining time of the downlink subframe after transmission time reaches the limited maximum transmission duration is shorter than or equal to t (e.g., the value of t may be 20 us or the duration of a total of W OFDM symbols, the value of W may be set according to the needs), a UE may continue reception in the last downlink subframe after the limited maximum transmission duration until the end of the downlink subframe. Since the portion exceeding the limited maximum transmission duration is very small, there is little influence on the rule of using unlicensed bands. If the remaining time of the downlink subframe after the limited maximum transmission duration is up is longer than t, the UE may stop receiving the remaining portion of the last downlink subframe that exceeds the limited maximum transmission duration. The method of receiving the PDSCH and the reference signal may be similar to method three. In another example, the UE may not receive any downlink channel and/or downlink reference signal if the remaining time of the downlink subframe after the limited maximum transmission duration is longer than t.

Example Two

Since the time when an LTE base station starts occupying a channel may be at a boundary of a downlink subframe or not at a boundary of a downlink subframe, the time may be any time. In order to timely inform a UE of the start time of receiving downlink channel and/or downlink reference signal so that the UE may receive downlink channel and/or downlink reference signal according to the start time, several methods are provided for informing a UE of the start time of receiving downlink channel and/or downlink reference signal.

Method One

In an example, the start time may be sent to the UE via signaling sent in a Pcell, e.g., via a public physical layer signaling in the Pcell. For example, DCI information in PDCCH of format 1C or 1A may be used to inform the UE of the start time of receiving downlink channel and/or downlink reference signal, or inform the UE of the OFDM symbol in a downlink subframe from which the UE may start receiving downlink channel and/or downlink reference signal. That is, the signaling may specify the subframe corresponding to the reception start time, e.g., subframe indication information, and the OFDM symbol in the subframe at which reception of downlink channel and/or downlink reference signal is to be started, i.e., OFDM symbol indication information. The subframe indication information may use N bits to specify the subframe in which reception of downlink channel and/or downlink reference signal is to be started. N may be a positive integer larger than or equal to 1. The value of N may be defined in a standard or configured by higher layer signaling. In an example, N=1 or 2. For example, when N=1, the 1-bit subframe indication information may specify whether the start time is within the subframe from which the subframe indication information is received or within the previous subframe of the subframe from which the subframe indication information is received. For example, when the subframe indication information is "0", the start time may be within the subframe from which the subframe indication information is received. When the subframe indication information is "1", the start time may be within the previous subframe of the subframe from which the subframe indication information is received, as shown in Table 2.

Table 2 shows reception start time of downlink channel and/or downlink reference signal.

TABLE 2

| Value of subframe indication information | The subframe to start receiving downlink channel and/or downlink reference signal |
|---|---|
| 0 | The subframe from which the subframe indication information is received |
| 1 | The previous subframe of the subframe from which the subframe indication information is received |

For example, when N=2, 2-bit subframe indication information may be used to specify the subframe within which the start time is among the subframe from which the subframe indication information is received and three subframes preceding the subframe. When the subframe indication information is "00", the start time may be within the subframe from which the subframe indication information is received. When the subframe indication information is "01", the start time may be within the subframe which is one subframe prior to the subframe from which the subframe indication information is received. When the subframe indication information is "10", the start time may be within a subframe which is two subframes prior to the subframe from which the subframe indication information is received. When the subframe indication information is "11", the start time may be within a subframe which is three subframes prior to the subframe from which the subframe indication information is received, as shown in Table 3.

Table 3 shows start time of receiving downlink channel and/or downlink reference signal.

TABLE 3

| Value of subframe indication information | The subframe to start receiving downlink channel and/or downlink reference signal |
|---|---|
| 00 | The subframe from which the subframe indication information is received |
| 01 | The subframe which is one subframe prior to the subframe from which the subframe indication information is received |
| 10 | The subframe which is two subframes prior to the subframe from which the subframe indication information is received |
| 11 | The subframe which is three subframes prior to the subframe from which the subframe indication information is received |

OFDM symbol indication may use OFDM symbol indication information which includes M bits to specify the OFDM symbol at which reception of downlink channel and/or downlink reference signal is to be started. M is a positive integer larger than or equal to 1. The value of M may be defined in a standard or configured by higher layer signaling. In an example, M=4 or 3. For example, 4-bit OFDM symbol indication information may be used to specify the OFDM symbol at which the reception of downlink channel and/or downlink reference signal may be started. When the value of the OFDM symbol indication information is "0000", the start time is the first OFDM symbol of the subframe. When the value of the OFDM symbol indication information is "0001", the start time is the second OFDM symbol of the subframe. Likewise, when the value of the OFDM symbol indication information is "1101", the start time is the fourteenth OFDM symbol of the subframe, as shown in Table 4.

Table 4 shows Start time of receiving downlink channel and/or downlink reference signal.

TABLE 4

| Value of OFDM symbol indication information | The OFDM symbol to start receiving downlink channel and/or downlink reference signal |
|---|---|
| 0000 | The first OFDM symbol of the subframe |
| 0001 | The second OFDM symbol of the subframe |
| 0010 | The third OFDM symbol of the subframe |
| 0011 | The fourth OFDM symbol of the subframe |
| 0100 | The fifth OFDM symbol of the subframe |
| 0101 | The sixth OFDM symbol of the subframe |
| 0110 | The seventh OFDM symbol of the subframe |
| 0111 | The eighth OFDM symbol of the subframe |
| 1000 | The ninth OFDM symbol of the subframe |
| 1001 | The tenth OFDM symbol of the subframe |
| 1010 | The eleventh OFDM symbol of the subframe |
| 1011 | The twelfth OFDM symbol of the subframe |
| 1100 | The thirteenth OFDM symbol of the subframe |
| 1101 | The fourteenth OFDM symbol of the subframe |
| 1110-1111 | reserved |

For example, 3-bit OFDM symbol indication information may specify the OFDM symbol that is the start time of receiving downlink channel and/or downlink reference signal. Since 3-bit information can differentiate 8 situations and can only specify some of the 14 OFDM symbols instead of each of the 14 OFDM symbols. For example, when the OFDM symbol indication information indicates "000", the start time is the first OFDM symbol in the subframe. When the OFDM symbol indication information indicates "001", the start time is the second OFDM symbol in the subframe. Likewise, when the OFDM symbol indication information indicates "110", the start time is the seventh OFDM symbol of the subframe. When the OFDM symbol indication information indicates "111", the start time is one of the eighth OFDM symbol to the fourteenth OFDM symbol of the subframe, but it is not specified which of the OFDM symbols is the start time, as shown in Table 5.

Table 5 shows start time of receiving downlink channel and/or downlink reference signal.

TABLE 5

| Value of OFDM symbol indication information | The OFDM symbol to start receiving downlink channel and/or downlink reference signal |
|---|---|
| 000 | The first OFDM symbol of the subframe |
| 001 | The second OFDM symbol of the subframe |
| 010 | The third OFDM symbol of the subframe |
| 011 | The fourth OFDM symbol of the subframe |
| 100 | The fifth OFDM symbol of the subframe |
| 101 | The sixth OFDM symbol of the subframe |
| 110 | The seventh OFDM symbol of the subframe |
| 111 | One of the eighth to fourteenth OFDM symbol, and the exact OFDM symbol is not specified |

Figure 8:
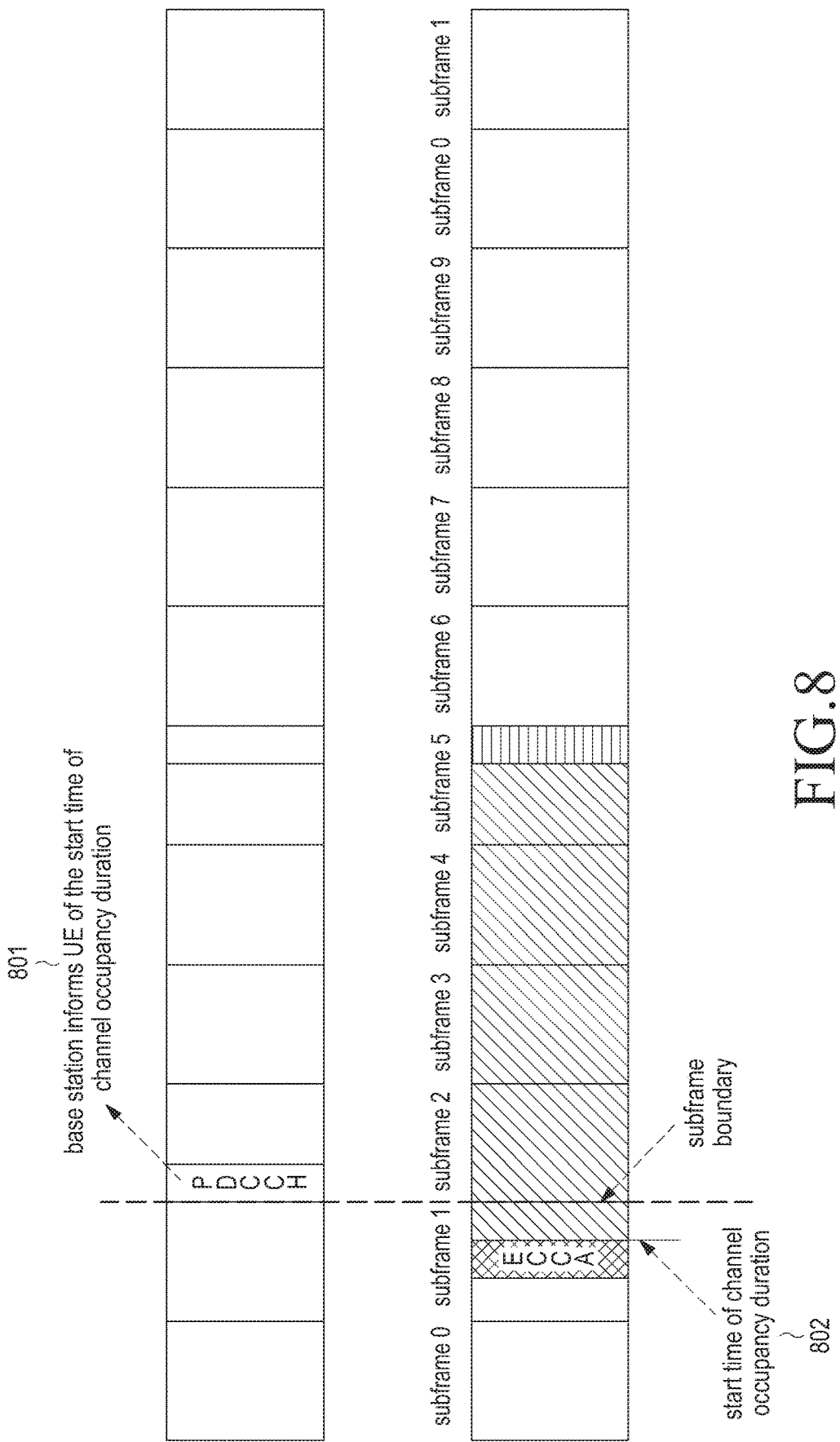
FIG. 8 is a schematic diagram illustrating start time of receiving downlink channel and/or downlink reference signal specified by DCI information in accordance with an example of the present disclosure.

Since PDCCH can only be at the first, second, third or fourth OFDM symbol of a downlink subframe, if the start time of a UE receiving downlink channel and/or downlink reference signal is at an OFDM symbol subsequent to the first, second, third or fourth OFDM symbol, the start time cannot be specified by DCI information in the PDCCH of the Pcell of the current subframe, but be specified by DCI information in PDCCH of the next downlink subframe of the Pcell after the current subframe, and as such, the UE can be informed 801 that the start time 802 of receiving downlink channel and/or downlink reference signal is in a subframe prior to the current subframe, as shown in FIG. 8. FIG. 8 is a schematic diagram illustrating start time of receiving downlink channel and/or downlink reference signal specified by DCI information in accordance with an example of the present disclosure.

Figure 9:
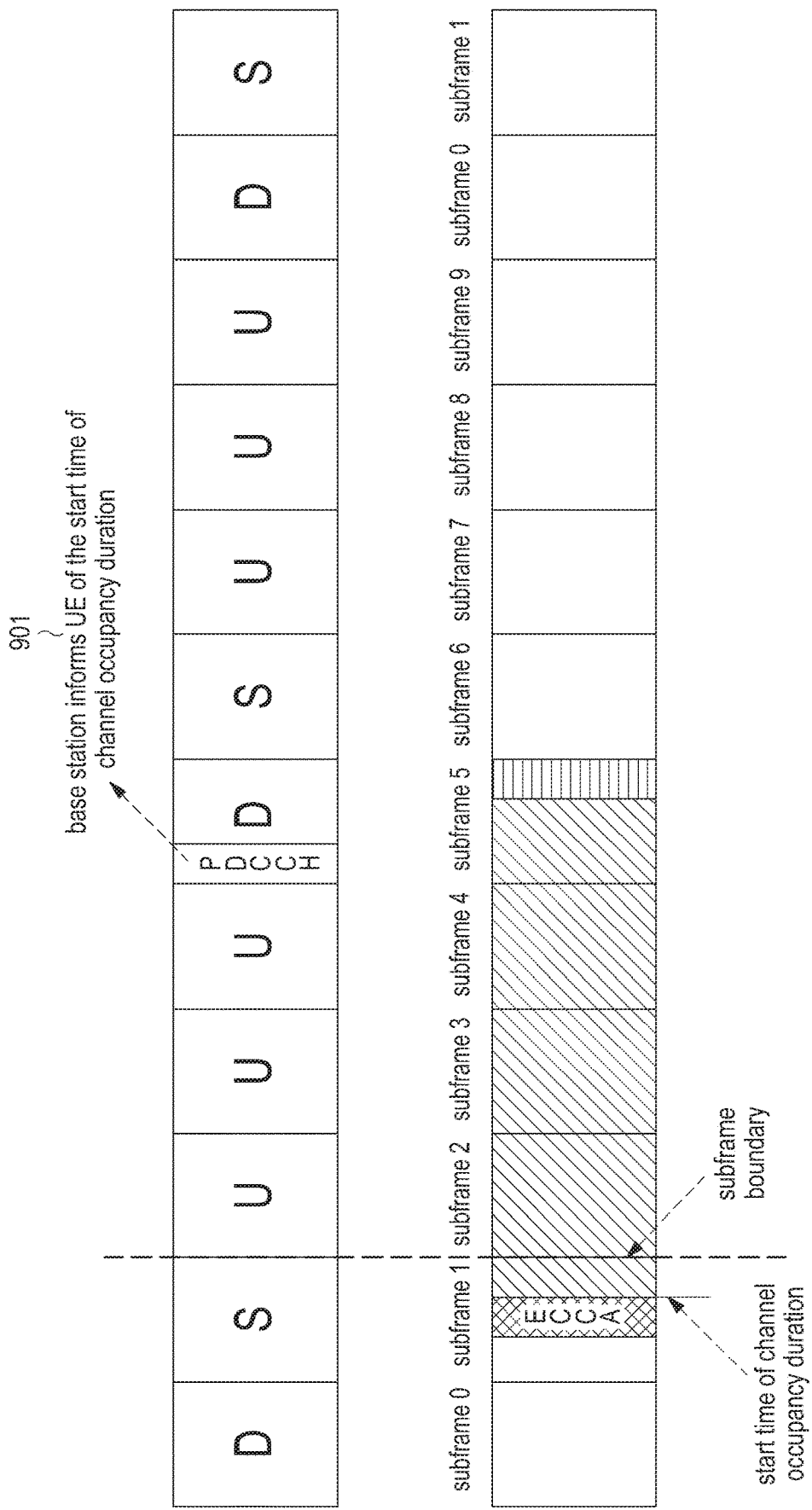
FIG. 9 is a schematic diagram illustrating start time of receiving downlink channel and/or downlink reference signal specified by DCI information in accordance with an example of the present disclosure.

If the Pcell is a TDD cell, the next subframe of the subframe corresponding to the start time of the UE receiving downlink channel and/or downlink reference signal may be an uplink subframe. The start time may be sent to the UE via DCI information in PDCCH in the first downlink subframe of the Pcell after the uplink subframe (901), as shown in FIG. 9. FIG. 9 is a schematic diagram illustrating start time of receiving downlink channel and/or downlink reference signal specified by DCI information in accordance with an example of the present disclosure. As such, the base station has occupied the channel, but the UE cannot timely obtain information about that, thus the UE cannot properly receive downlink channel and/or downlink reference signal.

Method Two

In an example, the start time of a UE receiving downlink channel and/or downlink reference signal may be specified by information transmitted by a cell operating on an unlicensed band. The information is referred to as start time indication information. For example, the start time indication information may be transmitted in DCI information in a downlink subframe where the start time of the UE receiving the downlink channel and/or downlink reference signal falls.

Figure 10:
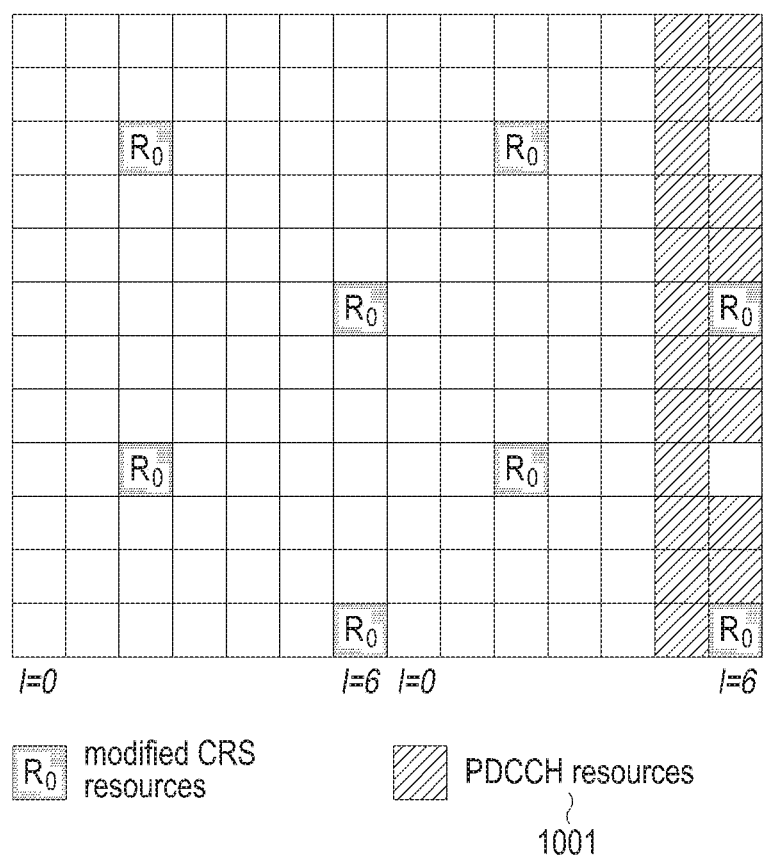
FIG. 10 is a schematic diagram illustrating start time of receiving downlink channel and/or downlink reference signal specified by DCI information in accordance with an example of the present disclosure.

FIG. 10 is a schematic diagram illustrating start time of receiving downlink channel and/or downlink reference signal specified by DCI information in accordance with an example of the present disclosure. As shown in FIG. 10, the DCI information may be transmitted on the last K (K=1, 2, 3, 4) OFDM symbols at the end of the downlink subframe corresponding to the start time. The value of K may be defined in a standard or configured by higher layer signaling. The information may be indicated in PDCCH 1001, e.g., a PDCCH including P (P=1, 2, 4, 8) control channel elements (CCE). The value of P may be defined in a standard or configured by higher layer signaling. The PDCCH may be a PDCCH in a public search space composed of resource element groups (REG) and CCEs in the last K OFDM symbols at the end of the downlink subframe corresponding to the start time.

In another example, the start time may be specified by a PDCCH located at a fixed position among the last K OFDM symbols at the end of the downlink subframe corresponding to the start time at which the UE can start receiving downlink channel and/or downlink reference signal, i.e., the positions of CCEs and REGs forming the CCEs are fixed, e.g., may be defined in a protocol.

In another example, the number of CCEs occupied by the PDCCH and positions of REs forming the CCEs may be configured by higher layer signaling, and no blind detection of PDCCH is to be performed. Conventional PDCCH is transmitted on the first K (K=1, 2, 3, 4) OFDM symbols at the head of the subframe. CCEs composing the PDCCH and REGs composing the CCEs are on the first OFDM symbols at the head of the subframe. In this example, CCEs composing the PDCCH and REGs composing the CCEs are on the last OFDM symbols at the end of the subframe. PDCCH is demodulated using CRS which is at the end of the subframe.

Figure 11:
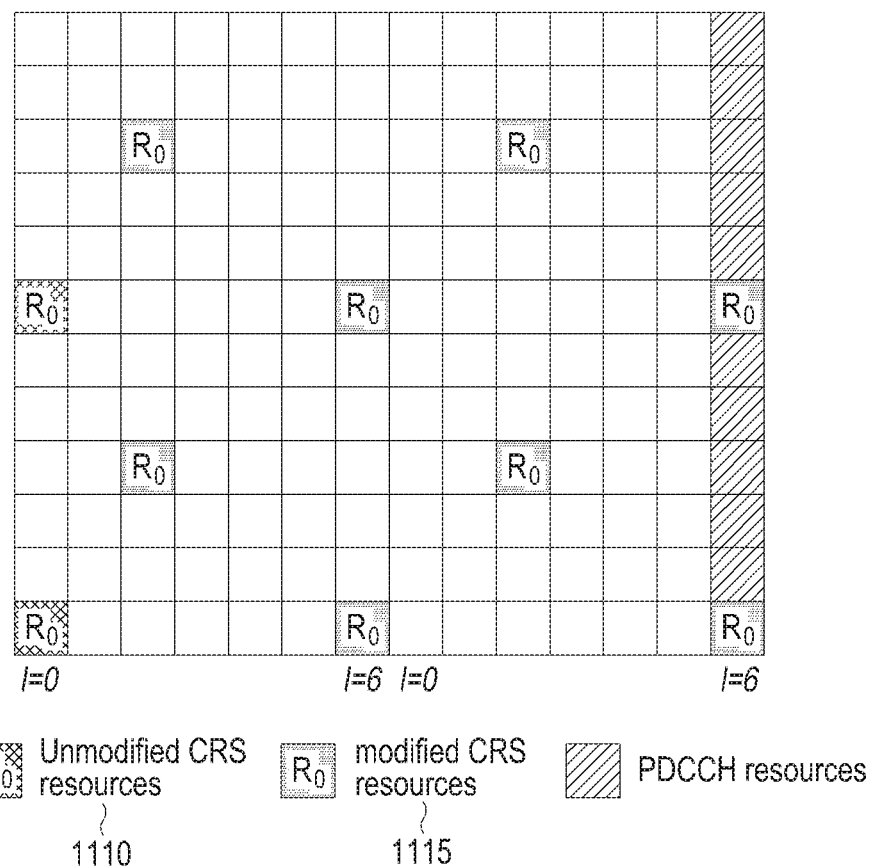
FIG. 11 is a schematic diagram illustrating positions of unmodified CRS resources and positions of modified CRS resources.

FIG. 11 is a schematic diagram illustrating positions of unmodified CRS resources and positions of modified CRS resources. As shown in FIG. 11, when there is only CRS port 0, the UE may receive the CRS from the position of modified CRS resources 1115. The positions of unmodified CRS resources 1110 and positions of modified CRS resources 1115 may be as shown in FIG. 11. When other CRS ports are used, methods adopted may be similar to the above. The start position of modified CRS resources 1115 is changed. Unmodified CRS resources 1110 are arranged starting from the head of the subframe towards the end of the subframe, and modified CRS resources 1115 are arranged from the end of the subframe towards the head of the subframe. As such, CRS has a definite start position.

In an example, the conventional CRS structure, i.e., the CRS at the position of the unmodified CRS resources as shown in FIG. 11 may be adopted. The method can timely inform a UE of the start time of receiving a downlink channel and/or downlink reference signal to enable the UE to successfully receive the downlink channel and/or downlink reference signal. Thus, even if only the last OFDM symbol is complete in the downlink subframe corresponding to the start time of receiving the downlink channel and/or downlink reference signal, the UE can be informed of the start time.

In an example, control information transmitted in resources having a fixed position in the subframe corresponding to the start time may be used for informing the UE of the start time. The control information is the start time indication information. The resources having a fixed position refers to physical resources block pairs having a fixed position in the frequency domain, or OFDM symbols having fixed position in the time domain, e.g., the last 1 or 2 OFDM symbols in 6 physical resource block pairs at the center of the system bandwidth (or all of physical resource block pairs in the whole system bandwidth).

OFDM symbol indication information may use M bits to specify the OFDM symbol at which reception of downlink channel and/or downlink reference signal is to be started. M is a positive integer larger than or equal to 1. The value of M may be defined in a standard or configured by higher layer signaling.

In an example, M may be 4 or 3. For example, 4-bit OFDM symbol indication information may be used to specify the OFDM symbol corresponding to the start time of receiving downlink channel and/or downlink reference signal. When the value of the OFDM symbol indication information is "0000", the start time is the first OFDM symbol of the subframe. When the value of the OFDM symbol indication information is "0001", the start time is the second OFDM symbol of the subframe. Likewise, when the value of the OFDM symbol indication information is "1101", the start time is the fourteenth OFDM symbol of the subframe, as shown in Table 4. For example, 3-bit OFDM symbol indication information may specify the OFDM symbol that is the start time of receiving downlink channel and/or downlink reference signal. Since 3-bit information can only differentiate 8 situations and can only specify situations where the start time is some of the 14 OFDM symbols instead of specifying situations where the start time is each of the 14 OFDM symbols. For example, when the OFDM symbol indication information indicates "000", the start time is the first OFDM symbol in the subframe. When the OFDM symbol indication information indicates "001", the start time is the second OFDM symbol in the subframe. Likewise, when the OFDM symbol indication information indicates "110", the start time is the seventh OFDM symbol of the subframe. When the OFDM symbol indication information indicates "111", the start time is one of the eighth OFDM symbol to the fourteenth OFDM symbol of the subframe, but it is not specified which of the OFDM symbols is the start time, as shown in Table 5.

Method Three:

In an example, the start time of a UE receiving downlink channel and/or downlink reference signal may be specified by information transmitted by a cell operating on an unlicensed band. The information is referred to as start time indication information. In an example, the indication information of the start time that a UE can start receiving downlink channel and/or downlink reference signal may be transmitted via DCI information in the subframe within which the start time falls or the next subframe of the subframe.

The DCI information may be transmitted in a PDCCH. In an example, the PDCCH may be a PDCCH within the public search space. In an example, the PDCCH may be a PDCCH having a fixed position, i.e., the PDCCH may always occupy the same CCEs that are composed of REGs having fixed positions. The fixed position may be defined in a protocol. In another example, the number of CCEs occupied by the PDCCH and positions of REs composing the CCEs may be configured by higher layer signaling, and no blind detection of PDCCH is to be performed.

The DCI information may be sent in an EPDCCH having a fixed position, i.e., the EPDCCH may always occupy the same ECCEs that are composed of EREGs having fixed positions. The fixed position may be defined in a protocol. In another example, the number of ECCEs occupied by the EPDCCH and positions of REs forming the ECCEs may be configured by higher layer signaling, and no blind detection of the EPDCCH is to be performed.

In an example, control information transmitted in resources having a fixed position in the subframe in which the start time falls or in the next subframe of the subframe may be used for informing the UE of the start time when the UE may start to receive downlink channel and/or downlink reference signal. The control information is the start time indication information. The resources having the fixed position refers to physical resources block pairs having a fixed position in the frequency domain, or OFDM symbols having a fixed position in the time domain, e.g., the first 1 or 2 OFDM symbols in 6 physical resource block pairs at the center of the system bandwidth (or all of physical resource block pairs in the whole system bandwidth). The following are four examples of the method of indicating the start time of receiving downlink channel and/or downlink reference signal.

Method 1: An OFDM symbol in a subframe may be indicated to the UE as the start time when the UE may start receiving downlink channel and/or downlink reference signal. That is, subframe indication information may be used to indicate whether the start time is in a subframe from which the subframe indication information is received or in the preceding subframe of the subframe, and OFDM symbol indication information may be used to indicate the OFDM symbol from which to start receiving downlink channel and/or downlink reference signal in the subframe. The subframe indication information may use 1 bit to indicate whether the start time is in the subframe from which the subframe indication information is received or in the preceding subframe of the subframe.

For example, when the value of the subframe indication information is "0", the start time is in the subframe from which the subframe indication information is received; when the value of the subframe indication information is "1", the start time is in the preceding subframe of the subframe from which the subframe indication information is received, as shown in Table 2. OFDM symbol indication information may use M bits to specify the OFDM symbol at which reception of downlink channel and/or downlink reference signal is to be started. M is a positive integer larger than or equal to 1. The value of M may be defined in a standard or configured by higher layer signaling. In an example, M may be 4 or 3.

For example, 4-bit OFDM symbol indication information may be used to specify the OFDM symbol corresponding to the start time of receiving downlink channel and/or downlink reference signal. When the value of the OFDM symbol indication information is "0000", the start time is the first OFDM symbol of the subframe. When the value of the OFDM symbol indication information is "0001", the start time is the second OFDM symbol of the subframe. Likewise, when the value of the OFDM symbol indication information is "1101", the start time is the fourteenth OFDM symbol of the subframe, as shown in Table 4.

For example, 3-bit OFDM symbol indication information may specify the OFDM symbol that is the start time of receiving downlink channel and/or downlink reference signal. Since 3-bit information can only differentiate 8 situations and can only specify situations where the start time is some of the 14 OFDM symbols instead of specifying situations where the start time is each of the 14 OFDM symbols.

For example, when the OFDM symbol indication information indicates "000", the start time is the first OFDM symbol in the subframe. When the OFDM symbol indication information indicates "001", the start time is the second OFDM symbol in the subframe. Likewise, when the OFDM symbol indication information indicates "110", the start time is the seventh OFDM symbol of the subframe. When the OFDM symbol indication information indicates "111", the start time is one of the eighth OFDM symbol to the fourteenth OFDM symbol of the subframe, but it is not specified which of the OFDM symbols is the start time, as shown in Table 5.

Method 2: OFDM symbol indication information may be used to inform a UE of an OFDM symbol in a subframe as the start time when the UE may start receiving downlink channel and/or downlink reference signal. The value of the OFDM symbol indication information may be used to determine whether the start time falls in the subframe from which the subframe indication information is received or in the preceding subframe of the subframe, i.e., a start time specified by some values of the OFDM symbol indication information is within the subframe from which the OFDM symbol indication information is received, and a start time specified by other values of the OFDM symbol indication information is within the preceding subframe of the subframe.

In an example, if the OFDM symbol specified by the OFDM symbol indication information is transmitted later than the first OFDM symbol of the PDCCH/EPDCCH which includes the OFDM symbol indication information, the start time is in the preceding subframe of the subframe from which the OFDM symbol indication information is received; otherwise, the start time is within the subframe from which the OFDM symbol indication information is received. For example, if the OFDM symbol indication information specifies the start time is the fifth OFDM symbol and the EPDCCH starts from the third OFDM symbol, i.e., the start time is later than the start time of the EPDCCH from which the OFDM symbol indication information is received, the subframe in which the start time falls cannot be the subframe in which the EPDCCH including the OFDM symbol indication information is transmitted, and the start time is in the preceding subframe of the subframe in which the EPDCCH is transmitted.

For example, if the OFDM symbol indication information specifies the start time is the first OFDM symbol and the PDCCH occupies the first and second OFDM symbols, i.e., the start time is not later than the start time of the PDCCH from which the OFDM symbol indication information is received, the subframe in which the start time is the subframe in which the PDCCH including the OFDM symbol indication information is transmitted, and the start time is in the subframe in which the PDCCH is transmitted.

For example, 4-bit OFDM symbol indication information may be used to specify the OFDM symbol which is the start time of receiving downlink channel and/or downlink reference signal. If the value of the OFDM symbol indication information is "0000", the start time is the first OFDM symbol in the subframe. If the value of the OFDM symbol indication information is "0001", the start time is the second OFDM symbol in the subframe. Likewise, if the value of the OFDM symbol indication information is "1101", the start time is the fourteenth OFDM symbol in the subframe, as shown in Table 4.

Method 3: The value of the OFDM symbol indication information may be used to determine whether the start time falls in the subframe from which the subframe indication information is received or in the preceding subframe of the subframe, i.e., a start time specified by some values of the OFDM symbol indication information is within the subframe from which the OFDM symbol indication information is received, and a start time specified by other values of the OFDM symbol indication information is within the preceding subframe of the subframe. If the start time specified by the OFDM symbol indication information in a PDCCH or an EPDCCH is the first OFDM symbol, and the subframe in which the start time falls is the subframe from which the PDCCH/EPDCCH including the OFDM symbol indication information is received; otherwise, the subframe is the previous subframe of the subframe including the PDCCH/EPDCCH.

The OFDM symbol indication information may use M bits to specify the OFDM symbol which is the start time of receiving downlink channel and/or downlink reference signal. M is a positive integer larger than or equal to 1. The value of M may be defined in a protocol or configured by higher layer signaling. For example, M=4.

4-bit OFDM symbol indication information may specify the OFDM symbol which is the start time of receiving downlink channel and/or downlink reference signal. If the value of the OFDM symbol indication information is "0000", the start time is the second OFDM symbol of the previous subframe of the subframe from which the PDCCH/EPDCCH including the OFDM symbol indication information is received. If the value of the OFDM symbol indication information is "0001", the start time is the third OFDM symbol of the previous subframe of the subframe from which the PDCCH/EPDCCH including the OFDM symbol indication information is received. Likewise, if the value of the OFDM symbol indication information is "1100", the start time is the fourteenth OFDM symbol of the previous subframe of the subframe from which the PDCCH/EPDCCH including the OFDM symbol indication information is received. If the value of the OFDM symbol indication information is "1101", the start time is the first OFDM symbol of the subframe from which the PDCCH/EPDCCH including the OFDM symbol indication information is received, as shown in Table 6.

In another example, if the value of the OFDM symbol indication information is "0000", the start time is the first OFDM symbol of the subframe from which the PDCCH/EPDCCH including the OFDM symbol indication information is received. If the value of the OFDM symbol indication information is "0001", the start time is the second OFDM symbol of the previous subframe of the subframe from which the PDCCH/EPDCCH including the OFDM symbol indication information is received. If the value of the OFDM symbol indication information is "0010", the start time is the third OFDM symbol of the previous subframe of the subframe. Likewise, if the value of the OFDM symbol indication information is "1101", the start time is the fourteenth OFDM symbol of the previous subframe of the subframe, as shown in Table 7.

Table 6 shows start time of receiving downlink channel and/or downlink reference signal.

TABLE 6

| Value of OFDM symbol indication information | The OFDM symbol to start receiving downlink channel and/or downlink reference signal |
|---|---|
| 0000 | the second OFDM symbol of the previous subframe of the subframe from which the OFDM symbol indication information is received |
| 0001 | the third OFDM symbol of the previous subframe of the subframe from which the OFDM symbol indication information is received |

TABLE 6-continued

| Value of OFDM symbol indication information | The OFDM symbol to start receiving downlink channel and/or downlink reference signal |
|---|---|
| 0010 | the fourth OFDM symbol of the previous subframe of the subframe from which the OFDM symbol indication information is received |
| 0011 | the fifth OFDM symbol of the previous subframe of the subframe from which the OFDM symbol indication information is received |
| 0100 | the sixth OFDM symbol of the previous subframe of the subframe from which the OFDM symbol indication information is received |
| 0101 | the seventh OFDM symbol of the previous subframe of the subframe from which the OFDM symbol indication information is received |
| 0110 | the eighth OFDM symbol of the previous subframe of the subframe from which the OFDM symbol indication information is received |
| 0111 | the ninth OFDM symbol of the previous subframe of the subframe from which the OFDM symbol indication information is received |
| 1000 | the tenth OFDM symbol of the previous subframe of the subframe from which the OFDM symbol indication information is received |
| 1001 | the eleventh OFDM symbol of the previous subframe of the subframe from which the OFDM symbol indication information is received |
| 1010 | the twelfth OFDM symbol of the previous subframe of the subframe from which the OFDM symbol indication information is received |
| 1011 | the thirteenth OFDM symbol of the previous subframe of the subframe from which the OFDM symbol indication information is received |
| 1100 | the fourteenth OFDM symbol of the previous subframe of the subframe from which the OFDM symbol indication information is received |
| 1101 | the first OFDM symbol of the subframe from which the OFDM symbol indication information is received |
| 1110~1111 | reserved |

Table 7 shows start time of receiving downlink channel and/or downlink reference signal.

TABLE 7

| Value of OFDM symbol indication information | The OFDM symbol to start receiving downlink channel and/or downlink reference signal |
|---|---|
| 0000 | the first OFDM symbol of the subframe from which the OFDM symbol indication information is received |
| 0001 | the second OFDM symbol of the previous subframe of the subframe from which the OFDM symbol indication information is received |
| 0010 | the third OFDM symbol of the previous subframe of the subframe from which the OFDM symbol indication information is received |
| 0011 | the fourth OFDM symbol of the previous subframe of the subframe from which the OFDM symbol indication information is received |
| 0100 | the fifth OFDM symbol of the previous subframe of the subframe from which the OFDM symbol indication information is received |
| 0101 | the sixth OFDM symbol of the previous subframe of the subframe from which the OFDM symbol indication information is received |
| 0110 | the seventh OFDM symbol of the previous subframe of the subframe from which the OFDM symbol indication information is received |
| 0111 | the eighth OFDM symbol of the previous subframe of the subframe from which the OFDM symbol indication information is received |
| 1000 | the ninth OFDM symbol of the previous subframe of the subframe from which the OFDM symbol indication information is received |
| 1001 | the tenth OFDM symbol of the previous subframe of the subframe from which the OFDM symbol indication information is received |
| 1010 | the eleventh OFDM symbol of the previous subframe of the subframe from which the OFDM symbol indication information is received |
| 1011 | the twelfth OFDM symbol of the previous subframe of the subframe from which the OFDM symbol indication information is received |
| 1100 | the thirteenth OFDM symbol of the previous subframe of the subframe from which the OFDM symbol indication information is received |
| 1101 | the fourteenth OFDM symbol of the previous subframe of the subframe from which the OFDM symbol indication information is received |
| 1110~1111 | reserved |

Method 4: OFDM symbol indication information may inform a UE of an OFDM symbol in a subframe as the start time when the UE may start receiving downlink channel and/or downlink reference signal. The OFDM symbol indication information may be used to determine whether the start time is in the subframe from which the subframe indication information is received or in the previous subframe of the subframe, i.e., some values of the OFDM symbol indication information may indicate the start time is in the subframe from which the OFDM symbol indication information is received, and other values of the OFDM symbol indication information may indicate the start time is in the previous subframe of the subframe. The OFDM symbol indication information may use M bits to specify the OFDM symbol which is the start time of receiving downlink channel and/or downlink reference signal. M is a positive integer larger than or equal to 1. The value of M may be defined in a protocol or configured by higher layer signaling. For example, M=4.

For example, 4-bit OFDM symbol indication information may specify the OFDM symbol which is the start time of receiving downlink channel and/or downlink reference signal. If the value of the subframe indication information is "0000", the start time is in the first OFDM symbol in the previous subframe of the subframe from which the OFDM symbol indication information is received. If the value of the OFDM symbol indication information is "0001", the start time is the second OFDM symbol in the previous subframe of the subframe from which the OFDM symbol indication information is received. Likewise, if the value of the OFDM symbol indication information is "1101", the start time is the fourteenth OFDM symbol in the previous subframe of the subframe from which the OFDM symbol indication information is received. If the value of the OFDM symbol indication information is "1110", the start time is the first OFDM symbol in the subframe from which the OFDM symbol indication information is received, as shown in Table 8.

Table 8 shows start time of receiving downlink channel and/or downlink reference signal.

TABLE 8

| Value of OFDM symbol indication information | The OFDM symbol to start receiving downlink channel and/or downlink reference signal |
|---|---|
| 0000 | the first OFDM symbol of the previous subframe of the subframe from which the OFDM symbol indication information is received |
| 0001 | the second OFDM symbol of the previous subframe of the subframe from which the OFDM symbol indication information is received |
| 0010 | the third OFDM symbol of the previous subframe of the subframe from which the OFDM symbol indication information is received |
| 0011 | the fourth OFDM symbol of the previous subframe of the subframe from which the OFDM symbol indication information is received |
| 0100 | the fifth OFDM symbol of the previous subframe of the subframe from which the OFDM symbol indication information is received |
| 0101 | the sixth OFDM symbol of the previous subframe of the subframe from which the OFDM symbol indication information is received |
| 0110 | the seventh OFDM symbol of the previous subframe of the subframe from which the OFDM symbol indication information is received |
| 0111 | the eighth OFDM symbol of the previous subframe of the subframe from which the OFDM symbol indication information is received |
| 1000 | the ninth OFDM symbol of the previous subframe of the subframe from which the OFDM symbol indication information is received |
| 1001 | the tenth OFDM symbol of the previous subframe of the subframe from which the OFDM symbol indication information is received |
| 1010 | the eleventh OFDM symbol of the previous subframe of the subframe from which the OFDM symbol indication information is received |
| 1011 | the twelfth OFDM symbol of the previous subframe of the subframe from which the OFDM symbol indication information is received |
| 1100 | the thirteenth OFDM symbol of the previous subframe of the subframe from which the OFDM symbol indication information is received |
| 1101 | the fourteenth OFDM symbol of the previous subframe of the subframe from which the OFDM symbol indication information is received |
| 1110 | the first OFDM symbol of the subframe from which the OFDM symbol indication information is received |
| 1111 | reserved |

Example Three

Since the start time when an LTE base station starts to occupy a channel may be at a boundary of a downlink subframe or any time in a downlink subframe, a UE may start receiving PDSCH from a boundary of a downlink subframe or from any time position of a downlink subframe. In the latter situation, the PDSCH may not be received from all of OFDM symbols of a downlink subframe. In order to facilitate reception of PDSCH and make full use of resources, when the number of OFDM symbols that may be used in receiving PDSCH is larger than or equal to N, PDSCH in the downlink subframe may be scheduled individually, i.e., the downlink subframe may transmit an individual transmission block. The N may be a positive integer larger than or equal to 1. In an example, the value of N may be determined according to a protocol, or configured by higher layer signaling. In another example, the value of N may be determined according to the minimum number of OFDM symbols of a DwPTS defined in conventional TDD special subframe configurations that allow PDSCH transmission, i.e., N=6 which is the number of OFDM symbols in the DwPTS of TDD special subframe configuration 9. For example, when a base station starts to occupy a channel from an OFDM symbol in downlink subframe n, PDSCH in downlink subframe n may be scheduled by PDCCH/EPDCCH in downlink subframe n+1, or may be scheduled by PDCCH/EPDCCH in downlink subframe n. The PDSCH in downlink subframe n and the PDSCH in downlink subframe n+1 may be scheduled by different PDCCH/EPDCCH, and may transmit different transmission blocks. In an example, when a base station ends channel occupancy at an OFDM symbol in downlink subframe n, PDSCH in downlink subframe n and PDSCH in downlink subframe n−1 may be scheduled by different PDCCH/EPDCCH, and may transmit different transmission blocks.

When the number of OFDM symbols that may be used in receiving PDSCH is smaller than N, PDSCH in the downlink subframe and PDSCH in other downlink subframes may be scheduled collectively by one PDCCH/EPDCCH, i.e., the downlink subframe and the other subframes may collaboratively transmit one transmission block. The N may be a positive integer larger than or equal to 1. In an example, the value of N may be determined according to a protocol, or configured by higher layer signaling. In another example, the value of N may be determined according to the minimum number of OFDM symbols of a DwPTS defined in conventional TDD special subframe configurations that allow PDSCH transmission, i.e., N=6 which is the number of OFDM symbols in the DwPTS of TDD special subframe configuration 9. For example, when a base station starts to occupy a channel from an OFDM symbol in downlink subframe n, PDSCH in downlink subframe n may be scheduled by PDCCH/EPDCCH in downlink subframe n+1. The PDSCH in downlink subframe n and the PDSCH in downlink subframe n+1 may be scheduled by the same PDCCH/EPDCCH, and may collaboratively transmit one transmission block. For another example, when a base station ends channel occupancy at an OFDM symbol in downlink subframe n, PDSCH in downlink subframe n and PDSCH in downlink subframe n−1 may be scheduled by the same PDCCH/EPDCCH, and may collaboratively transmit one transmission block.

Example Four

Since the time when an LTE base station starts to occupy a channel may be at a boundary of a downlink subframe or any position in a downlink subframe, a UE may start receiving PDSCH from a boundary of a downlink subframe or from any time position in a downlink subframe. A cell operating on an unlicensed band may avoid non-stop transmission, so that other systems may not be seriously affected. The cell operating on an unlicensed band may perform transmission non-continuously, i.e., the cell may perform transmission for a period and stop to perform channel state detection. If the channel is detected to be idle, transmission may be continued; otherwise, the channel state detection may be performed repeatedly and transmission may not be performed until the channel is detected to be idle. The limited maximum transmission duration of a cell operating on an unlicensed band may be 1 to 13 milliseconds, and may not be integral multiple of milliseconds. For example, when q=4~13, the limited maximum transmission duration may be $(13/32)*q$ milliseconds; when q=4, the limited maximum transmission duration may be $(13/32)*4=1.625$ milliseconds.

According to the above, since the time when an LTE base station starts to occupy a channel may not be at a boundary of a downlink subframe, the time when the LTE base station stops occupying the channel may not be at a boundary of a downlink subframe. Further, the time when an LTE base station starts to occupy a channel may not be at a boundary of an OFDM symbol, and the time when the LTE base station stops occupying the channel may not be at a boundary of an OFDM symbol. In an example, no matter whether the time when an LTE base station starts to occupy a channel is at a boundary of a subframe or an OFDM symbol, a UE may start receiving downlink channel and/or downlink reference signal at a boundary of an OFDM symbol. For example, the time when a UE may start receiving downlink channel and/or downlink reference signal (including a pilot reference signal identifiable by the UE) in the first downlink subframe within a transmission duration of a cell operating on an unlicensed band (i.e., within the duration when the unlicensed band is occupied by the LTE base station) may be obtained by checking a cell-specific reference signal of the cell, or obtained from indication information.

The method of obtaining the start time from the indication information may be implemented according to the following examples.

Method one: the start position of OFDM symbols to be received by a UE in the first downlink subframe may be the earliest start position of complete OFDM symbols occupied by signals in the first downlink subframe. For example, if a PDCCH/EPDCCH that includes $N_1$ complete OFDM symbols and a pilot reference signal (e.g., PSS/SSS) that occupies $N_2$ complete OFDM symbols before the PDCCH/EPDCCH are transmitted in the first downlink subframe, the first OFDM symbol to be received by the UE in the first downlink subframe may be $N_1+N_2$. The base station may specify $N_1+N_2$ or the start position of the pilot reference signal via signaling.

In another example, if the base station transmits a PDCCH/EPDCCH that includes $N_1$ complete OFDM symbols, a pilot reference signal (e.g., PSS/SSS) that occupies $N_2$ complete OFDM symbols before the PDCCH/EPDCCH, and some OFDM symbols for occupying the channel, the base station may specify $N_1+N_2$ or the start position of the pilot reference signal via signaling. In another example, if the base station only transmits a PDCCH/EPDCCH that includes $N_1$ complete OFDM symbols in the first downlink subframe and no signal before the PDCCH/EPDCCH in the subframe, the first OFDM symbol to be received by the UE in the first downlink subframe may be $N_1$. The base station may specify $N_1$ or the start position of the PDCCH/EPDCCH via signaling.

In another example, if the base station only transmits a PDCCH/EPDCCH that includes $N_1$ complete OFDM symbols in the first downlink subframe and some OFDM symbols for occupying the channel before the PDCCH/EPDCCH in the subframe, the first OFDM symbol to be received by the UE in the first downlink subframe may be $N_1$. The base station may specify $N_1$ or the start position of the PDCCH/EPDCCH via signaling. When a set $\Psi$ of possible start positions of the PDCCH/EPDCCH in the first downlink subframe includes one or plural elements, e.g., $\Psi$=As such, the OFDM symbol from which the UE starts to receive downlink channel in the first downlink subframe may be determined according to the number of complete OFDM symbols in the first downlink subframe.

In an example, the number of OFDM symbols to be received in the first downlink subframe may be smaller than or equal to the number of complete OFDM symbols in the first downlink subframe, and may be the largest one in n3 OFDM symbol numbers in the first downlink subframe. Since there is limited number of elements in the set of PDCCH/PDSCH start positions, the UE may determine a unique start position of the PDCCH/PDSCH according to the start positions of all signals.

Method two: the start position of OFDM symbols from which a UE may start to receive downlink channel in the first downlink subframe may be the earliest start position of complete OFDM symbols in the downlink channel in the first downlink subframe, e.g., complete OFDM symbols in the PDCCH/EPDCCH/PDSCH. If the start position is specified by signaling sent by a base station, the signaling may specify the number of complete OFDM symbols occupied by PDCCH/EPDCCH/PDSCH or the start time of the PDCCH/EPDCCH/PDSCH, not specifying a pilot signal.

The end time of receiving downlink channel and/or downlink reference signal in the last downlink subframe within the duration may be obtained as follows. The start time of receiving downlink subframe and/or downlink reference signal in the first downlink subframe and end time of receiving downlink subframe and/or downlink reference signal in the last downlink subframe within the transmission duration may both fall at a boundary of an OFDM symbol.

Method One

The UE may continue to receive the remaining of downlink channel and/or downlink reference signal in the last downlink subframe that exceeds the limited maximum transmission duration after the duration of receiving the downlink channel and/or downlink reference signal in the last downlink subframe reaches the limited maximum transmission duration until the end of the last downlink subframe. That is, the last downlink subframe is always a complete subframe. The end time of a UE receiving downlink channel and/or downlink reference signal is the ending boundary of the last OFDM symbol in the last downlink subframe in the transmission duration. This method is easy in implementation, and requires few modifications to the standards. Since the base station may continue transmission after the limited maximum transmission duration, the method may violate the rule of using unlicensed bands.

Method Two

The start time of receiving downlink subframe and/or downlink reference signal in the first downlink subframe and end time of receiving downlink subframe and/or downlink reference signal in the last downlink subframe within the transmission duration may be obtained individually. In an example, the start time may be determined to be an OFDM symbol in the first subframe according to a detected reference signal transmitted in a cell operating on an unlicensed band or according to indication information. The end time may be determined to be an OFDM symbol in the last subframe according to indication information.

Method Three

Figure 12:
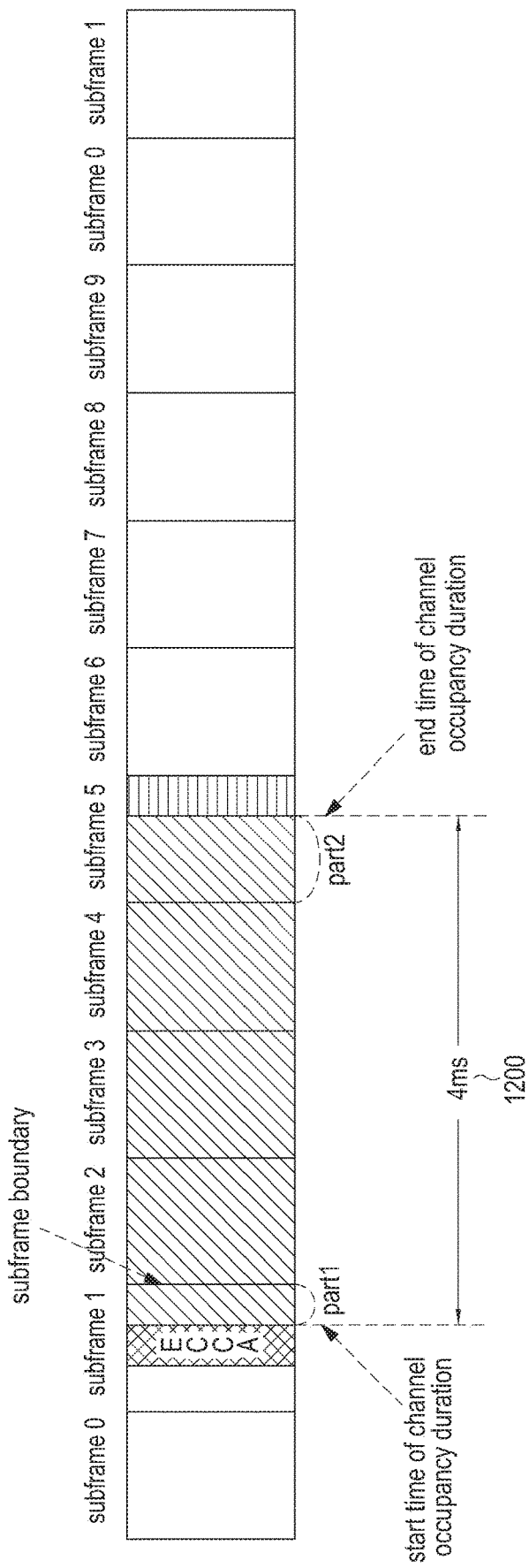
FIG. 12 is a schematic diagram illustrating signal transmission duration of a base station on an unlicensed band.

The end time of a UE receiving downlink channel and/or downlink reference signal in the last downlink subframe may be calculated using the reception start time of the UE in the first downlink subframe in the transmission duration. A base station may start occupying a channel from a boundary of an OFDM symbol or from within an OFDM symbol, and the transmission duration 1200 may not be an integral multiple of the duration of an OFDM symbol, as shown in FIG. 12. FIG. 12 is a schematic diagram illustrating signal transmission duration of a base station on an unlicensed band.

Figure 13:
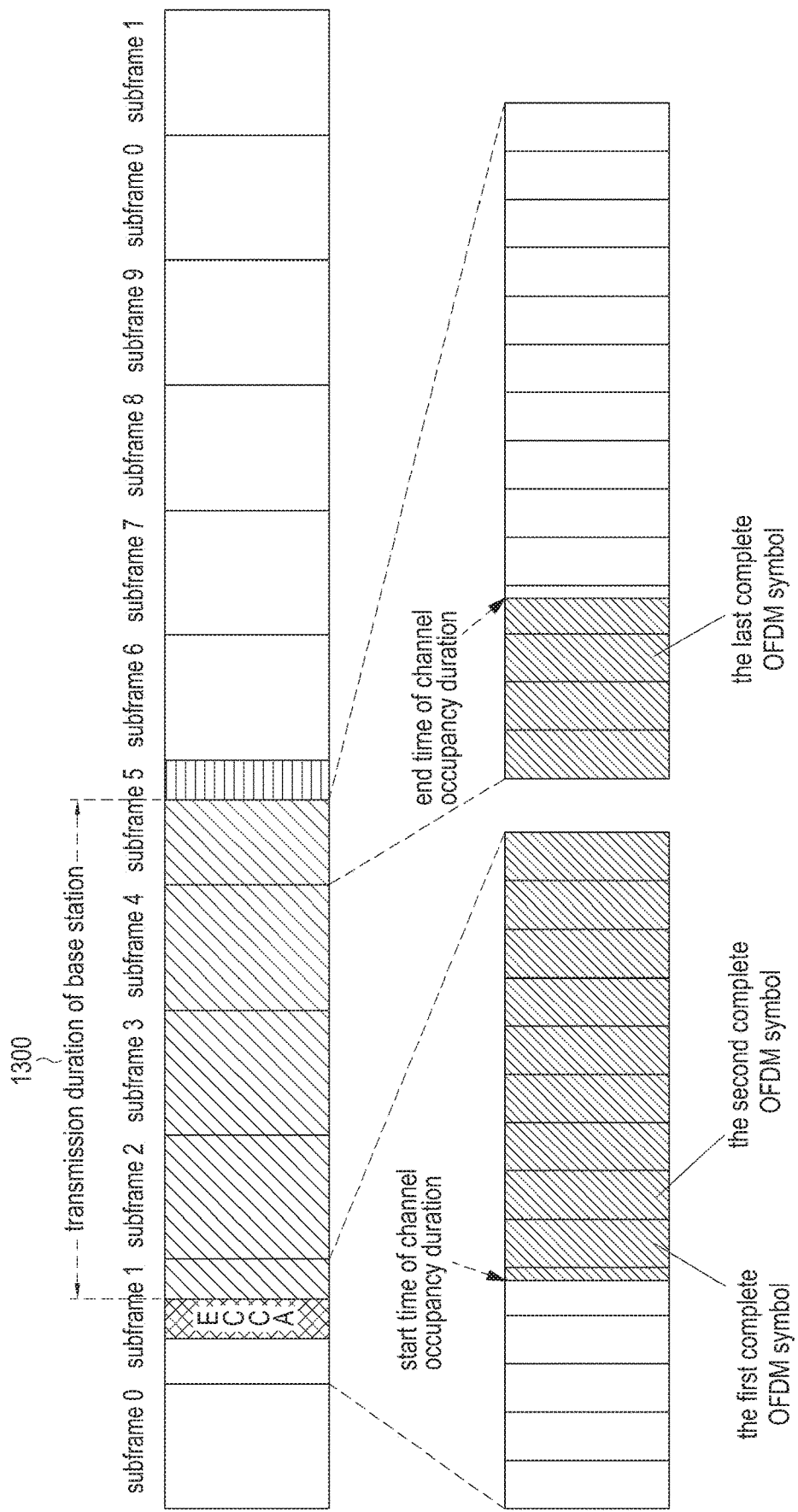
FIG. 13 is a schematic diagram illustrating start time and end time of receiving downlink channel and/or downlink reference signal in accordance with example four of the present disclosure.
Figure 14:
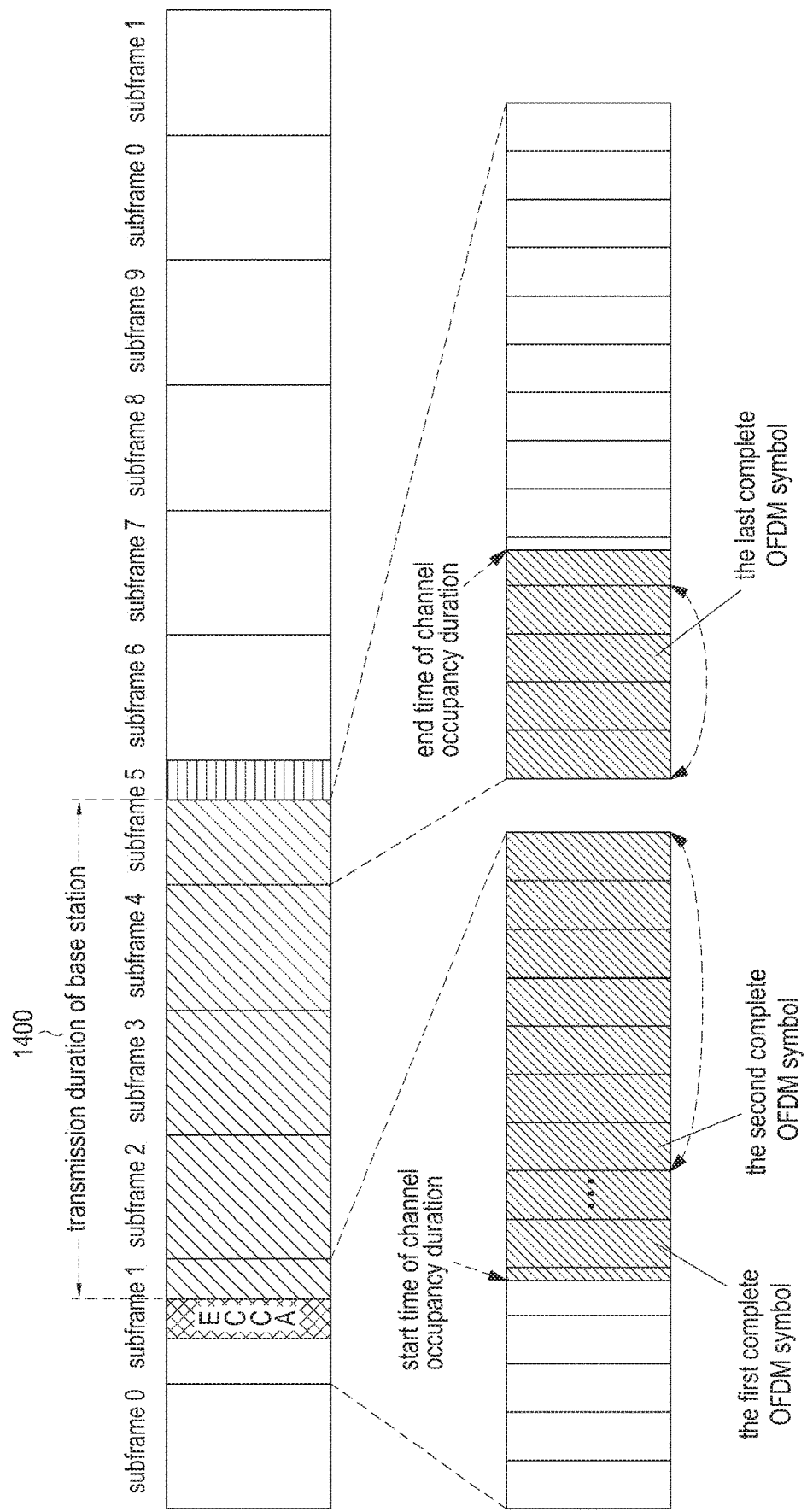
FIG. 14 is a schematic diagram illustrating start time and end time of receiving downlink channel and/or downlink reference signal in accordance with example four of the present disclosure.

In an example, a UE may start receiving downlink channel and/or downlink reference signal from the start of the n'th complete OFDM symbol in the first downlink subframe within the transmission duration 1300, and end the reception at the end of the last complete OFDM symbol in the last downlink subframe within the transmission duration 1300, as shown in FIG. 13. FIG. 13 is a schematic diagram illustrating start time and end time of receiving downlink channel and/or downlink reference signal in accordance with example four of the present disclosure The n' may be a positive integer larger than 1. The value of n' may be defined in a protocol, e.g., n'=1 or 2. Previous n'−1 OFDM symbols before the n'th OFDM symbol may be for other usage. For example, if n'=1, there is no previous complete OFDM symbol for other usage. It may be assumed that the number of OFDM symbols of the downlink channel and/or downlink reference signal received by the UE in the first downlink subframe within the transmission duration 1400 is N', and the number of OFDM symbols of the downlink channel and/or downlink reference signal received by the UE in the last downlink subframe within the transmission duration 1400 is M', as shown in FIG. 14. FIG. 14 is a schematic diagram illustrating start time and end time of receiving downlink channel and/or downlink reference signal in accordance with example four of the present disclosure N' may be obtained from detected reference symbols sent by the cell operating on the unlicensed band or from indication information (as in the above two methods using signaling). The UE may determine the value of M' according to the following methods, and thus determine the end time of receiving downlink channel and/or downlink reference signal. It may be assumed that the transmission duration is t milliseconds, t may be a positive integer, i.e., the transmission duration is an integral multiple of the duration of a subframe, e.g., t may be 10 milliseconds. In another example, t may be a decimal, i.e., the transmission duration may not be an integral multiple of the duration of a subframe, and may even not be an integral multiple of the duration of an OFDM symbol.

Supposing t is an integral multiple of the duration of a subframe, M' may be obtained according to the following methods.

Method 1: A UE may determine M' by detecting a signal before the first complete OFDM symbol in the first downlink subframe in the duration. For example, if a signal is detected by the UE before the first complete OFDM symbol in the first downlink subframe, the time when the base station starts occupying the channel may not be at a boundary of an OFDM symbol in a downlink subframe, and M' may be M'=14−N'−(n'−1)−1. If no signal is detected before the first complete OFDM symbol in the first downlink subframe, the time when the base station starts occupying the channel may be at a boundary of an OFDM symbol in a downlink subframe, and M' may be 14−N'−(n'−1). In an example, a relation between M' and N' may be specified by 1-bit signaling. For example, if the value specified by the signaling is "0", M' may be 14−N'−(n'−1)−1; if the value specified by the signaling is "1", M' may be 14−N'−(n'−1).

Method 2: No matter whether the time when an LTE base station starts to occupy the channel is from a boundary of an OFDM symbol in a downlink subframe or not, it may be prudent to regard the start time is not at a boundary of an OFDM symbol in a downlink subframe, i.e., 14−N'−(n'−1)−1, thus no addition signaling or UE detection is needed.

Figure 15:
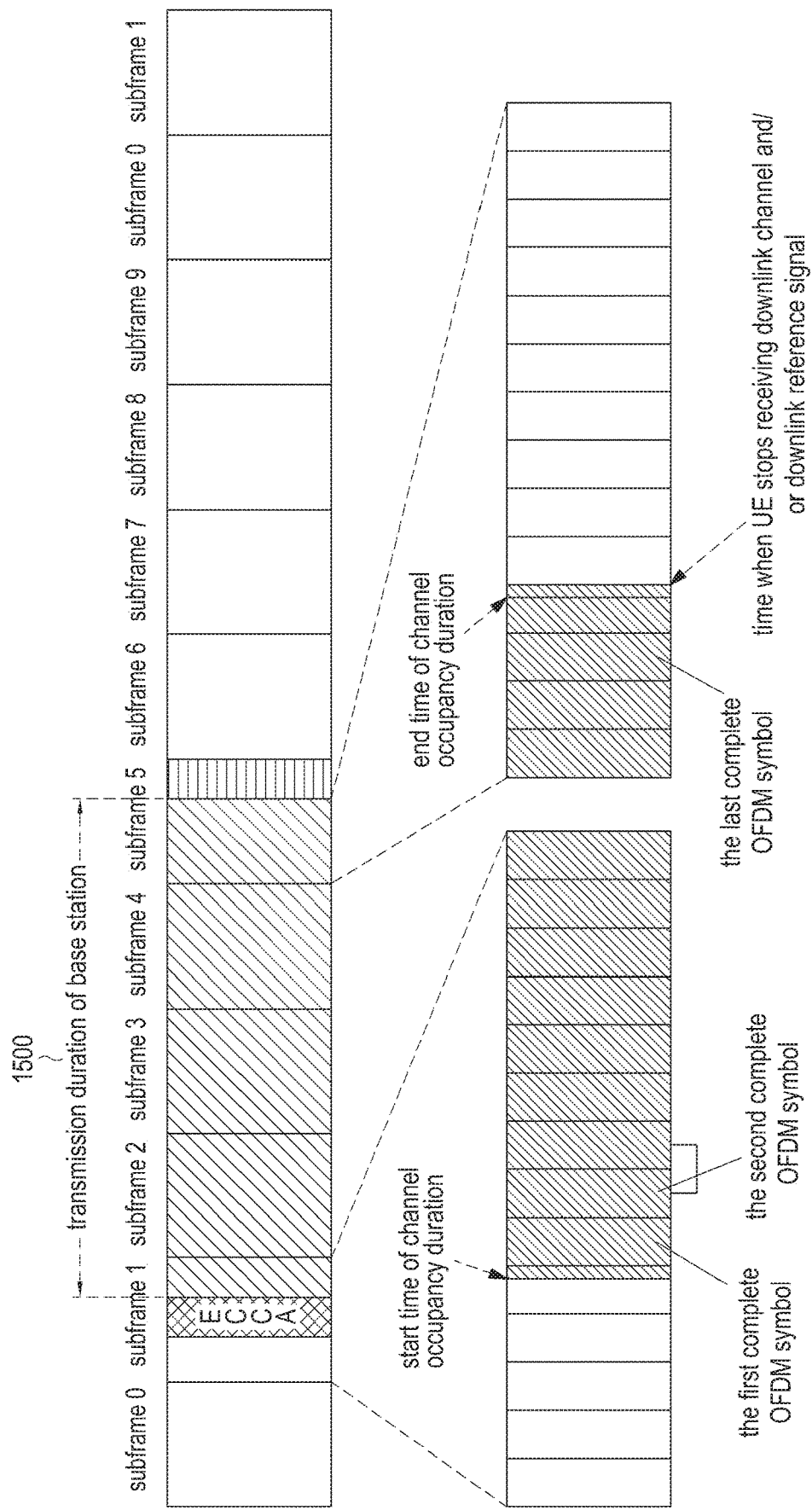
FIG. 15 is a schematic diagram illustrating start time and end time of receiving downlink channel and/or downlink reference signal in accordance with example four of the present disclosure.

Method 3: No matter whether the time when an LTE base station starts to occupy the channel is from a boundary of an OFDM symbol in a downlink subframe or not, it may be defined M'=14−N'−(n'−1), i.e., if the start time of channel occupancy is at a boundary of an OFDM symbol in a downlink subframe, the UE may stop receiving downlink channel and/or downlink reference signal in the last downlink subframe within the transmission duration 1500 after the limited maximum transmission duration ends. If the start time of channel occupancy is not at a boundary of an OFDM symbol in a downlink subframe, the UE may continue receiving the downlink subframe and/or downlink reference signal in the remaining of the OFDM symbol that exceeds the limited maximum transmission duration in the last downlink subframe within the transmission duration 1500 until the boundary of the OFDM symbol, as shown in FIG. 15. FIG. 15 is a schematic diagram illustrating start time and end time of receiving downlink channel and/or downlink reference signal in accordance with example four of the present disclosure. According to this method, the UE does not need additional signaling, and does not have to perform detection.

Method 4: If the M' obtained according to method 1, 2 or 3 is the number of OFDM symbols in DwPTS defined in one of TDD special subframe configurations, the M' of this method is the M' obtained according to method 1, 2 or 3. If the M' obtained according to method 1, 2 or 3 is not the number of OFDM symbols in DwPTS defined in one of TDD special subframe configurations, the M' of this method may be the number of OFDM symbols in DwPTS defined in one of TDD special subframe configurations, and the number of OFDM symbols in DwPTS defined in the TDD special subframe configuration may be smaller than the M' obtained according to method 1, 2 or 3, and is the largest number of OFDM symbols as defined in the TDD special subframe configurations smaller than the M' obtained according to method 1, 2 or 3. The TDD special subframe configurations may be the TDD special subframe configurations 0, 1, 2, 3, 4, 5, 6, 7, 8, 9 as shown in Table 1, or the TDD special subframe configurations 1, 2, 3, 4, 6, 7, 8, 9 as shown in Table 1.

If t is not an integral multiple of the duration of a subframe or t is an integral multiple of the duration of a subframe, M' may be obtained according to the following examples.

Method 1'

M' may be specified by 1-bit signaling. When the signal specifies a pre-determined value (e.g., "0"), it indicates the sum of the duration of an incomplete OFDM symbol in the first downlink subframe within the transmission duration and the duration of an incomplete OFDM symbol in the last downlink subframe within the transmission duration may not exceed the duration of an OFDM symbol. The incomplete OFDM symbol refers to the portion within the transmission duration of an OFDM symbol. In this case, M' may be determined according to the following methods.

In an example, the sum of the duration of an incomplete OFDM symbol in the first downlink subframe within the transmission duration and the duration of an incomplete OFDM symbol in the last downlink subframe within the transmission duration may be calculated according to l=(t−the duration of complete OFDM symbols in the first downlink subframe)mod 1. The value of M' may be determined according to a pre-determined first relation which associates the value of l and a value of M'. For example, Table 9 may be searched to obtain the value of M'.

In another example, l=(t−the duration of complete OFDM symbols in the first downlink subframe)mod 1 may be calculated. If l is smaller than the sum of a half the duration of a subframe and the duration of the first OFDM symbol in each time slot, i.e., $0.5+(160+2048)/(30.72*10e3)=0.571875$, $M'=\lfloor (l-p)/L \rfloor$. The p is the difference between the CP length in the first OFDM symbol in each subframe and the CP length in other OFDM symbols, i.e., (160−144)/

(30.72*10e3)=0.00052 milliseconds. The L is the duration of an OFDM symbol other than the first OFDM symbol in the each subframe (including the length of CP). The value of L may be (2048+144)/(30.72*10e3)=0.07135. When l is larger than or equal to 0.571875, M'=($\lfloor$(l−2*p)/L$\rfloor$. In another example, l=(t−the duration of complete OFDM symbols in the first downlink subframe)mod 1 may be calculated, and the value of M' may always be M'=($\lfloor$(l−2*p)/L$\rfloor$ no matter what is the value of l.

Table 9 shows the number of OFDM symbols in the last downlink subframe.

TABLE 9

| The range of l = (t − the duration of complete OFDM symbols in the first downlink subframe)mod 1 (milliseconds) | The number of OFDM symbols in the last downlink subframe (M') |
| --- | --- |
| 71.875 ≤ l < 143.23 | 1 |
| 143.23 ≤ l < 214.58 | 2 |
| 214.58 ≤ l < 285.94 | 3 |
| 285.94 ≤ l < 357.29 | 4 |
| 357.29 ≤ l < 428.65 | 5 |
| 428.65 ≤ l < 500 | 6 |
| 500 ≤ l < 571.875 | 7 |
| 571.875 ≤ l < 643.23 | 8 |
| 643.23 ≤ l < 714.58 | 9 |
| 714.58 ≤ l < 785.94 | 10 |
| 785.94 ≤ l < 857.29 | 11 |
| 857.29 ≤ l < 928.65 | 12 |
| 928.65 ≤ l < 1000 | 13 |
| 1000 ≤ l < 1071.875 | 14 |

When the signal specifies another pre-determined value (e.g., "1"), it indicates the sum of the duration of an incomplete OFDM symbol in the first downlink subframe within the transmission duration and the duration of an incomplete OFDM symbol in the last downlink subframe within the transmission duration may exceed the duration of an OFDM symbol. In this case, M' may be determined according to the following methods. In an example, the sum of the duration of an incomplete OFDM symbol in the first downlink subframe within the transmission duration and the duration of an incomplete OFDM symbol in the last downlink subframe within the transmission duration may be calculated according to l=(t−the duration of complete OFDM symbols in the first downlink subframe) mod 1. The value of M' may be determined according to a pre-determined second relation which associates the value of l and a value of M'. For example, Table 10 may be searched to obtain the value of M'.

In another example, l=(t−the duration of complete OFDM symbols in the first downlink subframe)mod 1 may be calculated. If l is smaller than the sum of a half of the duration of a subframe and the duration of the first OFDM symbol in each time slot, i.e., 0.5+(160+2048)/(30.72*10e3)=0.571875, M'=($\lfloor$(l−p)/L$\rfloor$. The p is the difference between the CP length in the first OFDM symbol in each subframe and the CP length in other OFDM symbols, i.e., (160−144)/(30.72*10e3)=0.00052 milliseconds. The L is the duration of an OFDM symbol other than the first OFDM symbol in the each subframe (including the length of CP). The value of L may be (2048+144)/(30.72*10e3)=0.07135. When l is larger than or equal to 0.571875, M'=($\lfloor$l−2*p)/L$\rfloor$. In another example, l=(t−the duration of complete OFDM symbols in the first downlink subframe)mod 1 may be calculated, and the value of M' may always be M'=($\lfloor$l−2*p)/L$\rfloor$ no matter what is the value of l.

TABLE 10

| The range of l = (t − the duration of complete OFDM symbols in the first downlink subframe)mod 1 (milliseconds) | The number of OFDM symbols in the last downlink subframe (M') |
| --- | --- |
| 71.875 ≤ l < 143.23 | 0 |
| 143.23 ≤ l < 214.58 | 1 |
| 214.58 ≤ l < 285.94 | 2 |
| 285.94 ≤ l < 357.29 | 3 |
| 357.29 ≤ l < 428.65 | 4 |
| 428.65 ≤ l < 500 | 5 |
| 500 ≤ l < 571.875 | 6 |
| 571.875 ≤ l < 643.23 | 7 |
| 643.23 ≤ l < 714.58 | 8 |
| 714.58 ≤ l < 785.94 | 9 |
| 785.94 ≤ l < 857.29 | 10 |
| 857.29 ≤ l < 928.65 | 11 |
| 928.65 ≤ l < 1000 | 12 |
| 1000 ≤ l < 1071.875 | 13 |

Method 2': No matter whether the time when an LTE base station starts occupying the channel is at a boundary of an OFDM symbol in a downlink subframe or not, l=(t−the duration of complete OFDM symbols in the first downlink subframe)mod 1 may be calculated, and M' may be determined according to a second relation which associates the value of l with a value of M'. For example, the value of M' may be obtained from Table 10

In another example, the sum of the duration of an incomplete OFDM symbol in the first downlink subframe within the transmission duration and the duration of an incomplete OFDM symbol in the last downlink subframe within the transmission duration is l=(t−the duration of complete OFDM symbols in the first downlink subframe)mod 1. If l is smaller than the sum of a half of the duration of a subframe and the duration of the first OFDM symbol in each time slot, i.e., 0.5+(160+2048)/(30.72*10e3)=0.571875, M'=($\lfloor$(l−p)/L$\rfloor$. The p is the difference between the CP length in the first OFDM symbol in each subframe and the CP length in other OFDM symbols, i.e., (160−144)/(30.72*10e3)=0.00052 milliseconds. The L is the duration of OFDM symbols other than the first OFDM symbol in the each subframe (including the length of CP). The value of L may be (2048+144)/(30.72*10e3)=0.07135. When l is larger than or equal to 0.571875, M'=($\lfloor$l−2*p)/L$\rfloor$. If l is larger than or equal to 0.571875, M'=($\lfloor$(l−2*p)/L$\rfloor$. In another example, l=(t−the duration of complete OFDM symbols in the first downlink subframe)mod 1 may be calculated, and the value of M' may always be M'=($\lfloor$l−2*p)/L$\rfloor$ no matter what is the value of l.

Method 3': l=(t−the duration of complete OFDM symbols in the first downlink subframe)mod 1 may be calculated, and the value of M' may be determined according a first relation which associates a value of l and a value of M'. For example, the value of M' may be obtained by looking up Table 9. In another example, if l is smaller than the sum of a half of the duration of a subframe and the duration of the first OFDM symbol in each time slot, i.e., 0.5+(160+2048)/(30.72*10e3)=0.571875, M'=($\lfloor$(l−p)/L$\rfloor$. The p is the difference between the CP length in the first OFDM symbol in each subframe and the CP length in other OFDM symbols, i.e., (160−144)/(30.72*10e3)=0.00052 milliseconds. The L is the duration of OFDM symbols other than the first OFDM symbol in the each subframe (including the length of CP). The value of L may be (2048+144)/(30.72*10e3)=0.07135. When l is larger than or equal to 0.571875, M'=($\lfloor$l−2*p)/L$\rfloor$. In another example, l=(t−the duration of complete OFDM symbols in the first downlink subframe)mod 1 may be calculated, and the value of M' may always be M'=($\lfloor$l−2*p)/L$\rfloor$ no matter what is the value of l.

If the sum of the duration of an incomplete OFDM symbol in the first downlink subframe within the transmission duration and the duration of an incomplete OFDM symbol in the last downlink subframe within the transmission duration does not exceed the duration of an OFDM symbol, the UE may stop receiving downlink channel and/or downlink reference signal in the portion of the last downlink subframe that exceeds the limited maximum transmission duration within the transmission duration after the limited maximum transmission duration ends. If the sum of the duration of an incomplete OFDM symbol in the first downlink subframe within the transmission duration and the duration of an incomplete OFDM symbol in the last downlink subframe within the transmission duration exceeds the duration of an OFDM symbol, the UE may keep on receiving downlink channel and/or downlink reference signal in the portion of the last downlink subframe that exceeds the limited maximum transmission duration within the transmission duration after the limited maximum transmission duration ends until the end of the OFDM symbol, as shown in FIG. 15. According to this method, the UE does not need additional indication signaling, and does not have to perform detection.

Method 4': If the M' obtained according to method 1', 2' or 3' is the number of OFDM symbols in DwPTS defined in one of TDD special subframe configurations, the M' of this method is the M' obtained according to method 1', 2' or 3'. If the M' obtained according to method 1', 2' or 3' is not the number of OFDM symbols in DwPTS defined in one of TDD special subframe configurations, the M' of this method may be the number of OFDM symbols in DwPTS defined in one of TDD special subframe configurations, and the number of OFDM symbols in DwPTS defined in the TDD special subframe configuration may be smaller than the M' obtained according to method 1', 2' or 3', and is the largest number of OFDM symbols as defined in the TDD special subframe configurations that are smaller than the M' obtained according to method 1', 2' or 3'. The TDD special subframe configurations may be the TDD special subframe configurations 0, 1, 2, 3, 4, 5, 6, 7, 8, 9 as shown in Table 1, or the TDD special subframe configurations 1, 2, 3, 4, 6, 7, 8, 9 as shown in Table 1.

Method 5: l=(t−(the duration of complete OFDM symbols in the first downlink subframe+t'))mod 1 may be calculated. The (the duration of complete OFDM symbols in the first downlink subframe+t') is the maximum duration of complete OFDM symbols for transmitting signals by the base station within the first downlink subframe, and may be the maximum duration that may be occupied by the complete OFDM symbols. The signals transmitted by the base station may be all of signals transmitted by the base station within the first downlink subframe after clear channel assessment (CCA), including at least one of PDSCH, PDCCH, EPDCCH, reference signal, UE-identifiable pilot reference signal (e.g., PSS/SSS/CRS/CSI-RS/PRS or other pilot reference signal), UE-unidentifiable pilot downlink signals and newly defined control channels (e.g., control channels that are transmitted together with the pilot reference signal). t' may be configured by higher layer signaling, or defined in a protocol, or may be obtained using the number of complete OFDM symbols for transmitting downlink data in the first downlink subframe. The downlink data may include at least one of PDSCH, PDCCH, EPDCCH, reference signals, UE-identifiable pilot reference signals and newly defined control channels.

When t' is obtained using the number of complete OFDM symbols for transmitting downlink data in the first downlink subframe, t' may be determined according to the earliest start position $I_1$ of data channel and/or control channel in the first downlink subframe detected by the UE and the possible earliest start position $I_2$ of signal transmission of the base station corresponding to the $I_1$ in the first downlink subframe. Supposing t_sym' is the number of OFDM symbols, the time variable t' may be obtained. When $(I_1-I_2)>=0$, t_sym'=$I_1-I_2$; when $(I_1-I_2)<0$, t_sym'=Nsym+$(I_1-I_2)$. The Nsym is the number of OFDM symbols in a subframe, e.g., Nsym=14 for a regular CP in an LTE system, $I_1$ and $I_2$ are both the start position of a complete OFDM symbol. $I_1$ may be an element in the set $\Psi$ of start positions which is predefined or configured by higher layer signaling. The set may include one or plural elements.

The $I_1$ may be directly detected, and then $I_2$ may be determined according to transmitted signals. There may be two situations when determining $I_2$.

According to situation (1), if it is not required a pilot reference signal occupying more than 0 OFDM symbol to be transmitted before transmission of data channel and/or control channel in the first downlink subframe, $I_1$ and $I_2$ are both elements in the set $\Psi$, and are adjacent elements in $\Psi$, $I_2$ is a preceding element of $I_1$ in time. For example, a base station does not have to transmit UE-identifiable functions for synchronization or preparations for PDSCH/PDCCH/EPDCCH reception before transmitting PDSCH/PDCCH/EPDCCH. But the base station may decide whether to transmit a pilot signal for occupying the channel according to the time when the channel is occupied. It is not restricted that the pilot signal for occupying the channel may have other functions, nor restricted that whether the UE is capable of identifying the signal. For example, if the base station successfully occupies a channel at a boundary of an OFDM symbol, the base station may directly transmit PDSCH/PDCCH/EPDCCH from the boundary of the OFDM symbol without transmitting any other signals before transmitting PDSCH/PDCCH/EPDCCH. In another example, if the base station successfully occupies a channel at the middle of an OFDM symbol, the base station may transmit a pilot signal to occupy the channel until an OFDM symbol position corresponding to the closest element in the set $\Psi$, and then start to transmit PDSCH/PDCCH/EPDCCH. The pilot signal may be UE-identifiable or not UE-identifiable. For example, PDSCH have $n_2$ possible start positions within the first downlink subframe, i.e., the $0^{th}$, $4^{th}$, $8^{th}$, $12^{th}$ OFDM symbol, the start position set $\Psi$ may be $I_1$ and $I_2$ may be 0 and 12, or 4 and 0, or 8 and 4, or 12 and 8.

Figure 16:
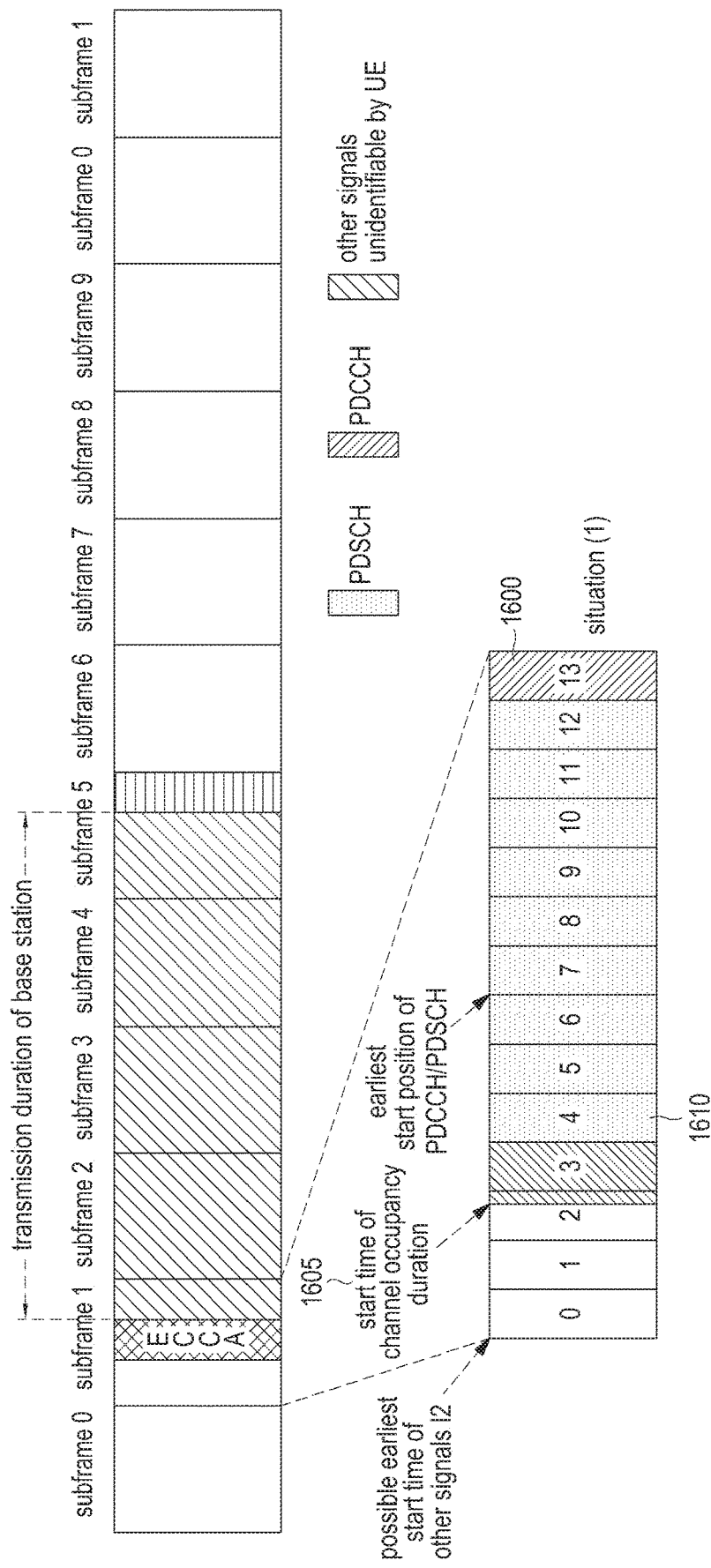
FIG. 16 is a schematic diagram illustrating positions of $I_1$ and $I_2$ in situation (1) in accordance with example four of the present disclosure.

FIG. 16 is a schematic diagram illustrating positions of $I_1$ and $I_2$ in situation (1) in accordance with example four of the present disclosure.

For example, as shown in FIG. 16, the start position of PDCCH in the first downlink subframe may be fixed at the last OFDM symbol 1600. A base station may occupy the channel at the middle 1605 of the $2^{nd}$ OFDM symbol and start to transmit signal, and start transmitting PDSCH from the $4^{th}$ OFDM symbol 1610.

If the start position of the PDSCH detected by the UE is #4, $I_1$=4, $I_2$=0, and t_sym'=$I_1-I_2$=4. If the start position of the PDSCH detected by the UE is #0, $I_1$=0, $I_2$=12, and t_sym'=14+$(I_1-I_2)$=2. According to situation (2), if a pilot reference signal occupying at least a total of Lp OFDM symbols in the first downlink subframe before transmission of data channel and/or control channel, $I_1$' may be first determined, $I_1$' is an element adjacent to $I_1$ in $\Psi$, and $I_1$' is a preceding element of $I_1$ in time. When $(I_1'-Lp)>=0$, $I_2=(I_1'-Lp)$; when $(I_1'-Lp)<0$, $I_2=Nsym+(I_1'-Lp)$. The Lp is a positive integer. The length Lp of the pilot reference signal is known to UE, e.g., Lp may be pre-determined or configured by higher layer signaling or defined in a pre-defined rule. The pilot reference signal is identifiable by UEs. When $(I_1-I_2)>=0$, $t\_sym'=I_1-I_2$; when $(I_1-I_2)<0$, $t\_sym'=Nsym+(I_1-I_2)$. It can be seen that $t'=I_1-I_2$ is actually the difference $\Delta$ between adjacent elements in the set $\Psi+Lp$. For example, the start position set $\Psi$ of PDSCH in the first downlink subframe is the base station may start transmitting signals on OFDM symbols subsequent to $I_2$.

Figure 17:
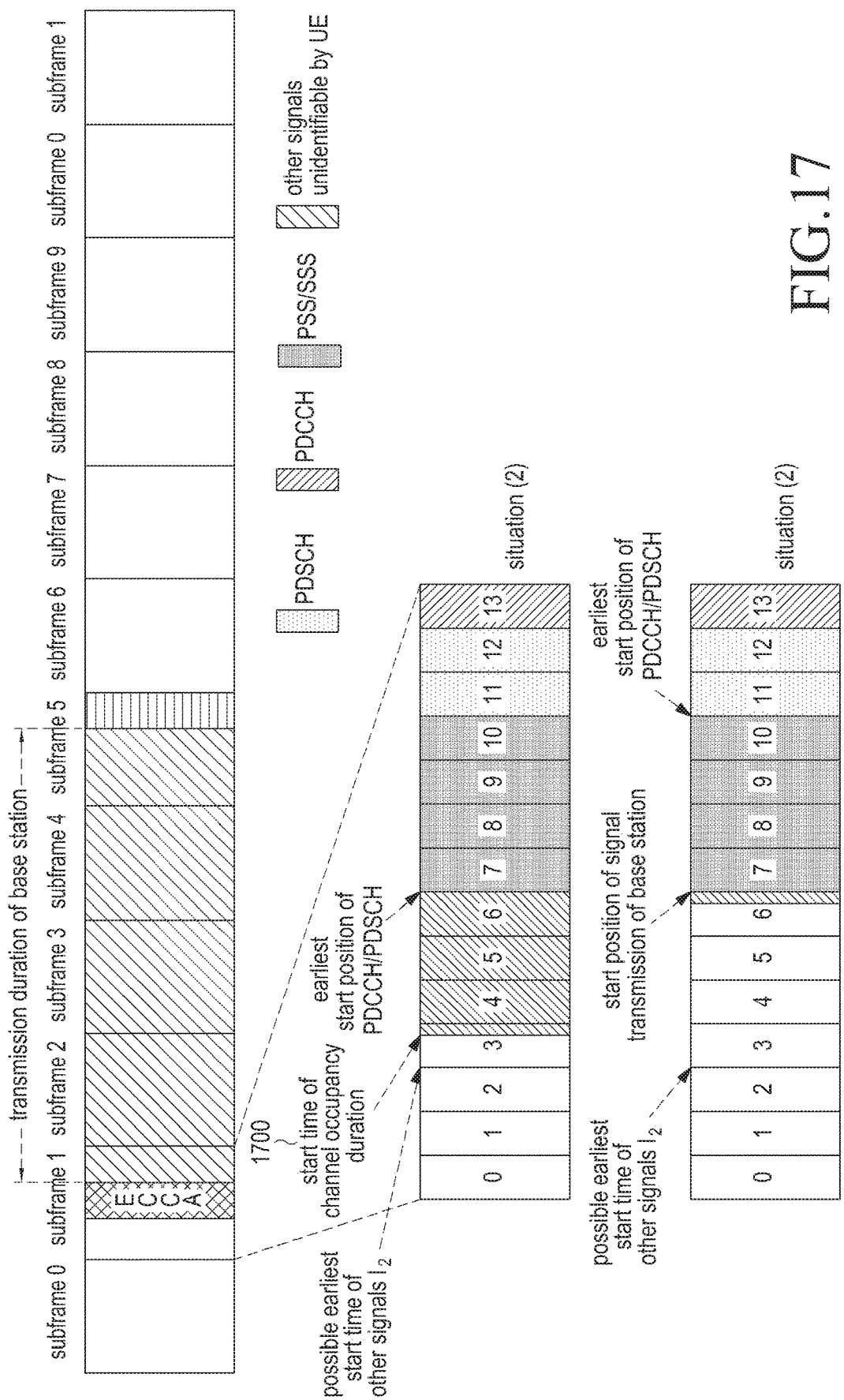
FIG. 17 is a schematic diagram illustrating positions of $I_1$ and $I_2$ in situation (2) in accordance with example four of the present disclosure.

FIG. 17 is a schematic diagram illustrating positions of $I_1$ and $I_2$ in situation (2) in accordance with example four of the present disclosure.

As shown in FIG. 17, the base station may occupy the channel and start transmitting signals at the middle 1700 of the third OFDM symbol. Since a pilot signal occupying at least $L_p=4$ OFDM symbols, 7 OFDM symbols have already been missed, and the base station may have to start transmitting PDSCH/PDCCH/EPDCCH from the OFDM symbol #11. The base station may send the pilot signal occupying 4 OFDM symbols from the OFDM symbols #7~#10, and start transmitting other pilot signals from the moment when occupying the channel until the end of the OFDM symbol #6. The base station may occupy the channel and start transmitting signal from the middle of the OFDM symbol #6, and send a pilot signal occupying 4 OFDM symbols from the OFDM symbols #7~#10, and start transmitting PDSCH/PDCCH/EPDCCH from the OFDM symbol #11. It can be seen that the $I_2$ obtained in the two situations are identical.

The method of determining "the duration of complete OFDM symbols for transmitting data in the first downlink subframe" may include: a UE may determine the earliest start time of transmitted data channel and/or control channel in the first downlink subframe by blind detection or by receiving explicit signaling, determine the number of complete OFDM symbols from the start time to the end of the first downlink subframe, and calculate "the duration of complete OFDM symbols for transmitting data in the first downlink subframe". For example, if PDSCH and PDCCH/EPDCCH have the same start position in the first downlink subframe, the number of complete OFDM symbols from the start time to the end of the first downlink subframe may be determined according to either start position. In another example, as shown in FIG. 18, if the start position of PDCCH/EPDCCH is earlier than the start position of PDSCH, the number of complete OFDM symbols from the start position of PDCCH/EPDCCH to the end of the first downlink subframe may be determined according to the start position of transmission of PDCCH/EPDCCH in the first downlink subframe.

Figure 18:
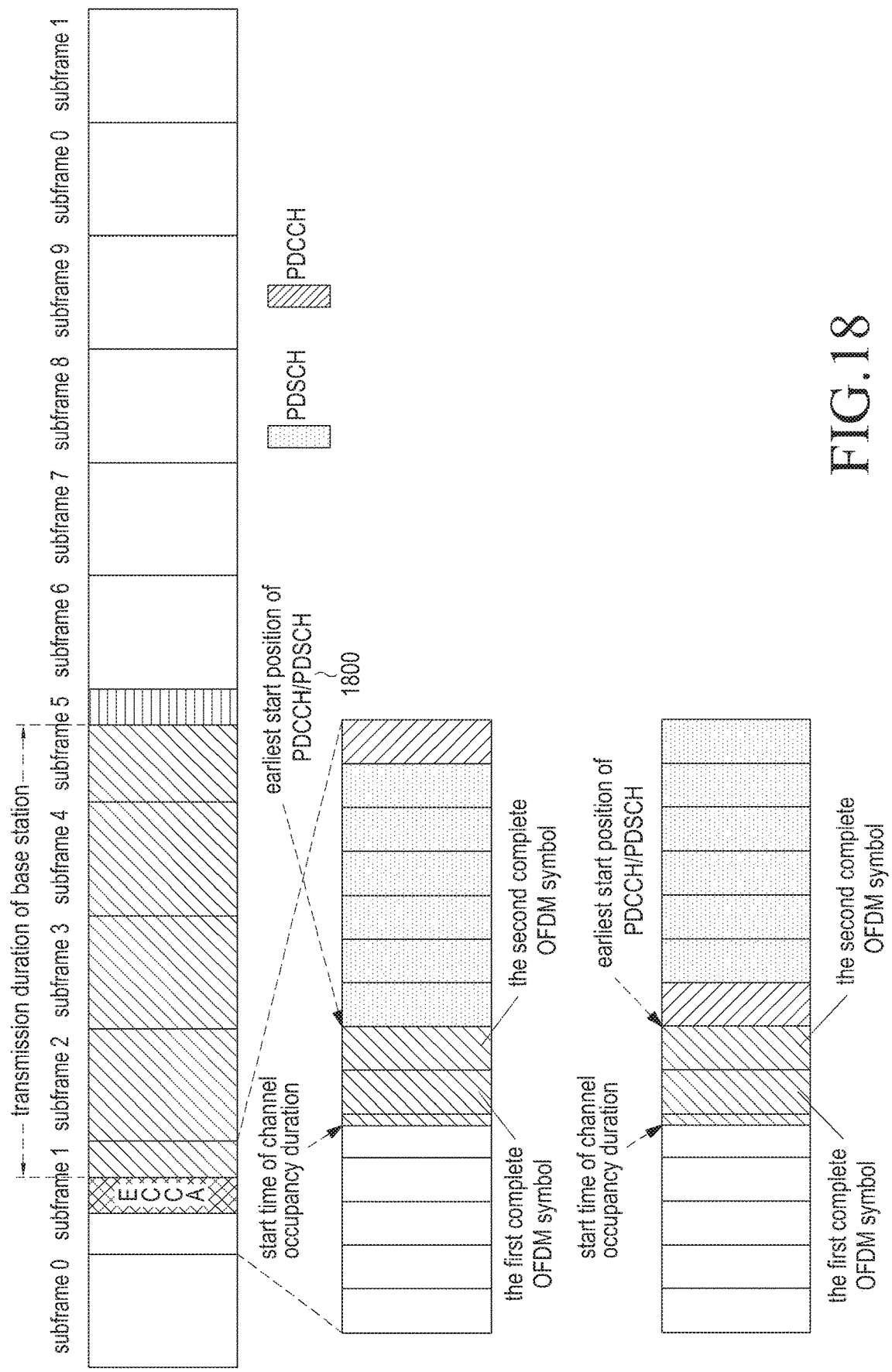
FIG. 18 is a schematic diagram illustrating the start position of PDCCH/EPDCCH and PDSCH in the first downlink subframe in accordance with example four of the present disclosure.

FIG. 18 is a schematic diagram illustrating the start position of PDCCH/EPDCCH and PDSCH in the first downlink subframe in accordance with example four of the present disclosure.

In another example, as shown in FIG. 18, if the start position 1800 of PDSCH is earlier than the start position of PDCCH/EPDCCH, the number of complete OFDM symbols from the start position of PDCCH/EPDCCH to the end of the first downlink subframe may be determined according to the start position of transmission of PDSCH in the first downlink subframe.

In an example, the start position may be determined through UE blind detection of a control channel, e.g., PDCCH/EPDCCH. In an example, a UE may perform blind detection of PDCCH/EPDCCH according to $n_1$ pre-defined or semi-statically configured possible start positions of PDCCH/EPDCCH in the first downlink subframe to determine the start position of PDCCH/EPDCCH, and then determine the start position of PDSCH in the first downlink subframe according to the start position of the PDCCH/EPDCCH. The $n_1$ may be an integer larger than 1, e.g., 2 or 4. The number of possible start positions of PDSCH in the first downlink subframe may be $n_2$. The $n_2$ may be a positive integer. The $n_2$ may be a number irrelevant to $n_1$. In another example, the $n_2$ may be a number relevant to $n_1$, e.g., $n_1=n_2$. The $n_2$ may be pre-defined or semi-statically configured.

(1) The number of possible start positions of PDCCH/EPDCCH in the first downlink subframe may be different from the number of possible start positions of PDSCH in the first downlink subframe. In another example, the number of possible start positions of PDCCH/EPDCCH in the first downlink subframe may be not in a one-to-one relationship with the number of possible start positions of PDSCH in the first downlink subframe. For example, the number of possible start positions of PDCCH/EPDCCH in the first downlink subframe may be 2, one may be the OFDM symbol #0 in the first downlink subframe, and the other may be the OFDM symbol #7 in the first downlink subframe. The number of possible start positions of PDSCH in the first downlink subframe may be n2=4 discrete values. The four possible start positions may be the OFDM symbol #1, the OFDM symbol #4, the OFDM symbol #8 and the OFDM symbol #12 in the first downlink subframe. The PDCCH/EPDCCH may explicitly specify which one of the 4 possible start positions is the start position of the PDSCH. The UE may detect PDCCH/EPDCCH at the OFDM symbol #0 and the OFDM symbol #7. If the UE detect PDCCH at the OFDM symbol #7, the UE may obtain the start position specified by the PDCCH/EPDCCH.

Figure 19:
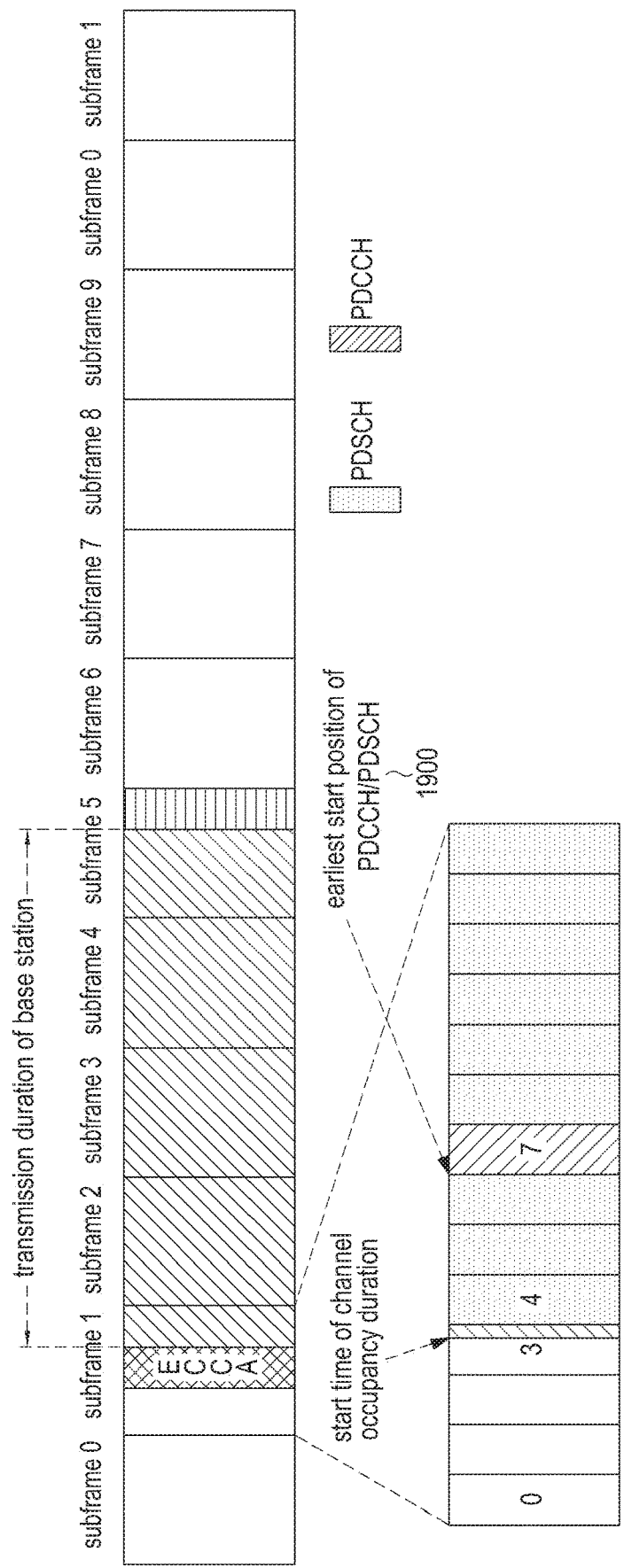
FIG. 19 is a schematic diagram illustrating a start position of PDCCH and PDSCH in the first downlink subframe in accordance with example four of the present disclosure.

FIG. 19 is a schematic diagram illustrating a start position of PDCCH and PDSCH in the first downlink subframe in accordance with example four of the present disclosure.

As shown in FIG. 19, the start position 1900 of PDCCH detected by the UE is the OFDM symbol #7, the start position of the PDSCH specified by the PDCCH is the OFDM symbol #4. The earliest start position of transmission of the PDCCH/EPDCCH in the first downlink subframe is the start position of the PDSCH, i.e., $I_1=4$. The number of complete OFDM symbols from the start position $I_1$ to the end of the first downlink subframe is 10. Thus, the duration of complete OFDM symbols in the first downlink subframe is 714 us.

(2) The number of possible start positions of PDCCH/EPDCCH in the first downlink subframe is identical to the number of possible start positions of PDSCH in the first downlink subframe, i.e., $n_1=n_2$, and they are in a one-to-one mapping relationship. For example, EPDCCH and PDSCH may have the same number of start positions, and have the same start position. For another example, PDCCH may have the same number of start positions with PDSCH, and the start position of PDSCH is adjacent to the start position of PDCCH. In an example, supposing PDCCH has 4 possible start positions, e.g., OFDM symbols #0, #4, #7, #11, possible start positions of PDSCH may be OFDM symbols #1, #5, #8 and #12. In this situation, PDCCH/EPDCCH does not have to explicitly specify the start position of PDSCH. A UE may perform detection of PDCCH at the 4 possible start positions, and determine the start position of PDSCH according to detected start position of the PDCCH. In this case, the start position of PDCCH in the first downlink subframe is prior to the start position of the PDSCH, the number of complete OFDM symbols from the start position to the end of the first downlink subframe may be determined according to the start position of the PDCCH.

Figure 20:
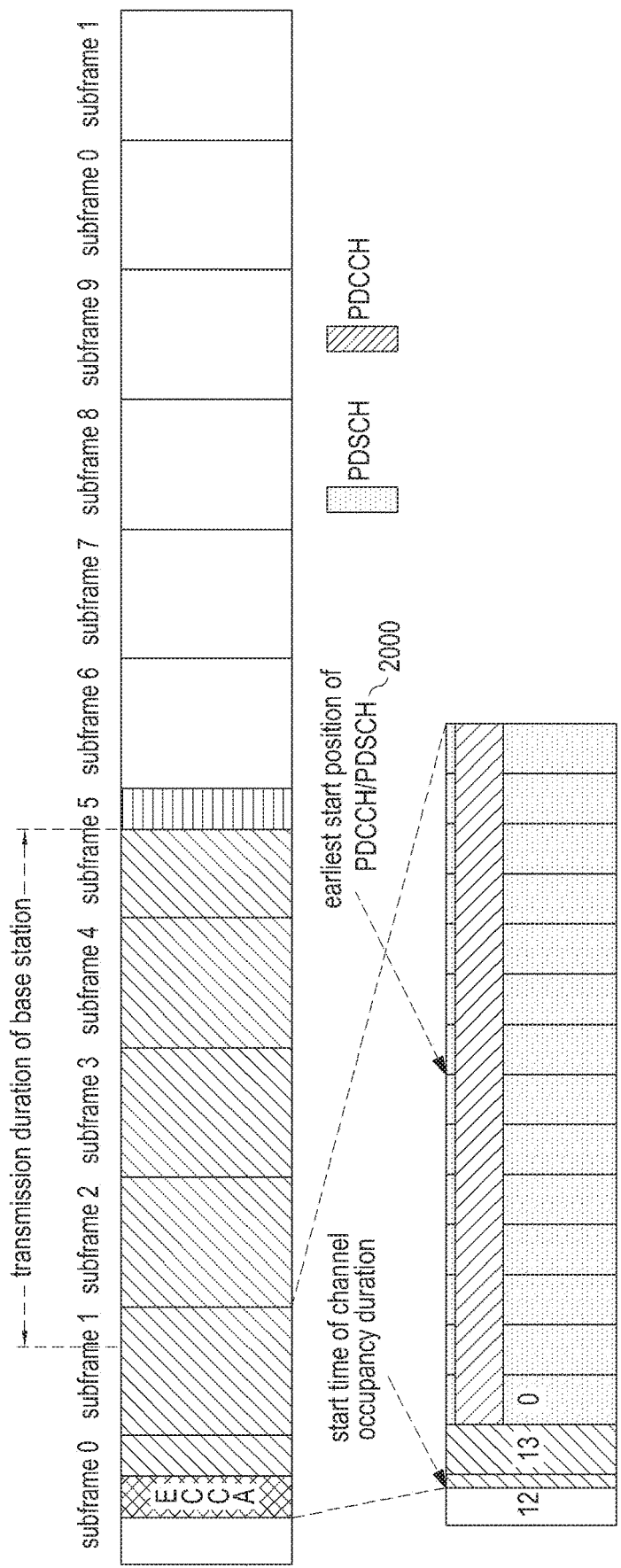
FIG. 20 is a schematic diagram illustrating the start position of EPDCCH and PDSCH in the first downlink subframe in accordance with example four of the present disclosure.

FIG. 20 is a schematic diagram illustrating the start position of EPDCCH and PDSCH in the first downlink subframe in accordance with example four of the present disclosure.

As shown in FIG. 20, the start positions 2000 of the EPDCCH and the PDSCH detected by the UE is #0, $I_1$=0. The number of complete OFDM symbols from the start position $I_1$ to the end of the first downlink subframe is 14. Thus, the duration of complete OFDM symbols for transmitting data in the first downlink subframe is 1 ms.

In an example, the UE blind detection may be determined by detecting a pre-defined reference signal. For example, if the OFDM symbol at the start position of PDCCH/EPDCCH and PDSCH includes a pre-defined reference signal, a UE may perform detection of the reference signal at $n_1$ possible start positions of PDCCH/EPDCCH or $n_2$ possible start positions of PDSCH to determine the earliest start position of transmitted data channel and/or control channel in the first downlink subframe.

In an example, the UE blind detection may be determined by detecting a pre-defined reference signal and a pre-defined control channel. For example, the earliest start position of transmitted data channel and/or control channel in the first downlink subframe may be determined by using the method of detecting PDCCH/EPDCCH according to $n_1$ possible start positions of the PDCCH/EPDCCH and the method of detecting PDSCH according to $n_2$ possible start positions of the PDSCH.

In an example, the UE may determine the start position by receiving explicit signaling. For example, (1) the possible start position of PDCCH may be fixed at the last OFDM symbol in the first downlink subframe, and PDSCH may have $n_2$ possible start positions in the first downlink subframe. PDCCH may explicitly specify one of the $n_2$ possible start positions of PDSCH. (2) PDCCH/EPDCCH may be transmitted in the next complete subframe immediately adjacent to the first downlink subframe. The method of transmitting the PDCCH/EPDCCH may be the same with a conventional method, but the PDCCH/EPDCCH may include information specifying the start position of the PDSCH in the first downlink subframe.

The control signaling may be cell-specific signaling, or UE-specific signaling, or Group-specific signaling.

The above provides a method of a UE determining the earliest start position of downlink transmission of data channel and/or control channel and calculating the duration of complete OFDM symbols for transmitting data in the first downlink subframe. Since the base station may start transmitting other signals, e.g., signals for occupying the channel, before the start position. The duration of the signals may be an integral multiple or a decimal multiple of the duration of an OFDM symbol. Further, the signals may be unknown to the UE, e.g., generation of signals for occupying the channel may be related to design of the base station, and the UE does not know the format of the signals, e.g., sequences. In another example, the signals may be indefinite, and the UE may interpret some of the signals. For example, the signals may include signals whose format is unknown to the UE and reference signals identifiable by the UE, e.g., PSS/SSS or CRS. The UE may calculate the duration of complete OFDM symbols for transmitting data in the first downlink subframe according to the earliest start position of the downlink transmission of data channel and/or control channel, and not including the duration of the signals transmitted before the downlink transmission of the data channel and/or control channel into the duration of complete OFDM symbols for transmitting data in the first downlink subframe. Therefore, not only the the duration of complete OFDM symbols for actually transmitting data in the first downlink subframe but also the maximum possible duration (denoted by t') of the signals transmitted before the downlink transmission of the data channel and/or control channel may be taken into consideration in calculation of the duration of complete OFDM symbols for actual data transmission in the first downlink subframe.

The t' may be obtained according to a method other than using the number of complete OFDM symbols for downlink data transmission in the first downlink subframe. According to the method, the t' may be determined using a start position $I_3$ of a pre-determined reference signal detected by the UE in the first downlink subframe and a possible start position $I_2$' of adjacent data channel and/or control channel transmitted earlier than $I_3$ in the first downlink subframe. In an example, assuming t_sym' is the number of OFDM symbols, the time variable t' may be obtained. t_sym'=$I_3$−$I_2$'. The $I_3$ and $I_2$' are both a start position of a complete OFDM symbol. The $I_2$' is an element of a set Ψ of start positions pre-defined or configured by higher layer signaling. The $I_2$' is an element closest to $I_3$ and is earlier than $I_3$ in the set Ψ. For example, if a base station has to transmit a pilot reference signal (e.g., PSS/SSS) having a fixed length, e.g., one OFDM symbol, before transmitting PDCCH/EPDCCH and/or PDSCH in the first downlink subframe, and the PDCCH/EPDCCH and/or the PDSCH have $n_2$ possible start positions in the first downlink subframe, and the start position set Ψ is The $I_3$ has an offset of 1 OFDM symbol against each element in the set, i.e., a set corresponding to $I_3$ is {13,3,7,11}. $I_3$ and $I_2$' may be 13 and 12, or 3 and 0, or 7 and 4, or 11 and 8. For example, when the UE detects the start position of PSS/SSS is the OFDM symbol #7, the UE may determine the earliest start position of PDSCH and/or PDCCH/EPDCCH is OFDM symbol #8, $I_2$'=4, and t_sym'=$I_3$−$I_2$'=3.

Figure 21:
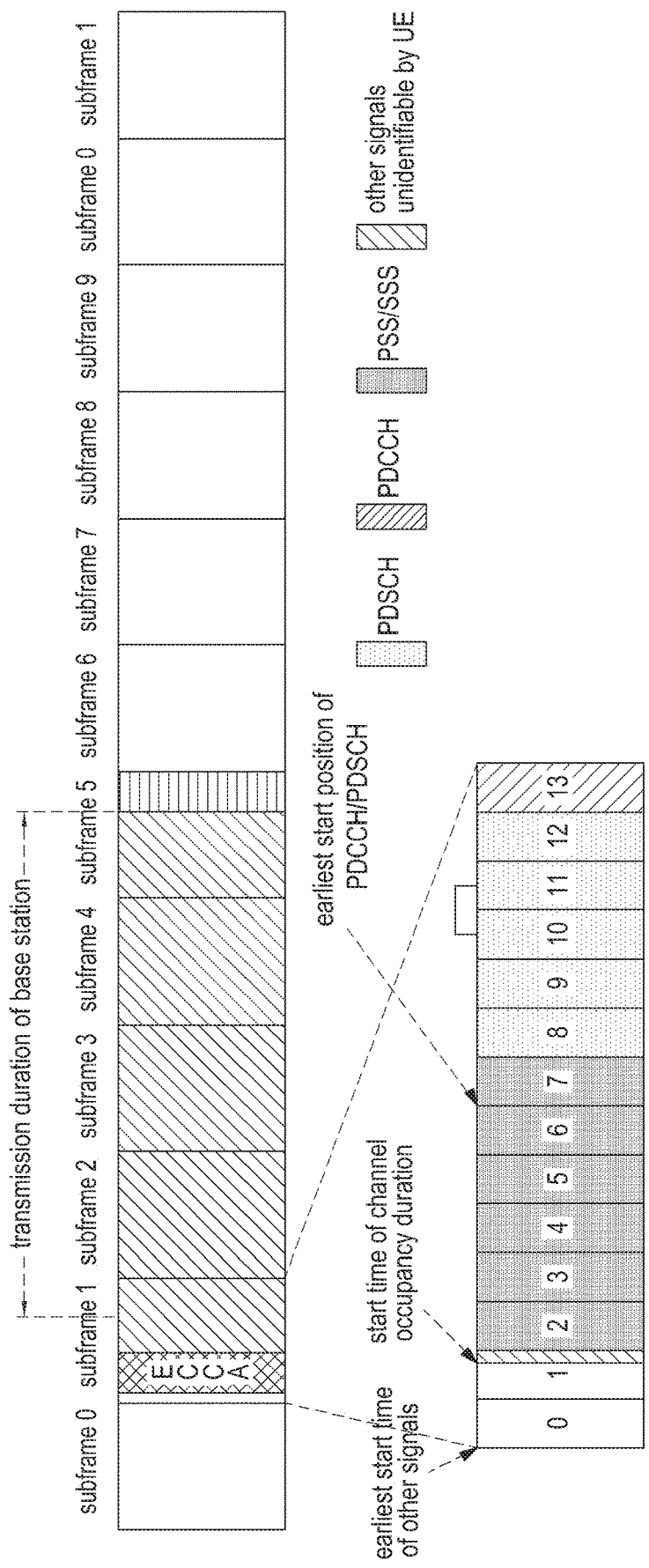
FIG. 21 is a schematic diagram illustrating a start position of PDCCH/EPDCCH and PDSCH in the first downlink subframe in accordance with example four of the present disclosure.

FIG. 21 is a schematic diagram illustrating a start position of PDCCH/EPDCCH and PDSCH in the first downlink subframe in accordance with example four of the present disclosure.

In the example shown in FIG. 21, if the base station has to transmit a pilot reference signal occupying 6 OFDM symbols before transmitting PDCCH/EPDCCH and/or PDSCH in the first downlink subframe, and the set Ψ of possible start positions of PDCCH/EPDCCH and/or PDSCH in the first downlink subframe is If the start position of the pilot reference signal detected by the UE is $I_3$=2, $I_2$'=0.

In another example, if the base station has to transmit a pilot reference signal with a minimum length of Lp before transmitting PDCCH/EPDCCH and/or PDSCH in the first downlink subframe, and the actual length X is changeable, X satisfies X>=Lp, the Lp is pre-determined and is known to the UE. The UE may determine the start position of PDSCH/PDCCH/EPDCCH according to the detected start position of the pilot reference signal and the minimum length Lp. For example, Lp=1, and the base station may occupy the channel and start transmitting signals at the middle of OFDM symbol #5, transmit PSS/SSS occupying 2 OFDM symbols (i.e., X=2) from OFDM symbol #6, and transmit PDSCH/PDCCH/EPDCCH from OFDM symbol #8. When the UE detects the start position of PSS/SSS is the OFDM symbol #6 (i.e., 13=6), the UE may determine the earliest start position of PDSCH and/or PDCCH/EPDCCH is OFDM symbol #8, $I_2$=4, and t_sym'=$I_3$−$I_2$'=2.

If the base station transmitted a pilot reference signal before the start position of PDSCH/PDCCH/EPDCCH, a pilot reference signal occupying an integral multiple of OFDM symbols is a UE-identifiable reference signal, and a pilot reference signal not occupying an integral multiple of OFDM symbols may be unidentifiable by the UE. The calculations of t_sym' may be further simplified, i.e., t_sym'=1.

The method which uses the number of complete OFDM symbols for transmitting downlink data in the first downlink subframe may be as follows. A UE may determine the start position of a pilot reference signal that is UE-identifiable in the first downlink subframe through blind detection or from received explicit signaling, and determine the number of complete OFDM symbols from the start position to the end of the first downlink subframe, thus obtain the duration of the complete OFDM symbols for transmitting data in the first downlink subframe. In the method, if a newly defined control channel is transmitted together with the pilot reference signal, the start position may be obtained in the same manner. For example, the UE may perform blind detection of identifiable pilot signals. If the base station transmitted a UE-identifiable pilot reference signal before transmitting the downlink channel, e.g., (1) the base station transmitted a UE-identifiable pilot reference signal (e.g., PSS/SSS) which occupies at least Lp complete OFDM symbols to assist the UE in synchronization detection, the base station may transmit PDSCH or EPDCCH/PDCCH at the next OFDM symbol adjacent to the reference signal. The base station may transmit a UE-identifiable pilot reference signal which occupies X complete OFDM symbols, and X>=Lp. X is unknown, but Lp is known to the UE. The Lp may be a pre-defined value, or may be determined according to a pre-determined rule, or may be configured semi-statically. In another example, (2) the base station may transmit a reference signal (e.g., PSS/SSS/CRS) occupying X complete OFDM symbols to assist the UE in synchronization detection, the base station may transmit PDSCH or EPDCCH/PDCCH at the next OFDM symbol adjacent to the reference signal. The X may be known to the UE. The X may be a pre-defined value, or may be determined according to a pre-determined rule, or may be configured in a semi-static manner. The UE may attempt to detect the reference signal occupying X complete OFDM symbols at the limited number of possible start positions.

Figure 22:
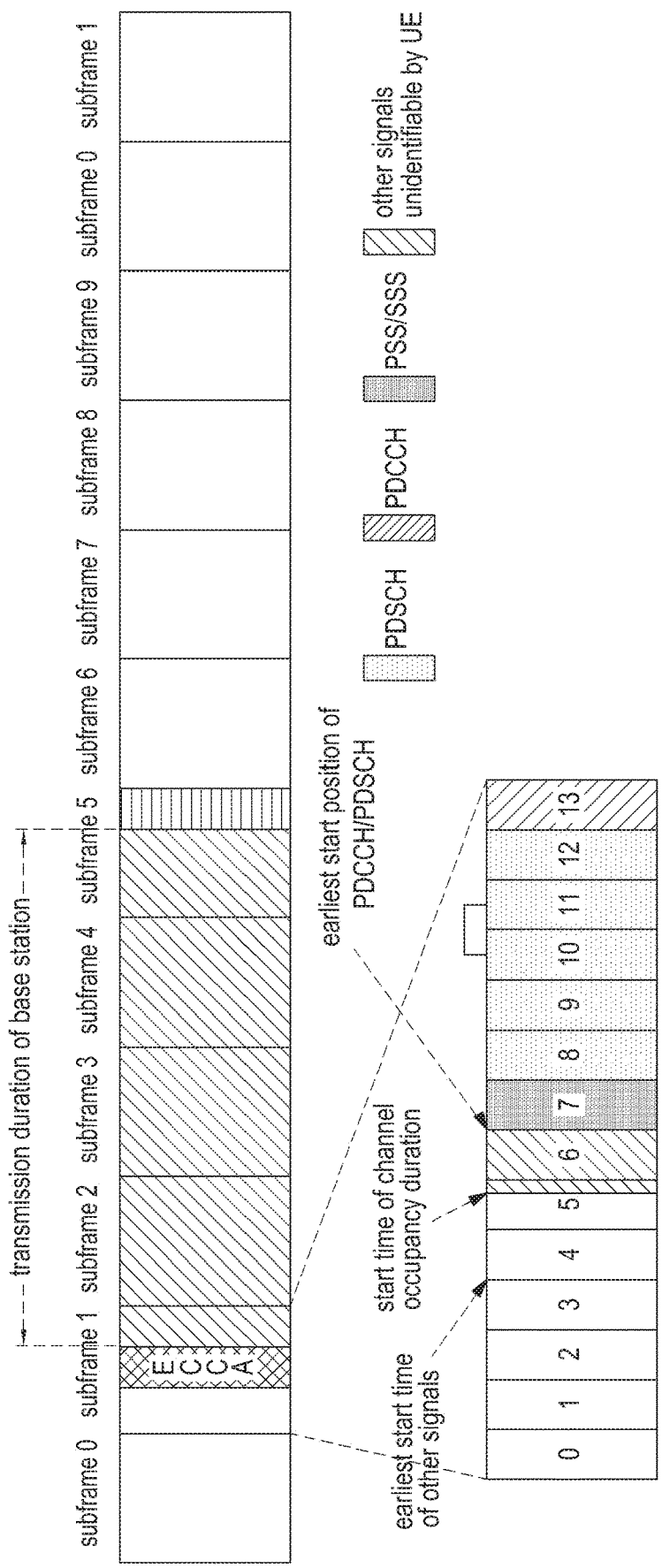
FIG. 22 is a schematic diagram illustrating the start positions of PDCCH/EPDCCH and PDSCH in the first downlink subframe in accordance with example four of the present disclosure.

FIG. 22 is a schematic diagram illustrating the start positions of PDCCH/EPDCCH and PDSCH in the first downlink subframe in accordance with example four of the present disclosure.

As shown in FIG. 22, supposing the set of possible start positions of PDSCH or EPDCCH/PDCCH is the set $I_3$ of possible start positions of the reference signal may have an offset of X=1 OFDM symbol against each element in the set, i.e., the set corresponding to $I_3$ is {13,3,7,11}. As shown in the figure, the base station may transmit a PSS/SSS occupying 1 OFDM symbol at OFDM symbol #7 of the first downlink subframe, transmit a PDSCH on adjacent 5 OFDM symbols, and transmit a PDCCH occupying 1 OFDM symbol, i.e., $I_3$=7. The start position of the PDSCH or EPDCCH/PDCCH immediately after that is OFDM symbol #8, i.e., $I_1$=8. Therefore, the number of complete OFDM symbols from the start position $I_3$ to the end of the first downlink subframe is 7, and the duration of the complete OFDM symbols for transmitting data in the first downlink subframe is 0.5 ms.

The UE may receive explicit signaling which indicates the start position or the symbol length of the UE-identifiable pilot reference signal, as described above. The UE may also receive explicit signaling which indicates the earliest start position or signal length of all of signals transmitted by the base station. For example, the base station may transmit a pilot signal starting from the middle of OFDM symbol #1, and transmit PDSCH starting from OFDM #4. The base station may inform the UE that the earliest start position of all signals is OFDM symbol #0, or inform the UE that the length of all of signals transmitted in the first downlink subframe is 14 OFDM symbols. The calculations of t_sym' may be further simplified, i.e., t_sym'=0. In another example, the signaling may specify the start position of all complete OFDM symbols. For example, the base station may start transmitting pilot signal from the middle of OFDM symbol #1, and start transmitting PDSCH from OFDM symbol #4. The base station may inform the UE of the earliest start position of all of signals is OFDM symbol #1, thus t_sym'=1.

The above provides a method of a UE determining the start position of a UE-identifiable pilot reference signal transmitted before data channel and/or control channel and calculating the duration of complete OFDM symbols for transmitting data in the first downlink subframe. Since the base station may start transmitting other signals, e.g., signals for occupying the channel, before the start position. The duration of the signals may be an integral multiple or a decimal multiple of the duration of an OFDM symbol. The "other signals" are unidentifiable by the UE, but the UE may perform other operations using the "other signals", e.g, adjusting AGC. Therefore, not only the duration of UE-identifiable downlink pilot reference signal and downlink channel (PDSCH/PDCCH/EPDCCH) but also the maximum possible duration (denoted by t') of the signals transmitted before the US-identifiable signals may be taken into consideration in calculation of the duration of OFDM symbols occupied by data actually transmitted by the base station in the first downlink subframe.

The t' may be configured by higher layer or defined in a protocol. In an example, the value configured by higher layer or defined in a protocol may also have the time difference between the start position of the UE-detectable portion of the signals and the start position of signals transmitted by the base station after channel occupancy taken into consideration, so that the (duration of complete OFDM symbols for transmitting data in the first downlink subframe+t') may reflect the actual duration of all signals transmitted by the base station in the first downlink subframe. In other examples, other factors may also be taken into consideration for the value configured by higher layer or defined in a protocol, e.g., system complexity, or the like, such that the value of t' may be determined.

The value of l calculated according to the above method is the time in the last subframe in which the base station may transmit signals in each channel occupancy time of the base station. For example, assuming the maximum channel occupancy time of the current transmission of the base station is 4 ms (t=4), the base station may transmit no pilot signal before transmitting PDSCH/PDCCH/EPDCCH. The only situation where the base station may transmit pilot signal for occupying the channel until the nearest start position for transmitting PDSCH is when the base station starts occupying the channel at the middle of an OFDM symbol. Supposing a start position set is According to situation (1) of the first method of this example, the duration of complete OFDM symbols for transmitting data in the first downlink subframe is 0.5 ms, t_sym'=3, t'=0.214 ms, and the following equation.

Equation 1

$$l = \left(4 - \left(\begin{array}{c}\text{the duration of complete } \textit{OFDM} \text{ symbols for}\\ \text{transmitting data in the}\\ \text{first downlink subframe} + t'\end{array}\right)\right) \bmod 1 =$$

$$(4 - (0.5 + 0.214)) \bmod 1 = 0.286 \text{ ms}$$

Thus, the last subframe allows transmission of signals having a length of 0.286 ms. Since a base station can only transmit signals in complete OFDM symbols, the time length in the last subframe is 4 OFDM symbols. The number of OFDM symbols may be obtained using l according to the method of methods 1', 2', 3' or 4', e.g., $M'=\lfloor l-2*p \rfloor/L\rfloor$, or according to other methods.

Considering complexity of the standards or the system, the system may support transmitting a limited number of OFDM symbols in the last incomplete subframe, e.g., only supporting conventional DwPTS configurations or only supporting situations passing a pre-determined threshold, or supporting situations which satisfy a pre-determined set. In another example, the value of M' may be any value among 1~Nsym OFDM symbols.

If the end position of OFDM symbols in the last incomplete subframe are some values in 1~Nsym, the UE may determine the end position of the OFDM symbol according to the value of l or M', i.e., comparing elements in a set $\Omega$ of end positions of OFDM symbols in the last incomplete subframe with M', and determining to transmit no signal in the last subframe if the minimum value of elements in the set $\Omega$ is larger than M'. If there is an element smaller than M' in the set $\Omega$, an element which is smaller than or equal to M' and is closest to M' may be selected as the end position of OFDM symbols in the last incomplete subframe.

For example, if the set $\Omega$ of end positions of OFDM symbols in the last incomplete subframe is {3,6,9,12}, when l=0.286 ms, M'=4, and the element in the set $\Omega$ which is the closest to M' and not larger than M' is 3. Thus, the signals transmitted in the last subframe may occupy 4 OFDM symbols, i.e., OFDM symbols #0~#3. In another example, if the set $\Omega$ of end positions of OFDM symbols in the last incomplete subframe is {6,9,12}, and there is no element in the set that is not larger than M', a determination may be made that no signal is transmitted in the last subframe. In yet another example, in order to make full use of each OFDM symbol, the system may support joint coding of OFDM symbols in the last incomplete subframe with the previous subframe to form a complete transmission block. In this example, the UE may determine the end position of an OFDM symbol using the value of l or M', and perform demodulation using OFDM symbols in the previous subframe according to a scheduling indication.

According to examples one to four, the duration of signal transmission on an unlicensed band (simply referred to as burst transmission duration) may be specified by physical layer signaling, e.g., cell-specific control signal may specify the burst transmission duration of this time, or may be specified by higher layer signaling, e.g., the maximum channel occupancy parameter q signaling may specify the maximum value of the burst transmission duration of this time (i.e., the limited maximum transmission duration), or may be specified in a pre-determined manner. Example five provides a method of signal reception at a UE when the burst transmission duration is specified by a physical layer indication.

Example Five

Since the time when an LTE base station starts to occupy a channel may be at a boundary of a downlink subframe or any position in a downlink subframe, a UE may start receiving PDSCH from a boundary of a downlink subframe or from any time position in a downlink subframe. A cell operating on an unlicensed band may avoid non-stop transmission, so that other systems may not be seriously affected. The cell operating on an unlicensed band may perform transmission non-continuously, i.e., the cell may perform transmission for a period and stop to perform channel state detection. If the channel is detected to be idle, transmission may be continued; otherwise, the channel state detection may be performed repeatedly and transmission may not be performed until the channel is detected to be idle. The limited maximum transmission duration of a cell operating on an unlicensed band may be 1 to 13 milliseconds, and may not be integral multiple of milliseconds. For example, when q=4~13, the limited maximum transmission duration may be $(^{13}/_{32})*q$ milliseconds; when q=4, the limited maximum transmission duration may be $(^{13}/_{32})*4=1.625$ milliseconds. The burst transmission duration of an LTE base station may equal the limited maximum transmission duration, or may be a duration shorter than the limited maximum transmission duration according to a scheduling policy, e.g., there is no traffic at that moment, or in order to better co-exist with other devices working on the unlicensed band.

According to the above, since the time when an LTE base station starts to occupy a channel may not be at a boundary of a downlink subframe, the time when the LTE base station stops occupying the channel may not be at a boundary of a downlink subframe. Further, the time when an LTE base station starts to occupy a channel may not be at a boundary of an OFDM symbol, and the time when the LTE base station stops occupying the channel may not be at a boundary of an OFDM symbol. In an example, no matter whether the time when an LTE base station starts to occupy a channel is at a boundary of a subframe or an OFDM symbol, a UE may start receiving downlink channel and/or downlink reference signal at a boundary of an OFDM symbol.

In order to support flexible burst transmission duration, a base station may transmit a burst transmission duration indication or a start position indication to a UE to enable the UE to quickly determine the end time of the burst transmission duration. Accordingly, this example provides a method of a UE determining an ending OFDM symbol of downlink channel and/or downlink reference signal in a subframe within a burst transmission duration. Two methods are provided as follows.

Figure 23:
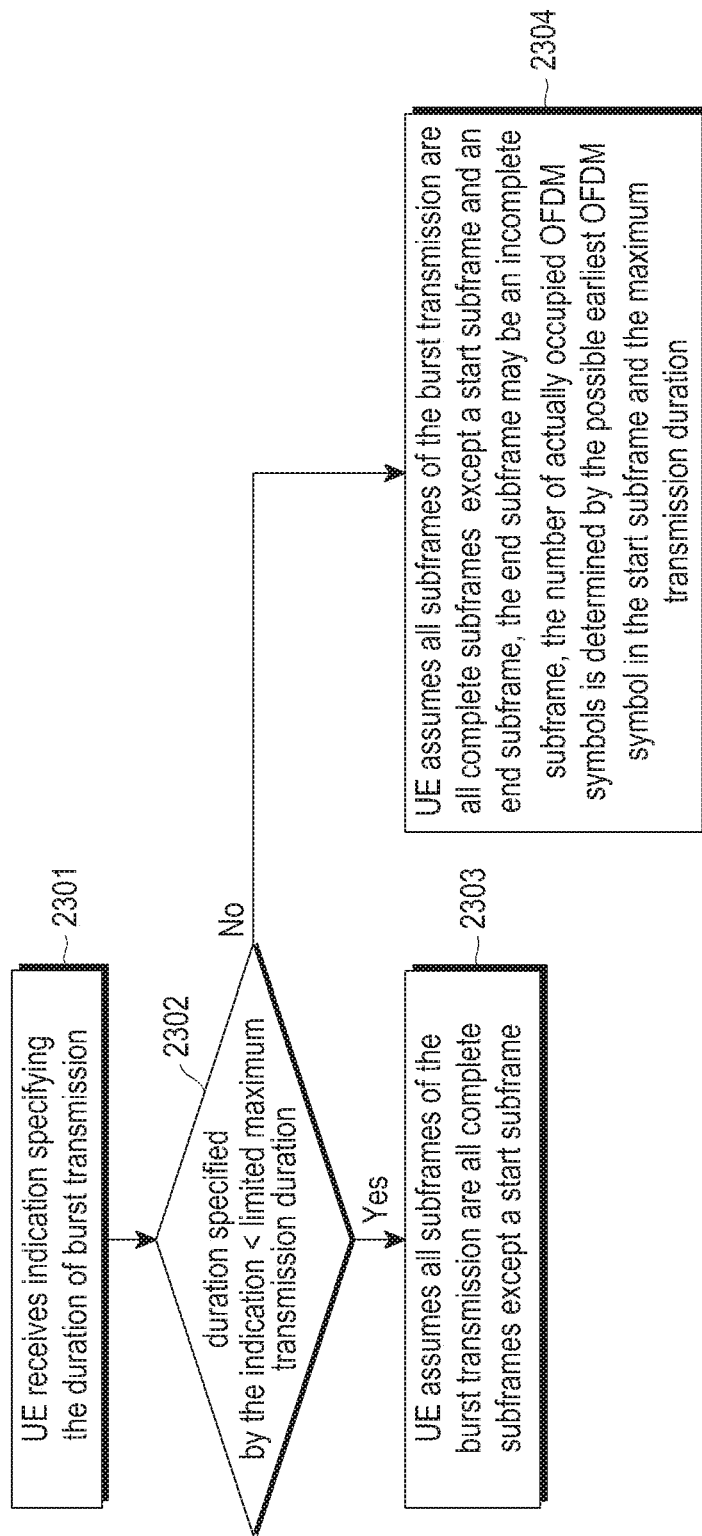
FIG. 23 is a flowchart illustrating method one in accordance with example five of the present disclosure.

A first method may be as shown in FIG. 23, and may include the following procedures.

FIG. 23 is a flowchart illustrating method one in accordance with example five of the present disclosure.

At block 2301, a UE may receive a length indication of a burst transmission duration. The length indication of the burst transmission duration may specify the number of subframes occupied by a burst transmission, denoted by N_s1. The length of the burst transmission specified by the signaling is within the limited maximum transmission duration defined in standards.

For example, the standards may regulate the maximum transmission duration of a burst transmission is $(^{13}/_{32})*q$ ms, and the q is an integer within the range of 4~32. Supposing q is 8, the maximum transmission duration may be $3.25(^{13}/_{4})$ ms. The duration of actual transmission of the base station may be any value smaller than or equal to the maximum transmission duration. For example, the signaling may use 2 bits for specifying the burst transmission may occupy 1, 2, 3 or 4 subframes. The number of subframes specified by the signaling only indicates the number of subframes occupied, not indicates the base station occupies all of OFDM symbols in the subframes.

The length indication of the burst transmission duration may be implemented in the following methods. Other methods may also be used as long as the same effects can be achieved.

Method one: The signaling specifies the number of subframes is the sum of subframes from subframe n1 which includes the start position of the burst transmission to subframe n2 which includes the end position of the burst transmission, i.e., N_s1=n2−n1+1. In the subframes, some subframes may have a portion of OFDM symbols occupied, and other subframes may have all of OFDM symbols occupied. As used herein, subframes having a portion of OFDM symbols occupied are referred to as partial subframes. A partial subframe may be a subframe from which the burst transmission starts, or a subframe at which the burst transmission ends. Subframes having all of OFDM symbols occupied are referred to as normal subframes. A normal subframe may be a subframe from which the burst transmission starts, or a subframe at which the burst transmission ends, or a subframe between the starting subframe and the ending subframe.

For example, the base station may start burst transmission from the $8^{th}$ OFDM symbol of subframe #n to subframe #n+2. The subframe #n is a partial subframe, and subframes #n+1 and #n+2 are normal subframes. Thus $n_1$=n, $n_2$=n+2, and the number of subframes specified by the signaling 2400 is N_s1=$n_2$−$n_1$+1=3, as shown in FIG. 24. FIG. 24 is a schematic diagram illustrating duration time in accordance with example five of the present disclosure.

In another example, burst transmission starts from the $8^{th}$ OFDM symbol of subframe #n to the $10^{th}$ OFDM symbol of subframe #n+3. The duration of the burst transmission is approximately equal to the maximum occupancy time 3.25 ms, i.e., N_s=4, as shown in FIG. 25. FIG. 25 is a schematic diagram illustrating duration time in accordance with example five of the present disclosure. The subframes #n and #n+3 are partial subframes, and subframes #n+1 and #n+2 are normal subframes. Thus $n_1$=n, $n_2$=n+3, and the number of subframes specified by the signaling 2500 is N_s1=$n_2$−$n_1$+1=4.

Method two: the number of subframes specified by the signaling is the result of processing the actual duration of the burst transmission by rounding down a decimal fraction smaller than 0.5 or rounding up a decimal fraction larger than or equal to 0.5.

Figure 26:
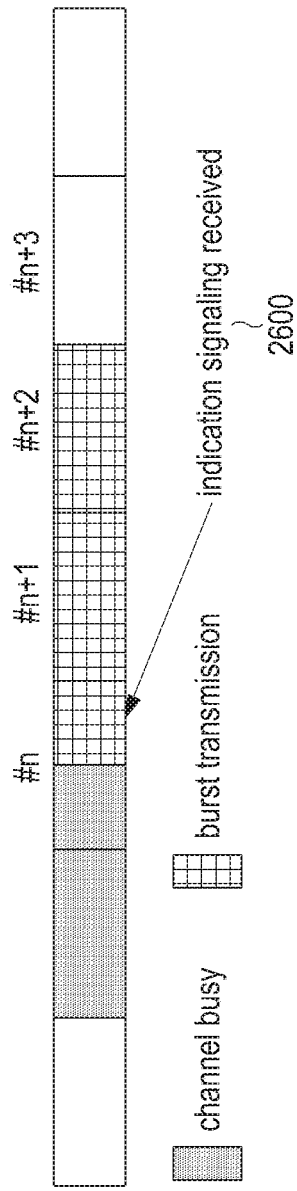
FIG. 26 is a schematic diagram illustrating duration time in accordance with example five of the present disclosure.

For example, the base station may start burst transmission from the 8th OFDM symbol of subframe #n to subframe #n+2, and the actual duration of the burst transmission is 2.5 ms. If the signaling indication 2600 uses a rounding up method, N_s1=3 ms, as shown in FIG. 26. FIG. 26 is a schematic diagram illustrating duration time in accordance with example five of the present disclosure.

Method three: The number of subframe indicated by the signaling is the sum of subframes from subframe n3 from which the signaling indication is received to subframe n2 in which the burst transmission ends, i.e., N_s1=n2−n3+1.

Figure 27:
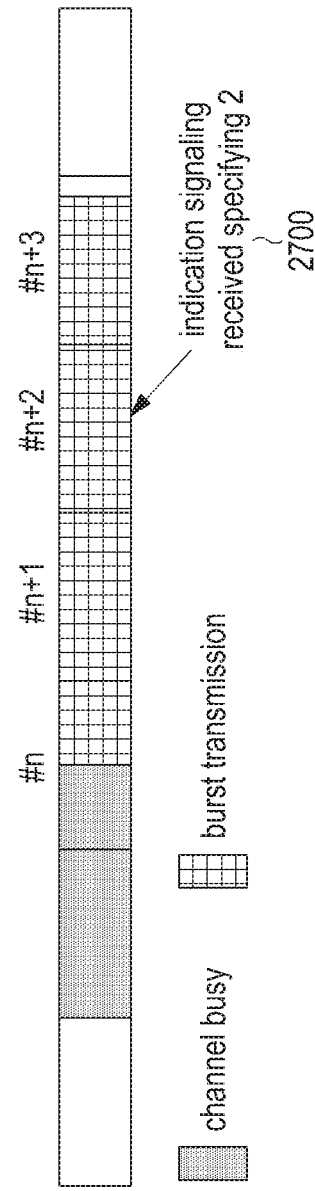
FIG. 27 is a schematic diagram illustrating duration time in accordance with example five of the present disclosure.

For example, the base station may perform burst transmission from the 8th OFDM symbol of subframe #n to the 10th OFDM symbol of subframe #n+3, and the duration of the burst transmission is approximately equal to the maximum occupancy time 3.25 ms, i.e., N_s=4. The UE may receive the signaling indication 2700 from subframe #n+2, i.e., n3=n+2, and the length of subframes specified is N_s1=2, representing the burst transmission ends in subframe n2=n+3, as shown in FIG. 27. FIG. 27 is a schematic diagram illustrating duration time in accordance with example five of the present disclosure.

According to the above method, information that the indicated duration of the burst transmission equals the maximum transmission time may be indicated by pre-defined bit values, not by specifying the number of subframes of the maximum transmission time. For example, pre-determined bit value "00" or "11" may be used to denote the duration of the burst transmission equals the maximum transmission time.

At block 2302, the UE may compare the limited maximum transmission duration with a duration of burst transmission determined using received signaling specifying the burst transmission duration. If the specified duration of the burst transmission is smaller than the maximum transmission time, procedures in block 2303 may be performed. If the specified duration of the burst transmission equals the maximum transmission time, procedures in block 23042 may be performed.

The UE may determine the duration of the burst transmission according to the signal specifying the duration of the burst transmission using the methods listed in block 2301 or using other proper methods. Then the UE may determine the relation between the limited maximum transmission duration and the duration of burst transmission according to the received signaling specifying the burst transmission duration. For example, the UE may compare the number of subframes corresponding to the limited maximum transmission duration with the number of subframes specified by the burst transmission duration indication signaling. In another example, the UE may determine the position of the end subframe according to the number of remaining subframes specified by the received burst transmission duration indication signaling, and compare the position of the end subframe with the end subframe determined using the limited maximum transmission duration. The relation may also be determined using other methods, and the method is not limited in the present disclosure.

At block 2303, the UE may assume all of subframes for the burst transmission other than the start subframe are complete subframes, i.e., all of OFDM symbols in each of the subframes are occupied. That is, the ending subframe is a complete subframe, and the end OFDM symbol is the last OFDM symbol of the subframe. Whether the start subframe is a complete subframe may be specified explicitly or inexplicitly, as in other examples of the present disclosure, thus is not elaborated herein. The UE may receive downlink signals according to the above assumptions.

At block 2304, the UE may assume all of subframes for the burst transmission other than the start subframe and the end subframe are complete subframes, i.e., all of OFDM symbols in each of the subframes are occupied. The end subframe may be a partial subframe, and the number of OFDM symbols actually occupied or the end OFDM symbol of the burst transmission may be determined using the possible first OFDM symbol in the start subframe and the limited maximum transmission duration. The method may be as in example four, thus is not repeated herein. The UE may receive downlink signals according to the above assumptions.

If the maximum transmission duration makes the end position of the burst transmission is not a boundary of an OFDM symbol, the UE may determine the possible end position is the last OFDM symbol within the maximum transmission duration. In this situation, the actual burst transmission duration is approximately equal to the maximum transmission duration, and the situation may be processed according to "the specified burst transmission duration equals the maximum transmission duration".

In an example, in the blocks 2302, 2303 and 2304, if the number of subframes N_s1 specified by the received burst transmission duration indication signaling is smaller than the number of subframes N_s determined using the maximum transmission duration, the procedure in block 2303 is performed. The UE may assume all of subframes for the burst transmission other than the start subframe are complete subframes, i.e., intermediate subframes and the end subframe are all complete subframes, and the end position of the downlink channel/signal is the boundary of the subframe.

For example, the maximum transmission duration is 3.25 ms, and the base station may start transmission from the $8^{th}$ OFDM symbol of subframe #n. According to method one of block 1, the number of subframes determined using the maximum transmission duration is, i.e., the maximum transmission duration of the base station may be from the 8th OFDM symbol of subframe #n to the $10^{th}$ OFDM symbol of subframe #n+3. The number of subframes specified by the burst transmission duration is N_s1=3. N_s1<N_s indicates the burst transmission of the base station of this time occupies 3 subframes, i.e., the transmission starts from the $8^{th}$ OFDM symbol of subframe #n to the last OFDM symbol of subframe #n+2, as shown in FIG. 1. Subframes #n+1 and #n+2 are both complete subframes, i.e., all of OFDM symbols in the subframes are occupied. Subframe #n is a partial subframe.

If the number of subframes specified by the burst transmission duration indication signaling equals the number of subframes determined by the maximum transmission duration, or the duration of the burst transmission specified by the signaling equals the maximum transmission duration, the procedure in block 2304 may be performed. The UE may assume the end position of downlink channel/signal in the last subframe determined by the number of subframes specified by the signaling is determined by the method of example four of the present disclosure, and the end position of downlink channel/signal in an intermediate subframe determined by the number of subframes specified by the signaling is a boundary of the intermediate subframe.

For example, the maximum transmission duration is 3.25 ms, and the base station may start transmission from the $8^{th}$ OFDM symbol of subframe #n. The maximum transmission duration of the base station may start from the $8^{th}$ OFDM symbol of subframe #n to the $10^{th}$ OFDM symbol of subframe #n+3. According to method one of block 1, the number of subframes determined by the maximum transmission duration is N_s=4. The number of subframes specified by the burst transmission duration indication signaling is N_s1=4. N_s1=N_s indicates the burst transmission of the base station of this time occupies 4 subframes, i.e., the transmission starts from the $8^{th}$ OFDM symbol of subframe #n to the $10^{th}$ OFDM symbol of subframe #n+3, as shown in FIG. 2. The UE determine the burst transmission of the base station is approximately equal to the maximum transmission duration according to the burst transmission duration indication signaling. Thus, the UE may determine subframes #n+1 and #n+2 are both complete subframes, and subframes #n and #n+3 are partial subframes. In subframe #n+3, the end position of downlink channel/signal may be determined using the possible start position in subframe #n and maximum transmission duration. The method may be as in example four, thus is not repeated herein.

Figure 28:
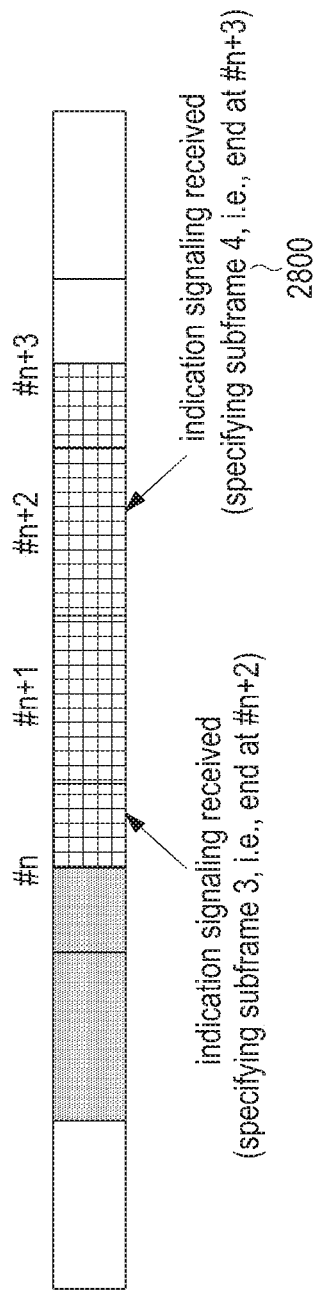
FIG. 28 is a schematic diagram illustrating multiple indications received in accordance with example five of the present disclosure.

In addition, if the UE receives a new burst transmission duration indication 2800 during a burst transmission, the procedure in block 2302 may be performed according to the new burst transmission duration indication, as shown in FIG. 28. FIG. 28 is a schematic diagram illustrating multiple indications received in accordance with example five of the present disclosure In another example, when the actual burst transmission duration of the base station is smaller than the maximum transmission duration, all OFDM symbols in the last subframe of the burst transmission may not be occupied. For example, the last X OFDM symbols in the subframe may be reserved for uplink transmission, e.g., uplink/downlink guard period, or time for uplink CCA. In this example, the number of reserved OFDM symbols X may be pre-defined, or may be configured by higher layer signaling. The procedures 2303 and 2304 may be as follows.

At block 2303, the UE may assume all of subframes for the burst transmission other than the start subframe and the end subframe are complete subframes, i.e., all of OFDM symbols in each of the subframes are occupied. Whether the start subframe is a complete subframe may be specified explicitly or inexplicitly. The end subframe may be an incomplete subframe, the possible position of an OFDM symbol or an end OFDM symbol of the burst transmission may be determined by min(Y−X,Y)=Y−X. The Y is the number of OFDM symbols of a complete subframe, e.g., Y=14 corresponding to a normal CP; Y=12 corresponding to a long CP. The UE may receive downlink signals according to the above assumptions.

For example, the number of reserved OFDM symbol X=4. Supposing the subframe has a normal CP, Y=14. For example, the maximum transmission duration is 3.25 ms, and the base station may start transmission from the $8^{th}$ OFDM symbol of subframe #n. According to method one of block 1, the number of subframes determined using the maximum transmission duration is, i.e., the maximum transmission duration of the base station may be from the $8^{th}$ OFDM symbol of subframe #n to the $10^{th}$ OFDM symbol of subframe #n+3. The number of subframes specified by the burst transmission duration is N_s1=3. N_s1<N_s indicates the burst transmission of the base station of this time occupies 3 subframes, i.e., the transmission starts from the $8^{th}$ OFDM symbol of subframe #n to the Z'th OFDM symbol of subframe #n+2, and Z=min(Y−X,Y)=10.

Figure 29:
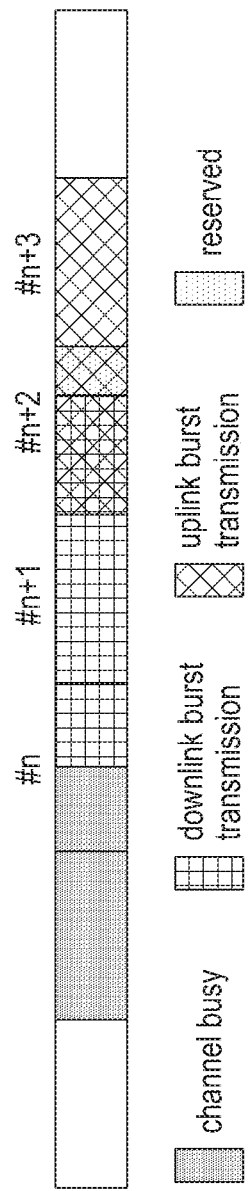
FIG. 29 is a schematic diagram illustrating received signaling indicating whether a subframe is the last subframe in accordance with example five of the present disclosure.

FIG. 29 is a schematic diagram illustrating received signaling indicating whether a subframe is the last subframe in accordance with example five of the present disclosure. As shown in FIG. 29. Subframes #n+1 is a complete subframe, i.e., all of OFDM symbols in the subframes are occupied. Subframes #n and #n+2 are partial subframes.

At block 2304, the UE may assume all of subframes for the burst transmission other than the start subframe and the end subframe are complete subframes, i.e., all of OFDM symbols in each of the subframes are occupied. The end subframe may be an incomplete subframe, and the possible position of OFDM symbol or the end OFDM symbol of the burst transmission may be determined by the possible position of the first OFDM symbol in the start subframe and the maximum transmission duration and the number of reserved OFDM symbols X, i.e., min(Y−X,Y1). Y1 may be the number of OFDM symbols determined by the possible position of the first OFDM symbol in the start subframe and the maximum transmission duration or by the end OFDM symbol of the burst transmission. The method may be as in example four, thus is not repeated herein. The UE may receive downlink signals according to the above assumptions.

For example, the number of reserved OFDM symbol X=2. Supposing the subframe has a normal CP, Y=14. For example, the maximum transmission duration is 3.25 ms, and the base station may start transmission from the $8^{th}$ OFDM symbol of subframe #n. The maximum transmission duration of the base station may start from the $8^{th}$ OFDM symbol of subframe #n to the $10^{th}$ OFDM symbol of subframe #n+3. According to method one of block 1, the number of subframes determined by the maximum transmission duration is N_s=4. The number of subframes specified by the burst transmission duration indication signaling is N_s1=4. N_s1=N_s indicates the burst transmission of the base station of this time occupies 4 subframes, i.e., the transmission starts from the $8^{th}$ OFDM symbol of subframe #n to the Z'th OFDM symbol of subframe #n+3, as shown in FIG. 30.

Figure 30:
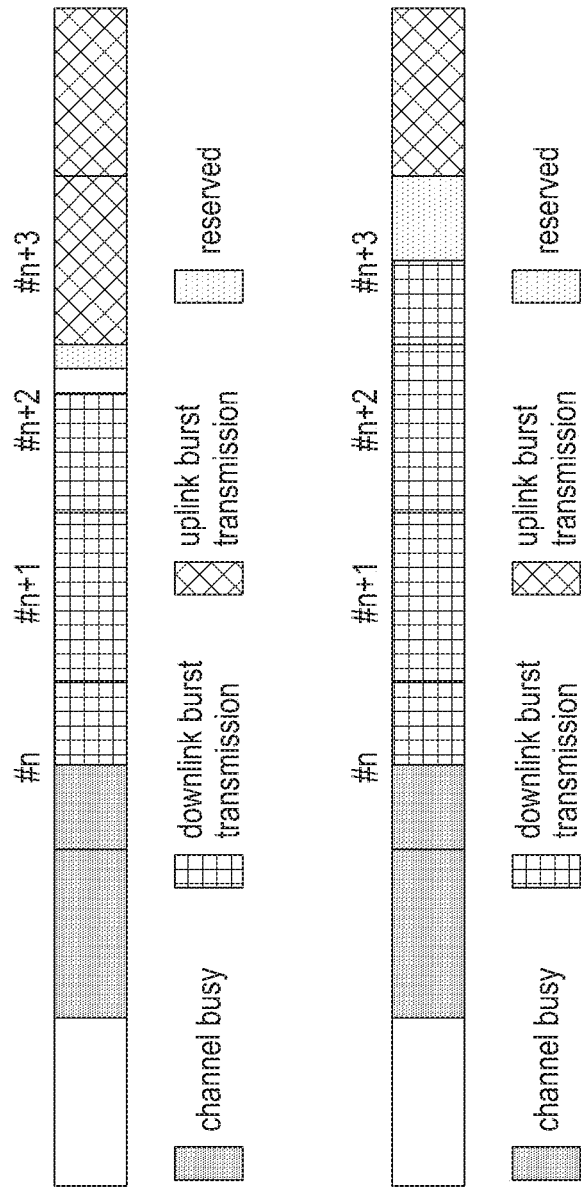
FIG. 30 is a schematic diagram illustrating received signaling indicating whether a subframe is the last subframe in accordance with example five of the present disclosure.

FIG. 30 is a schematic diagram illustrating received signaling indicating whether a subframe is the last subframe in accordance with example five of the present disclosure.

Figure 31:
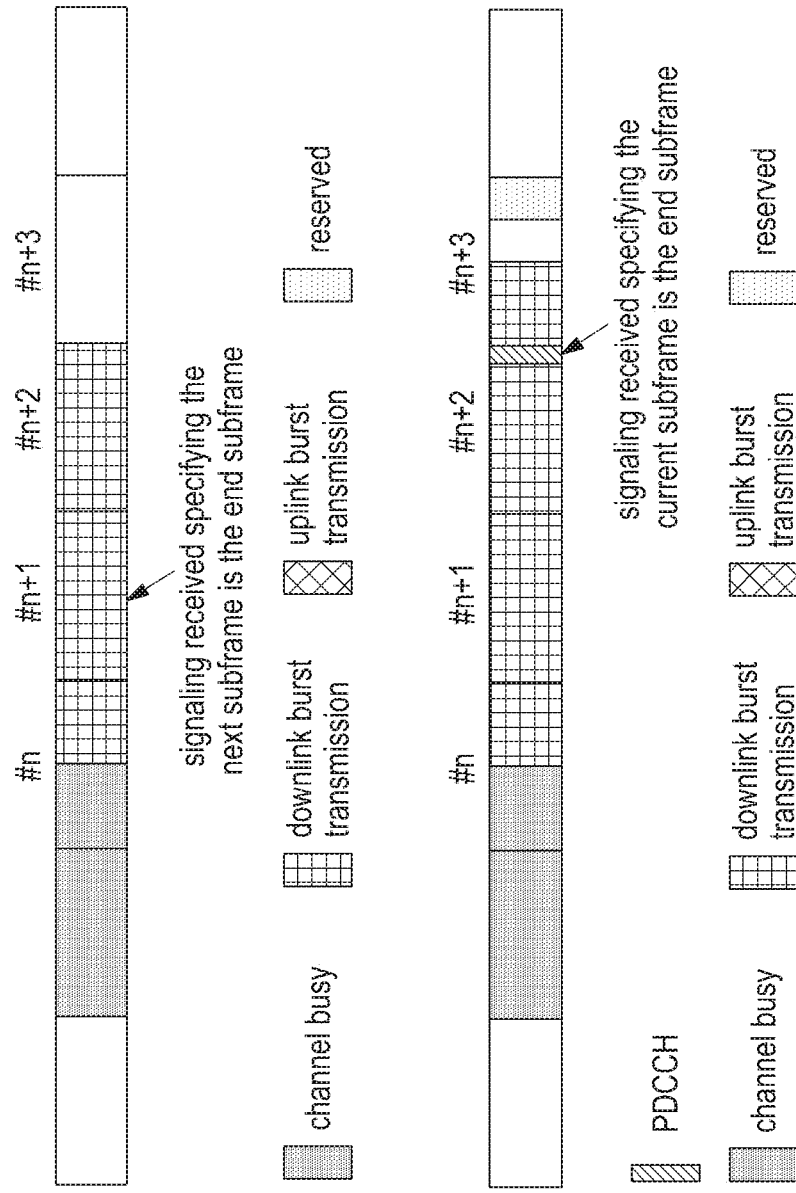
FIG. 31 is a schematic diagram illustrating received signaling indicating whether a subframe is the last subframe in accordance with example five of the present disclosure.

FIG. 31 is a schematic diagram illustrating received signaling indicating whether a subframe is the last subframe in accordance with example five of the present disclosure.

The UE determine the burst transmission of the base station is approximately equal to the maximum transmission duration according to the burst transmission duration indication signaling. Thus, the UE may determine subframes #n+1 and #n+2 are both complete subframes, and subframes #n and #n+3 are partial subframes. In subframe #n+3, the end position of downlink channel/signal may be determined using the possible start position in subframe #n and the maximum transmission duration and the number of reserved OFDM symbol X, i.e., min(Y−X,Y1). Y1 may be obtained according to the method of example four, Y1=10, and the end OFDM symbol is the Z'th OFDM symbol, Z=min(12, 10)=10. If the number of reserved OFDM symbol X=8, Z=min(6,10)=6.

Supposing the UE may obtain information that the base station has occupied the channel and performed downlink transmission through a certain method but the UE does not receive burst transmission duration indication signaling, the UE may determine whether the current subframe of the burst transmission is a complete subframe or a partial subframe using the maximum transmission duration before receiving the signaling indicating the burst transmission ends (e.g., UL subframe start indication). That is, the UE may assume all of subframes for the burst transmission other than the start subframe and the end subframe are complete subframes, i.e., all of OFDM symbols in each of the subframes are occupied. The end subframe may be a partial subframe. If the end subframe is a partial subframe, the end position of downlink channel/signal may be determined using the method of example four.

The following is another method of determining the end OFDM symbol. The indication signaling sent by the base station may specify whether subframe n is the end subframe of the current burst transmission. The subframe n may be the subframe from which the indication signaling is received or the next subframe of the subframe. For example, the indication signaling may use 1 bit to specify whether the current subframe or the next subframe is the end subframe of the current burst transmission. For example, the indication signaling may be transmitted in PDCCH in the same subframe, or the EPDCCH in the current subframe may specify the next subframe.

The indication signaling may also indicate which subframe is the end subframe of the current burst transmission. For example, the indication signaling may be transmitted in a subframe of the burst transmission which may be the start subframe or another subframe of the burst transmission. The subframe may specify a number of subframes between the subframe and the subsequent end subframe of the current burst transmission. The indication signaling may use more than 1 bit to specify whether the current subframe or the next subframe is the end subframe of the current burst transmission. If the indication signaling specifies the end subframe, the indication signaling may also specify the position of the end OFDM symbol. This example discusses a situation where the indication signaling specifies information of a subframe.

At block 201, a UE may receive an indication specifying an end subframe of a burst transmission. The indication specifying the end subframe may specify the position of the end subframe of the current burst transmission.

At block 202, the UE may judge whether subframe n is the end subframe. If subframe n is the end subframe, the procedure in block 203-1 or 203-1a may be performed; otherwise, the procedure in block 203-2 or 203-2a may be performed.

At block 203-1, the start subframe m and end subframe n of the current burst transmission may be incomplete subframes. Subframes m+1, . . . n−1 may be complete subframes. The position of the end OFDM symbol in the end subframe n may be determined according to the procedure in block 2304. The UE may receive downlink signals according to the above assumptions.

At block 203-2, the start subframe m of the current burst transmission may be an incomplete subframe. Subframes m+1, . . . n may be complete subframes. The UE may receive downlink signals according to the above assumptions.

At block 203-1a, the start subframe m and end subframe n of the current burst transmission may be incomplete subframes. Subframes m+1, . . . n−1 may be complete subframes. The position of the end OFDM symbol in the end subframe n may be determined according to the procedure in block 2304. The UE may receive downlink signals according to the above assumptions.

At block 203-2a, the start subframe m and end subframe n of the current burst transmission may be incomplete subframes. Subframes m+1, . . . n−1 may be complete subframes. The position of the end OFDM symbol in the end subframe n may be determined according to the procedure in block 2303. The UE may receive downlink signals according to the above assumptions.

Supposing the UE may obtain information that the base station has occupied the channel and performed downlink transmission through a certain method but the UE does not receive end subframe indication signaling, the UE may determine whether the current subframe of the burst transmission is a complete subframe or a partial subframe using the maximum transmission duration before receiving the signaling indicating the burst transmission ends (e.g., UL subframe indication). That is, the UE may assume all of subframes for the burst transmission other than the start subframe and the end subframe are complete subframes, i.e., all of OFDM symbols in each of the subframes are occupied. The end subframe may be a partial subframe. If the end subframe is a partial subframe, the end position of downlink channel/signal may be determined using the method of example four.

The present disclosure assumes a base station may transmit burst transmission indication signaling, but does not limit the method through which the base station transmits the burst transmission indication signaling. For example, the indication signaling may be transmitted in any subframe, e.g., the first subframe of the burst transmission, or the first complete subframe of the burst transmission. The indication signaling may be any signaling, e.g., cell public signaling, or UE-specific signaling. The indication signaling may be specified by a single DCI or by an additional bit in the conventional DCI.

The above is a method of receiving downlink channel and/or downlink reference signal in accordance with an example of the present disclosure; The present disclosure also provides an apparatus of receiving downlink channel and/or downlink reference signal. The apparatus may implement the above methods.

Figure 32:
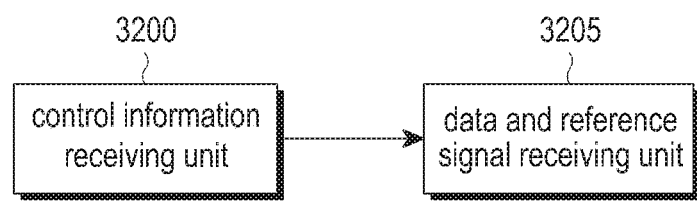
FIG. 32 is a schematic diagram illustrating an apparatus of receiving downlink channel and/or downlink reference signal in accordance with an example of the present disclosure.

FIG. 32 is a schematic diagram illustrating the overall structure of the apparatus. As shown in FIG. 32, the apparatus may include: a control information receiving unit 3200 and a data and reference signal receiving unit 3205. The control information receiving unit 3200 may receive control information of a cell operating on an unlicensed band. The data and reference signal receiving unit 3205 may receive downlink channel and/or downlink reference signal in the cell operating on the unlicensed band according to the control information.

Various embodiments of the present disclosure may be embodied as computer readable codes on a computer readable recording medium. The computer readable recording medium is any data storage device that can store data, which can be thereafter read by a computer system. Examples of the computer readable recording medium include ROM, RAM, Compact Disc (CD)-ROMs, magnetic tapes, floppy disks, optical data storage devices, carrier waves, and data transmission through the Internet. The computer readable recording medium can also be distributed over network coupled computer systems so that the computer readable code is stored and executed in a distributed fashion. Also, functional programs, codes, and code segments for accomplishing embodiments of the present disclosure can be easily construed by programmers skilled in the art to which the present disclosure pertains.

Various embodiments of the present disclosure can be implemented in hardware or a combination of hardware and software. The software can be recorded to a volatile or non-volatile storage device, such as a ROM irrespective of deletable or re-recordable, to a memory such as a RAM, a memory chip, a memory device, or an integrated circuit, or to a storage medium that is optically or magnetically recordable and readable by a machine (e.g. a computer), such as a CD, a Digital Versatile Disc (DVD), a magnetic disk, or a magnetic tape. The storage is an example of a machine-readable storage medium suitable for storing a program or programs including instructions to implement the embodiments of the present disclosure.

Accordingly, the present disclosure includes a program including a code for implementing the apparatus or the method as appended in the claims and a machine-readable storage medium that stores the program. The program may be transferred electronically through any medium such as a communication signal transmitted through a wired or wireless connection and the present disclosure covers equivalents thereof.

The apparatus, according to various embodiments of the present disclosure, may receive a program from a program providing apparatus, which is wire/wirelessly connected thereto, and thereafter store the program. The program providing apparatus may include a memory for storing a program including instructions allowing the apparatus to perform a preset content protection method, information required for a contents protection method, or the like, a communication unit for performing a wired/wireless communication with the apparatus, and a controller for transmitting a corresponding program to a transmitting and receiving apparatus either in response to a request from the apparatus or automatically.

The foregoing are only preferred examples of the present disclosure and are not for use in limiting the protection scope thereof. All modifications, equivalent replacements or improvements in accordance with the scopes and principles of the present disclosure shall be included in the protection scope of the present disclosure.

What is claimed is:

1. A method for communication by user equipment (UE) in a communication system using a cell associated with unlicensed band, the method comprising:
   receiving information on orthogonal frequency division multiplexing (OFDM) symbols in a subframe for downlink transmission, through a physical downlink control channel (PDCCH) on a cell for an unlicensed band; and
   receiving a signal on at least portion of the OFDM symbols in the subframe for the downlink transmission, on the cell for the unlicensed band,
   wherein a number of the OFDM symbols in a last subframe for the downlink transmission on the cell for the unlicensed band is defined based on a downlink pilot time slot (DwPTS) duration of a special subframe used by a communication system using a time division duplexing (TDD), and
   wherein the OFDM symbols in the last subframe for the downlink transmission on the cell for the unlicensed band are with normal cyclic prefix only.

2. The method of claim 1, wherein the subframe for the downlink transmission is a last subframe occupied for the downlink transmission.

3. The method of claim 1, wherein the number of the OFDM symbols in the last subframe for the downlink transmission is first n OFDM symbols in the last subframe occupied for the downlink transmission.

4. The method of claim 1, wherein information on start position in a subframe for the downlink transmission is acquired by the UE.

5. The method of claim 1, wherein the subframe for the downlink transmission is a first subframe occupied for the downlink transmission.

6. The method of claim 1, wherein the subframe for the downlink transmission is only associated with a normal cyclic prefix.

7. A user equipment (UE) in a communication system, the UE comprising:
   a transceiver; and
   a processor coupled with the transceiver and configured to control to:
      receive information on orthogonal frequency division multiplexing (OFDM) symbols in a subframe for downlink transmission, through a physical downlink control channel (PDCCH) on a cell for an unlicensed band, and
      receive a signal on at least portion of the OFDM symbols in the subframe for the downlink transmission, on the cell for the unlicensed band,
   wherein a number of the OFDM symbols in a last subframe for the downlink transmission on the cell for the unlicensed band is defined based on a downlink pilot time slot (DwPTS) duration of a special subframe used by a communication system using a time division duplexing (TDD), and wherein the OFDM symbols in the last subframe for the downlink transmission on the cell for the unlicensed band are with normal cyclic prefix only.

8. The UE of claim 7, wherein the subframe for the downlink transmission is a last subframe occupied for the downlink transmission.

9. The UE of claim 7, wherein the number of the OFDM symbols in the last subframe for the downlink transmission is first n OFDM symbols in the last subframe occupied for the downlink transmission.

10. The UE of claim 7, wherein the PDCCH is received as common control.

11. The UE of claim 7, wherein information on start position in a subframe for the downlink transmission is acquired by the UE.

12. The UE of claim 7, wherein the subframe for the downlink transmission is a first subframe occupied for the downlink transmission.

13. The UE of claim 7, wherein the subframe for the downlink transmission is only associated with a normal cyclic prefix.

14. A method for communication by base station (BS) in a communication system using a cell associated with unlicensed band, the method comprising:

transmitting information on orthogonal frequency division multiplexing (OFDM) symbols in a subframe for downlink transmission, through a physical downlink control channel (PDCCH) on a cell for an unlicensed band; and transmitting a signal on at least portion of the OFDM symbols in the subframe for the downlink transmission, on the cell for the unlicensed band, wherein a number of the OFDM symbols in a last subframe for the downlink transmission on the cell for the unlicensed band is defined based on a downlink pilot time slot (DwPTS) duration of a special subframe used by a communication system using a time division duplexing (TDD), and wherein the OFDM symbols in the last subframe for the downlink transmission on the cell for the unlicensed band are with normal cyclic prefix only.

15. A base station (BS) in a communication system, the BS comprising:

a transceiver; and a processor coupled with the transceiver and configured to control to:

transmit information on orthogonal frequency division multiplexing (OFDM) symbols in a subframe for downlink transmission, through a physical downlink control channel (PDCCH) on a cell for an unlicensed band, and transmit a signal on at least portion of the OFDM symbols in the subframe for the downlink transmission, on the cell for the unlicensed band, wherein a number of the OFDM symbols in a last subframe for the downlink transmission on the cell for the unlicensed band is defined based on a downlink pilot time slot (DwPTS) duration of a special subframe used by a communication system using a time division duplexing (TDD), and wherein the OFDM symbols in the last subframe for the downlink transmission on the cell for the unlicensed band are with normal cyclic prefix only.

16. The BS of claim 15, wherein the subframe for the downlink transmission is a last subframe occupied for the downlink transmission.

17. The BS of claim 15, wherein the number of the OFDM symbols in the last subframe for the downlink transmission is first n OFDM symbols in the last subframe occupied for the downlink transmission.

18. The BS of claim 15, wherein information on start position in a subframe for the downlink transmission is acquired by user equipment (UE).

19. The BS of claim 15, wherein the subframe for the downlink transmission is a first subframe occupied for the downlink transmission.

20. The BS of claim 15, wherein the subframe for the downlink transmission is only associated with a normal cyclic prefix.

* * * * *